US012568335B2

(12) United States Patent
Ye

(10) Patent No.: US 12,568,335 B2
(45) Date of Patent: Mar. 3, 2026

(54) SOUND APPARATUS

(71) Applicant: LG Display Co., Ltd., Seoul (KR)

(72) Inventor: Jaehun Ye, Tokyo (JP)

(73) Assignee: LG Display Co., Ltd., Seoul (KR)

( * ) Notice: Subject to any disclaimer, the term of this patent is extended or adjusted under 35 U.S.C. 154(b) by 250 days.

(21) Appl. No.: 18/384,595

(22) Filed: Oct. 27, 2023

(65) Prior Publication Data

US 2024/0214738 A1 Jun. 27, 2024

(30) Foreign Application Priority Data

Dec. 23, 2022 (JP) ................................ 2022-206163

(51) Int. Cl.
*H04R 7/08* (2006.01)
*H04R 1/02* (2006.01)
*H04R 17/00* (2006.01)

(52) U.S. Cl.
CPC ............... *H04R 7/08* (2013.01); *H04R 1/028* (2013.01); *H04R 17/00* (2013.01); *H04R 2499/15* (2013.01)

(58) Field of Classification Search
CPC .......... H04R 7/08; H04R 1/028; H04R 17/00; H04R 2499/15; H04R 7/045; H04R 9/06; H04R 9/02; H04R 2400/11; H04R 7/06; H04R 7/16
See application file for complete search history.

(56) References Cited

U.S. PATENT DOCUMENTS

| | | | |
|---|---|---|---|
| 2014/0022026 | A1 | 1/2014 | Onishi et al. |
| 2019/0028669 | A1 | 1/2019 | Shin et al. |
| 2019/0141424 | A1 | 5/2019 | Kim et al. |
| 2020/0097244 | A1 | 3/2020 | Kim et al. |
| 2021/0176566 | A1 | 6/2021 | Ye |
| 2022/0005446 | A1 | 1/2022 | Nozaki |
| 2022/0019271 | A1 | 1/2022 | Kim et al. |
| 2022/0371051 | A1 | 11/2022 | Kim et al. |

FOREIGN PATENT DOCUMENTS

| | | | |
|---|---|---|---|
| JP | 2004-023436 | A | 1/2004 |
| JP | 2013-121052 | A | 6/2013 |
| JP | 2020-155917 | A | 9/2020 |
| JP | 2021-90141 | A | 6/2021 |
| JP | 2021-197737 | A | 12/2021 |
| KR | 10-1495090 | B1 | 2/2015 |
| KR | 10-1500562 | B1 | 3/2015 |
| KR | 10-2018-0077582 | A | 7/2018 |
| KR | 10-2019-0000462 | A | 1/2019 |

(Continued)

OTHER PUBLICATIONS

Office Action issued in corresponding Taiwanese Patent Application No. 112139764, dated Aug. 28, 2024.

(Continued)

*Primary Examiner* — Tuan D Nguyen
(74) *Attorney, Agent, or Firm* — Morgan, Lewis & Bockius LLP

(57) ABSTRACT

A sound apparatus may include a vibration device including a first surface and a second surface opposite to the first surface and configured to vibrate by an input sound signal, a first vibration member connected to the first surface, a second vibration member, and a first elastic member connecting the second surface to the second vibration member.

24 Claims, 33 Drawing Sheets

13 : 13a, 13b, 13c, 13d

(56) References Cited

FOREIGN PATENT DOCUMENTS

| | | | |
|---|---|---|---|
| KR | 10-2019-0009188 | A | 1/2019 |
| KR | 10-2019-0040712 | A | 4/2019 |
| KR | 10-2019-0052949 | A | 5/2019 |
| KR | 10-2019-0054553 | A | 5/2019 |
| TW | 202244890 | A | 11/2022 |

OTHER PUBLICATIONS

Office Action dated Mar. 11, 2025 issued in corresponding Great Britain Patent Application No. GB2315797.7.

Office Action issued in corresponding Japanese Patent Application No. 2022-206163, dated Jan. 30, 2024.

Office Action issued in corresponding Japanese Patent Application No. 2022-206163, dated Jul. 25, 2024.

13 : 13a, 13b, 13c, 13d

13 : 13a, 13b, 13c, 13d

13 : 13b, 13d

13 : 13a, 13b, 13c, 13d, 13e, 13f, 13g, 13h

13 : 13a, 13b, 13c, 13d

13 : 13a, 13b, 13c, 13d, 13e, 13f

13 : 13b, 13d

16 : 16b, 16d

13: 13a, 13b, 13c, 13d

14 : 14b, 14d 18 : 18a, 18b, 18c, 18d

14 : 14b, 14d 13: 13a, 13b, 13c, 13d 18 : 18a, 18b, 18c, 18d

13 : 13b, 13d 14 : 14a, 14b 18 : 18b, 18d

SOUND APPARATUS

CROSS-REFERENCE TO RELATED APPLICATIONS

This application claims the benefit of and priority to Japanese Patent Application No. 2022-206163 filed on Dec. 23, 2022, the entirety of which is incorporated herein by reference for all purposes as if fully set forth herein.

BACKGROUND

1. Technical Field

The present disclosure relates to a sound apparatus.

2. Description of the Related Art

Sound apparatuses include a vibrometer which converts an input electrical signal to a physical vibration. Piezoelectric speakers consisting of piezoelectric devices including ferroelectric ceramic or the like are lightweight and have low power consumption, and thus, flexible for use for various purposes.

Piezoelectric devices used as piezoelectric speakers are limited in vibration width (or displacement width), and due to this, there have been disadvantages with known devices in that sound pressure level can be insufficient.

The description of the related art should not be assumed to be prior art merely because it is mentioned in or associated with this section. The description of the related art may include information that describes one or more aspects of the subject technology, and the description in this section does not limit the invention.

SUMMARY

The inventors of the present disclosure have recognized the problems and disadvantages of the related art, have performed extensive research and experiments, including research and experiments for implementing a vibration apparatus for enhancing sound quality, and have developed a new sound apparatus for enhancing sound quality.

One or more example embodiments of the present disclosure are directed to providing a sound apparatus in which sound quality is enhanced, and a display apparatus having the same.

Additional advantages, aspects, and features of the disclosure are set forth in the present disclosure and will also be apparent from the present disclosure or may be learned by practice of the inventive concepts provided herein. Other features, advantages, and aspects of the present disclosure may be realized and attained by the descriptions provided in the present disclosure, including the claims hereof as well as the appended drawings.

To achieve these and other advantages and aspects of the present disclosure, as embodied and broadly described herein, in one or more aspects, a sound apparatus may comprise a vibration device including a first surface and a second surface opposite to the first surface and configured to vibrate an input sound signal, a first vibration member connected to the first surface, a second vibration member, and a first elastic member connecting the second surface to the second vibration member.

According to one or more example embodiments of the present disclosure, there is provided a sound apparatus where sound quality is enhanced.

Other systems, methods, features and advantages will be, or will become, apparent to one with skill in the art upon examination of the drawings and detailed description herein. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing description and the following description of the present disclosure are exemplary and explanatory and are intended to provide further explanation of the disclosures as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure, and together with the description serve to explain principles of the disclosure.

Figure 1:
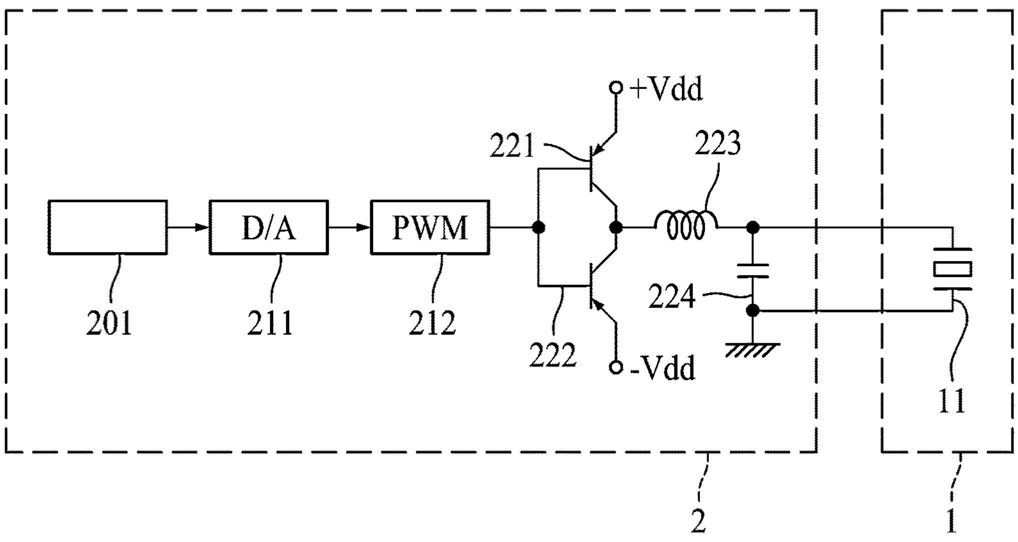
FIG. 1 is a block diagram illustrating a configuration of a sound apparatus and a host system according to a first example embodiment of the present disclosure.

Throughout the drawings and the detailed description, unless otherwise described, the same drawing reference numerals should be understood to refer to the same elements, features, or structures. The sizes, lengths, and thicknesses of layers, regions and elements, and depiction of thereof may be exaggerated for clarity, illustration, and/or convenience.

DETAILED DESCRIPTION

Reference is now made in detail to embodiments of the present disclosure, examples of which may be illustrated in the accompanying drawings. In the following description, when a detailed description of well-known methods, functions, structures or configurations may unnecessarily obscure aspects of the present disclosure, the detailed description thereof may have been omitted for brevity. Further, repetitive descriptions may be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are examples and are provided so that this disclosure may be thorough and complete to assist those skilled in the art to understand the inventive concepts without limiting the protected scope of the present disclosure.

Shapes, dimensions (e.g., sizes, lengths, widths, heights, thicknesses, locations, radii, diameters, and areas), ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

When the term "comprise," "have," "include," "contain," "constitute," "made of," "formed of," "composed of," or the like is used with respect to one or more elements, one or more other elements may be added unless a term such as "only" or the like is used. The terms used in the present disclosure are merely used in order to describe particular example embodiments, and are not intended to limit the scope of the present disclosure. The terms of a singular form may include plural forms unless the context clearly indicates otherwise.

The word "exemplary" is used to mean serving as an example or illustration, unless otherwise specified. Embodiments are example embodiments. Aspects are example aspects. "Embodiments," "examples," "aspects," and the like should not be construed to be preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term "may" encompasses all the meanings of the term "can."

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

In describing a positional relationship, where the positional relationship between two parts (e.g., layers, films, regions, components, sections, or the like) is described, for example, using "on," "upon," "on top of," "over," "under," "above," "below," "beneath," "near," "close to," "adjacent to," "beside," "next to," "at or on a side of" or the like, one or more other parts may be located between the two parts unless a more limiting term, such as "immediate(ly)," "direct(ly)," or "close(ly)," is used. For example, when a structure is described as being positioned "on," "on a top of," "upon," "on top of," "over," "under," "above," "below," "beneath," "near," "close to," "adjacent to," "beside," "next to," or "at or on a side of" another structure, this description should be construed as including a case in which the structures contact each other directly as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an exemplary term "above" or "on" can include both directions of "above" and "below."

In describing a temporal relationship, when the temporal order is described as, for example, "after," "subsequent," "next," "before," "preceding," "prior to," or the like, a case that is not consecutive or not sequential may be included and thus one or more other events may occur therebetween, unless a more limiting term, such as "just," "immediate(ly)," or "direct(ly)," is used.

It is understood that, although the terms "first," "second," and the like may be used herein to describe various elements (e.g., layers, films, regions, components, sections, or the like), these elements should not be limited by these terms, for example, to any particular order, precedence, or number of elements. These terms are used only to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element, and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element (e.g., layer, film, region, component, section, or the like) is "connected," "coupled," "attached," "adhered," or the like to another element, the element can not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, region, component, section, or the like) "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The phase that an element (e.g., layer, film, region, component, section, or the like) is "provided in," "disposed in," or the like in another element may be understood as that at least a portion of the element is provided in, disposed in, or the like in another element, or that the entirety of the element is provided in, disposed in, or the like in another element. The phase that an element (e.g., layer, film, region, component, section, or the like) "contacts," "overlaps," or the like with another element may be understood as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a "line" or "direction" should not be interpreted only based on a geometrical relationship in which the respective lines or directions are parallel or perpendicular to each other, and may be meant as lines or directions having wider directivities within the range within which the components of the present disclosure can operate functionally. For example, the terms "first direction," "second direction," and the like, such as a direction parallel or perpendicular to "x-axis," "y-axis," or "z-axis," should not be interpreted only based on a geometrical relationship in which the respective directions are parallel or perpendicular to each other, and may be meant as directions having wider directivities within the range within which the components of the present disclosure can operate functionally.

The term "at least one" should be understood as including any and all combinations of one or more of the associated listed items. For example, each of the phrases "at least one of a first item, a second item, or a third item" and "at least one of a first item, a second item, and a third item" may represent (i) a combination of items provided by two or more of the first item, the second item, and the third item or (ii) only one of the first item, the second item, or the third item.

The expression of a first element, a second elements "and/or" a third element should be understood as one of the first, second and third elements or as any or all combinations of the first, second and third elements. By way of example, A, B and/or C may refer to only A; only B; only C; any of A, B, and C (e.g., A, B, or C); some combination of A, B, and C (e.g., A and B; A and C; or B and C); or all of A, B, and C. Furthermore, an expression "A/B" may be understood as A and/or B. For example, an expression "A/B" may refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two. Furthermore, when an element (e.g., layer, film, region, component, sections, or the like) is referred to as being "between" at least two elements, the element may be the only element between the at least two elements, or one or more intervening elements may also be present.

In one or more aspects, the phrases "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various embodiments of the present disclosure may be partially or entirely coupled to or combined with each other, may be technically associated with each other, and may be variously operated, linked or driven together in various ways. Embodiments of the present disclosure may be implemented or carried out independently of each other or may be implemented or carried out together in a co-dependent or related relationship. In one or more aspects, the components of each apparatus and device according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example embodiments.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the following description, various example embodiments of the present disclosure are described in detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings may be different from an actual scale, dimension, size, and thickness. Thus, embodiments of the present disclosure are not limited to a scale, dimension, size, or thickness illustrated in the drawings.

First Example Embodiment

FIG. 1 is a block diagram illustrating a configuration of a sound apparatus according to a first example embodiment of the present disclosure. A sound signal input to the sound apparatus 1 is described with reference to FIG. 1. The sound apparatus may be individually used as a speaker, or may be embedded into an advertising signboard, a poster, a noticeboard, or display apparatus or the like. The use of the sound apparatus according to the first example embodiment of the present disclosure is not particularly limited thereto.

A sound apparatus 1 may include a vibration device 11. The vibration device 11 may be a device which is displaced based on an inverse piezoelectric effect when a voltage is applied based on a sound signal (or a driving signal) input thereto. The vibration device 11, for example, may be an element which is displaced based on a voltage, such as a bimorph, unimorph, or multimorph. The displacement can be by bending or flexing of the vibration device. An input sound signal may be an alternating current (AC) voltage generally, and thus, the vibration device 11 may vibrate based on the input sound signal to output a vibration and/or a sound. For example, the vibration device 11 may be a vibration generating device, a sound generating device, or a voice generating device, but embodiments of the present disclosure are not limited thereto.

A host system 2 may be a system including an apparatus or a plurality of apparatuses, which supply the sound signal to control the sound apparatus 1. However, the host system 2 may further supply other signals, such as an image signal (for example, red-green-blue (RGB) data or red-green-blue-white (RGBW) data) and a timing signal (for example, a vertical synchronization signal, a horizontal synchronization signal, and a data enable signal, etc.) or the like, based on the purpose of the sound apparatus 1. The host system 2 may be, for example, a source sound reproduction apparatus, a local broadcast apparatus, a radio broadcast reproduction system, a television (TV) system, a set-top box, a navigation system, an optical disk player, a computer, a home theater system, a video phone system, or the like. Further, the sound apparatus 1 and the host system 2 may be an integrated apparatus or separate apparatuses.

The host system 2 may include an input part 201, a digital-to-analog (D/A) converter 211, a pulse width modulation (PWM) circuit 212, transistors 221 and 222, a coil 223, and a capacitor 224. The input part 201 may input a digital signal to control the vibration device 11. The D/A converter 211 may convert the digital signal input from the input part 201 into an analog signal. The PWM circuit 212 may pulse-width-modulate the analog signal input from the D/A converter 211 to output a pulse signal. The transistors 221 and 222 may include a PNP type transistor 221 and an NPN type transistor 222. The PNP type transistor 221 and the NPN type transistor 222 may be configured as a push-pull circuit. For example, a collector terminal of each of the transistors 221 and 222 may be connected to each other, and a base terminal of each of the transistors 221 and 222 may be connected to each other. A positive voltage +Vdd may be applied to an emitter terminal of the transistor 221. A negative voltage −Vdd may be applied to an emitter terminal of the transistor 222. The pulse signal may be applied to the base terminals of the transistors 221 and 222 from the PWM circuit 212, and the transistors 221 and 222 may be complementarily turned on or turned off based on the pulse signal. For example, when a positive pulse signal is applied to the base terminals of the transistors 221 and 222, the transistor 221 may be turned on, and the transistor 222 may be turned off. Therefore, a voltage at the collector terminal of each of the transistors 221 and 222 may be a voltage +Vdd. On the other hand, when a negative pulse signal is applied to the base terminals of the transistors 221 and 222, the transistor 221 may be turned off, and the transistor 222 may be turned on. Therefore, a voltage at the collector terminal of each of the transistors 221 and 222 may be a voltage −Vdd. Further, when a potential of the pulse signal is a ground potential, the transistors 221 and 222 may be turned off simultaneously. The coil 223 and the capacitor 224 may each function as a low pass filter and may smooth the pulse signal at the collector terminal of each of the transistors 221 and 222 to output a sound signal (or a driving signal) to the vibration device 11.

Figure 2:
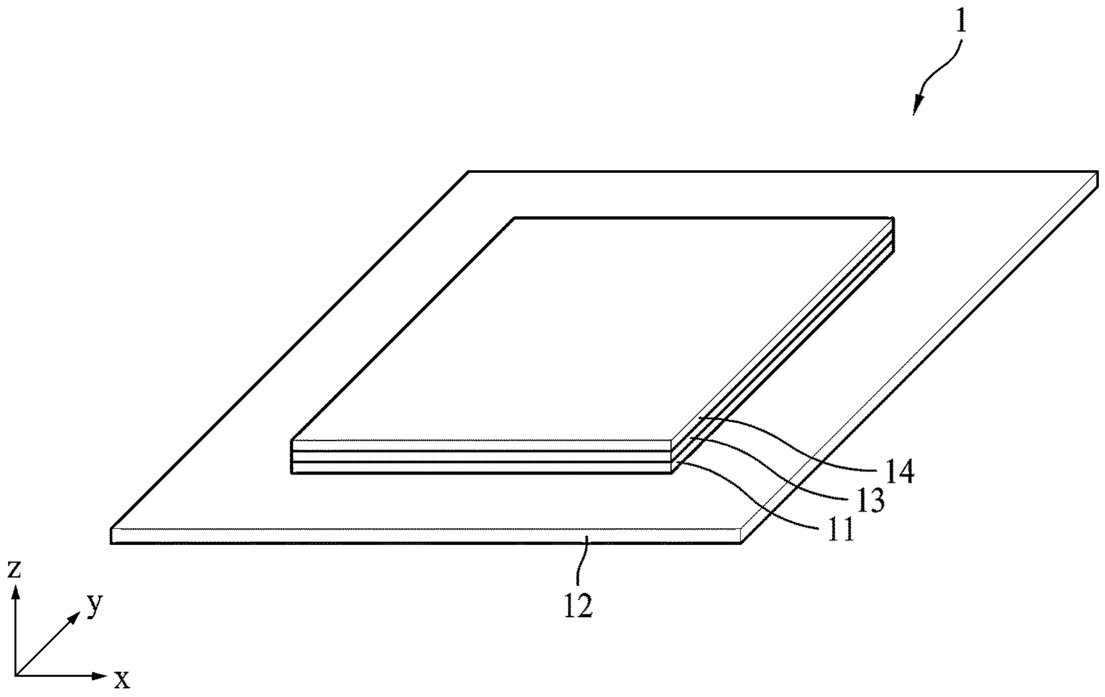
FIG. 2 is a perspective view illustrating a configuration of a sound apparatus according to a first example embodiment of the present disclosure.
Figure 3:
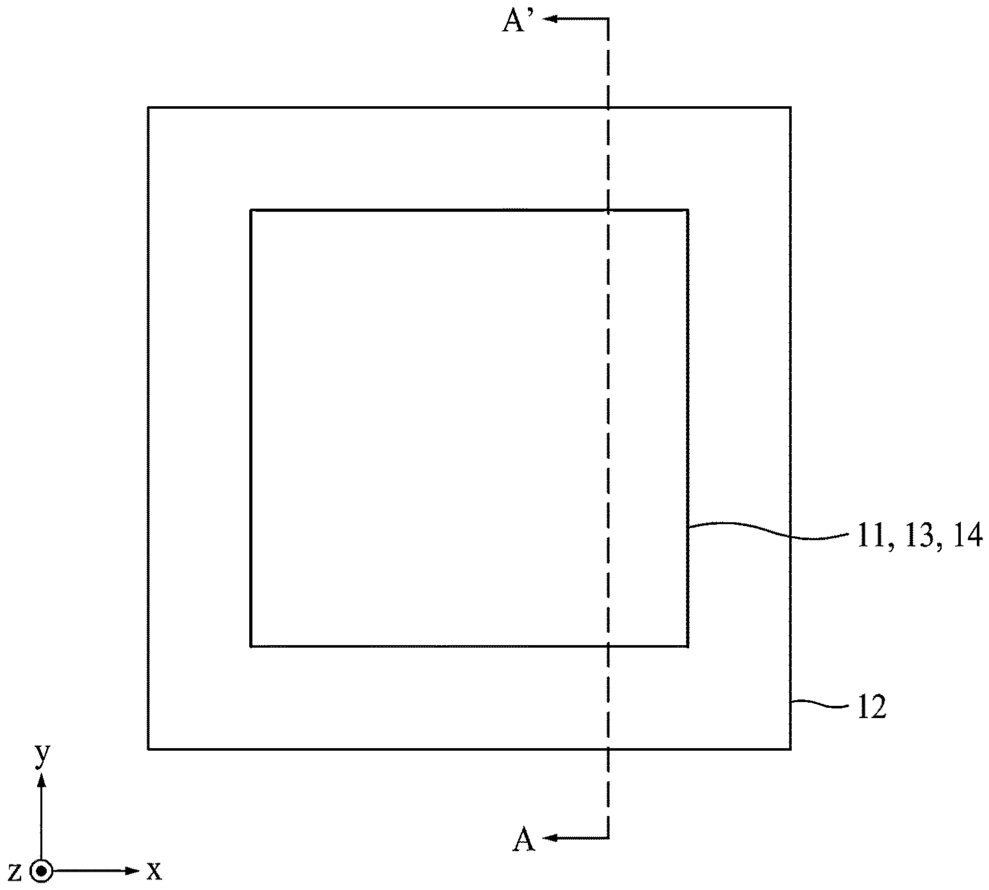
FIG. 3 is a plan view illustrating a configuration of a sound apparatus according to a first example embodiment of the present disclosure.
Figure 4:
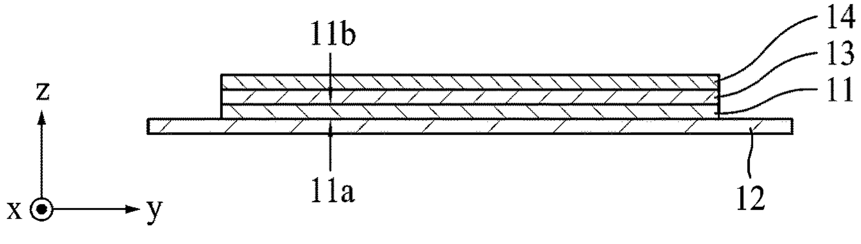
FIG. 4 is a cross-sectional view illustrating a configuration of a sound apparatus according to a first example embodiment of the present disclosure.
Figure 5:
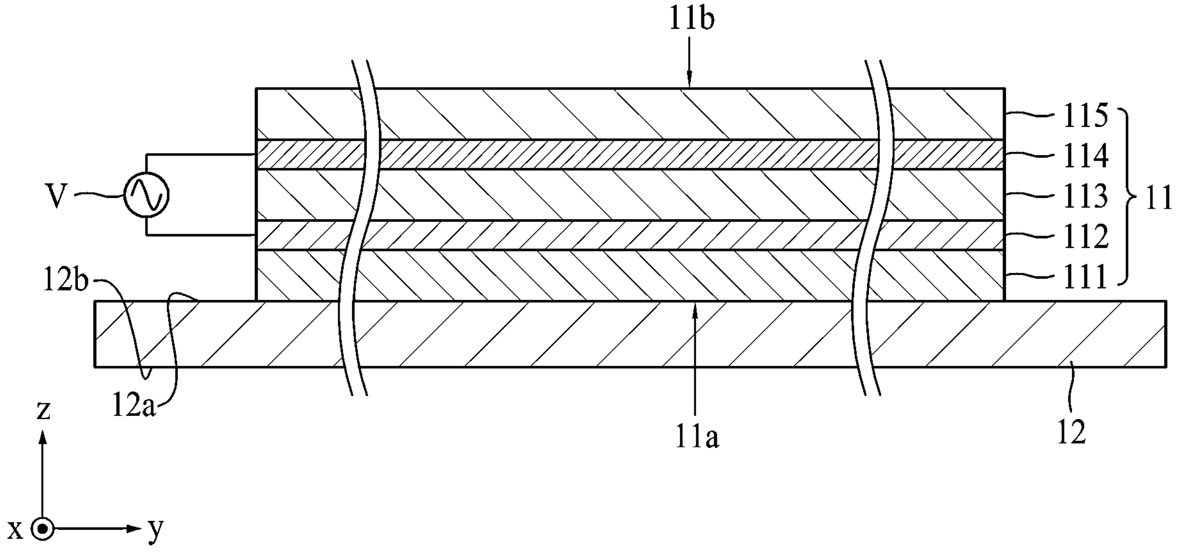
FIG. 5 is a cross-sectional view illustrating in more detail a structure of a vibration apparatus according to a first example embodiment of the present disclosure.

FIG. 2 is a perspective view illustrating a configuration of a sound apparatus according to a first example embodiment of the present disclosure. FIG. 3 is a plan view illustrating a configuration of a sound apparatus according to a first example embodiment of the present disclosure. FIG. 4 is a cross-sectional view illustrating a configuration of a sound apparatus according to a first example embodiment of the present disclosure. FIG. 5 is a cross-sectional view illustrating in more detail a structure of a vibration apparatus according to a first example embodiment of the present disclosure. FIGS. 4 and 5 are cross-sectional views taken along line A-A' of FIG. 3. A detailed configuration of the sound apparatus 1 according to the first example embodiment of the present disclosure is described with reference to FIGS. 2 to 5.

As illustrated in FIG. 2, a sound apparatus 1 may include a vibration device 11, a first vibration member 12, an elastic member 13, and a second vibration member 14. As illustrated in FIGS. 2 and 3, when seen in a plane, the vibration device 11 may include a plate shape having a rectangular shape. In FIGS. 2 to 4, a coordinate-axis is illustrated where directions of two sides of the vibration device 11 are the x-axis and the y-axis, and a direction perpendicular to the x-axis and the y-axis is the z-axis. The vibration device 11 may include two surfaces (or two main surfaces) 11*a* and 11*b* facing each other. For example, in two surfaces 11*a* and 11*b* of the vibration device 11, a negative-direction surface with respect to the z-axis may be referred to as a first surface (or a first main surface) 11*a*, and a positive-direction surface with respect to the z-axis may be referred to as a second surface (or a second main surface) 11*b*.

The first surface 11*a* of the vibration device 11 may be connected to the first vibration member 12. As illustrated in FIGS. 2 and 4, in the first example embodiment of the present disclosure, all of the first surface 11*a* of the vibration device 11 may be connected to the first vibration member 12. However, in another example, a portion of the first surface 11*a* of the vibration device 11 may be connected to the first vibration member 12. The first vibration member 12 may be configured, for example, with one or more materials of metal, resin, glass, hard paper, wood, rubber, plastic, fiber, cloth, paper, leather, carbon, or the like, but embodiments of the present disclosure are not limited thereto. For example, the first vibration member 12 according to another example embodiment of the present disclosure may include a display panel including a pixel configured to display an image, a screen panel on which an image is to be projected from a display apparatus, a lighting panel, a light emitting diode lighting panel, an organic light emitting lighting panel, an inorganic light emitting lighting panel, a signage panel, a vehicular interior material, a vehicular glass window, a vehicular exterior material, a vehicular seat interior material, a vehicular ceiling material, a building ceiling material, a building interior material, a building glass window, an aircraft interior material, an aircraft glass window, or a mirror, but embodiments of the present disclosure are not limited thereto.

The second surface 11*b* of the vibration device 11 may be connected to the second vibration member 14 by the elastic member 13. As illustrated in FIGS. 2 and 4, in the first example embodiment of the present disclosure, all of the second surface 11*b* of the vibration device 11 may be connected to the second vibration member 14 by the elastic member 13. For example, the elastic member 13 is connected to all of the second surface 11*b*. However, in another example, a portion (25%, 25-50%, 75% say, up to all) of the second surface 11*b* of the vibration device 11 may be connected to the second vibration member 14 by the elastic member 13. The elastic member 13 may include, for example, a material such as resin or the like. The second vibration member 14 may include, for example, a material such as resin, metal, or the like. For example, resin of the elastic member 13 and the second vibration member 14 may be polyurethane or polyethylene terephthalate (PET), but embodiments of the present disclosure are not limited thereto. For example, metal of the second vibration member 14 may be stainless steel, but embodiments of the present disclosure are not limited thereto. The second surface 11*b* of the vibration device 11 may be attached to the elastic member 13 by a compressed resin material, an adhesive, or an adhesive tape or the like, and the second vibration member 14 may be attached to the elastic member 13 by a compressed resin material, an adhesive, or an adhesive tape or the like, but embodiments of the present disclosure are not limited thereto.

An embodiment of a structure of the vibration device 11 is described in more detail with reference to FIG. 5. FIG. 5 is an example of an enlarged view of each of the vibration device 11 and the first vibration member 12 in terms of the same cross-sectional surface as FIG. 4. Further, FIG. 5 schematically illustrates a circuit diagram of a connection relationship between electrodes included in the vibration device 11, so as to describe a method of providing or inputting a sound signal to the vibration device 11.

The vibration device 11 may include an adhesive layer 111, an electrode 112, a vibration layer 113, an electrode 114, and a protection layer 115. The adhesive layer 111 may be a layer which connects the vibration device 11 to the first vibration member 12. The electrode 112 and the electrode 114 may be disposed with the vibration layer 113 therebetween in a thickness direction (or z-axis) and may be configured to apply a voltage to the vibration layer 113. The protection layer (or a protection member) 115 may protect an upper surface of the electrode 114. In another example, the protection member 115 may be omitted. A polarization direction of the vibration layer 113 may be a positive direction or a negative direction with respect to the z-axis. Further, lines configured to apply a voltage to each electrode may be connected to the electrodes 112 and 114 through soldering or the like.

The material of the vibration layer 113 may include ferroelectric ceramic, having effective piezoelectric properties, such as lead zirconate titanate (PZT)-based materials or the like so as to increase the amount of displacement, but embodiments of the present disclosure are not limited thereto. For example, the material of the vibration layer 113 may be configured as a piezoelectric material of a ceramic-based material capable of implementing a relatively high vibration, or may be configured as a piezoelectric ceramic material having a perovskite-based crystal structure. For example, the material of the vibration layer 113 may have a polycrystalline structure or a single-crystalline structure. For example, the material of the vibration layer 113 may be configured as polycrystalline ceramic or single-crystalline ceramic, but embodiments of the present disclosure are not limited thereto. For example, the vibration layer 113 may be configured as a piezoelectric material including lead (Pb) or a piezoelectric material without lead (Pb). For example, the piezoelectric material including lead (Pb) may include one or more of a lead zirconate titanate (PZT)-based material, a lead zirconate nickel niobate (PZNN)-based material, a lead magnesium niobate (PMN)-based material, a lead nickel niobate (PNN)-based material, a lead zirconate niobate (PZN)-based material, or a lead indium niobate (PIN)-based material, but embodiments of the present disclosure are not limited thereto. For example, the piezoelectric material not including lead (Pb) may include one or more of barium titanate ($BaTiO_3$), calcium titanate ($CaTiO_3$), or strontium titanate ($SrTiO_3$), but embodiments of the present disclosure are not limited thereto. Furthermore, a lateral surface of the vibration device 11 may be covered by an insulator such as resin or the like so as to prevent an electrical short circuit between the vibration device 11 and the other members.

A voltage applied to the vibration device 11 may be based on the sound signal, and thus, may be an AC voltage corresponding to a frequency of a sound which is to be generated. In FIG. 5, an alternating current (AC) voltage may be represented by a circuit sign of an AC power source V. One terminal (or a first terminal) of the AC power source V may be connected to the electrode 112, and the other terminal (or a second terminal) of the AC power source V may be connected to the electrode 114.

When an AC voltage is applied to the electrode 112 (or a first electrode or a first electrode layer) and the electrode 114 (or a second electrode or a second electrode layer), the vibration layer 113 may contract and expand and a periodic stress may be applied to the first vibration member 12, and thus, a vibration may be generated. The vibration device 11 may transfer the periodic stress to the first vibration member 12, and thus, the first vibration member 12 may vibrate (including flexing and/or bending). Accordingly, the first vibration member 12 may vibrate and may generate a vibration and/or a sound based on a sound signal. The electrodes 112 and 114 may be formed of a transparent conductive material, a semitransparent conductive material, or an opaque conductive material. For example, the transparent conductive material or the semitransparent conductive material may include indium tin oxide (ITO) or indium zinc oxide (IZO), but embodiments of the present disclosure are not limited thereto. The opaque conductive material may include an aluminum (Al), a copper (Cu), a gold (Au), a silver (Ag), a molybdenum (Mo), a magnesium (Mg), or the like, or an alloy thereof, but embodiments of the present disclosure are not limited thereto. For example, the electrode 112 may be formed of a different material from the electrode 114.

In the first example embodiment of the present disclosure, in addition to the first vibration member 12, the second vibration member 14 may be connected to the vibration device 11 through the elastic member 13. Accordingly, a portion of a vibration generated by the vibration layer 113 may be transferred to the second vibration member 14. Advantageously, because an undesired resonance of the sound apparatus 1 is diminished or reduced, a peak-dip width of a sound characteristic may be reduced. The peak-dip width reflects the quality of the sound reproduction a wider peak dip reflects a flatness in on the frequency range, which means poorer clarity, poorer accuracy in the sound reproduction. A reduction on the width of the peak dips means an improvement in the low frequency sounds.

Figure 6:
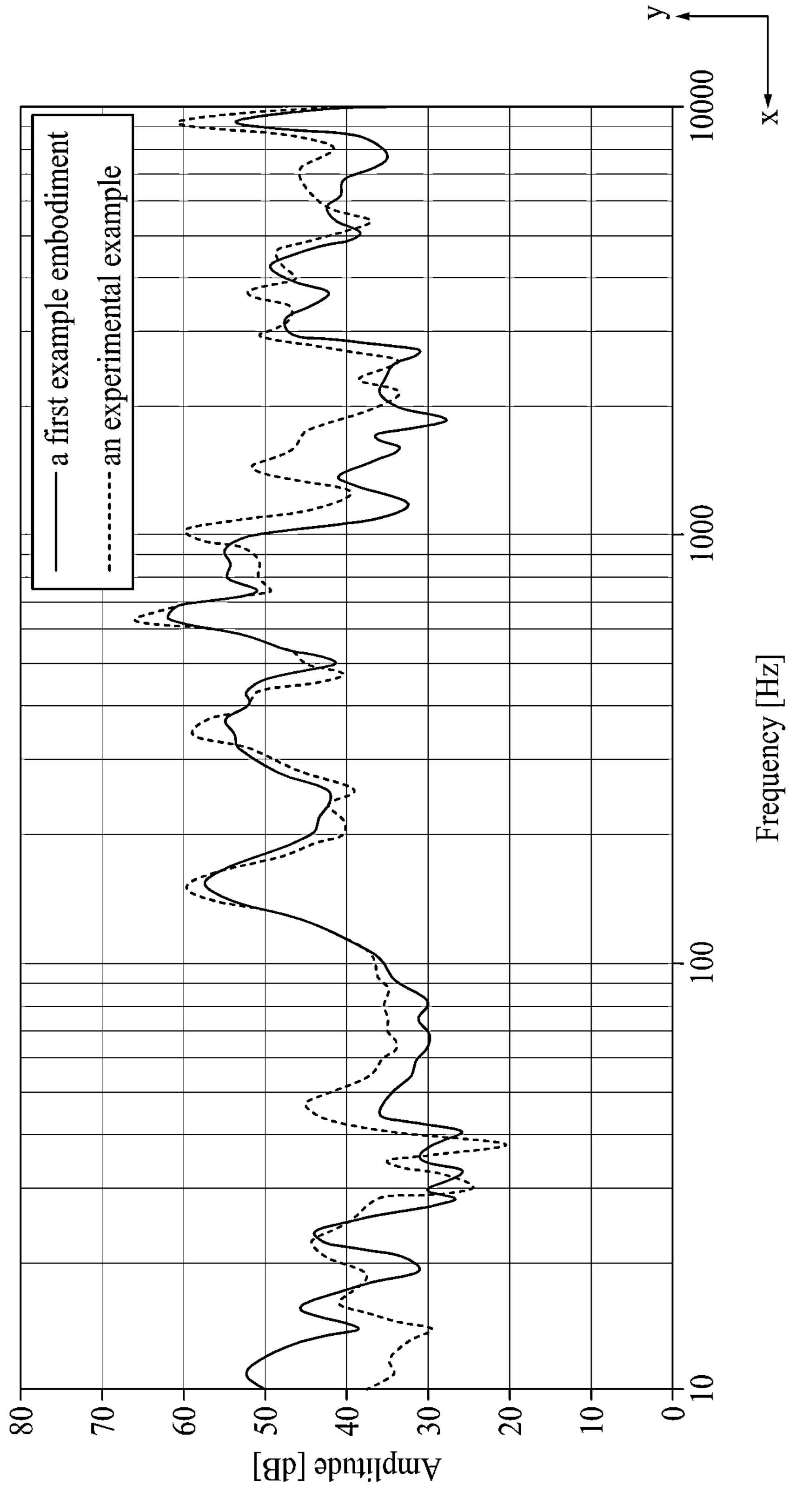
FIG. 6 is a graph showing a sound characteristic of the sound apparatus according to a first example embodiment of the present disclosure and an experimental example.

An effect of reducing a peak-dip width is described in more detail with reference to real measurement data. FIG. 6 is a graph showing a sound characteristic of the sound apparatus according to the first example embodiment of the present disclosure and an experimental example. In FIG. 6, the abscissa-axis represents a frequency in hertz (Hz) based on a log scale, and the ordinate-axis represents a sound pressure level in decibel (dB). In FIG. 6, a curve illustrated by a solid line represents a sound characteristic of the sound apparatus 1 according to the first example embodiment of the present disclosure. In FIG. 6, a curve illustrated by a dotted line represents a sound characteristic of a sound apparatus 1 of an experimental example, which is similar to the first example embodiment, except that the experimental example excludes the elastic member 13 and the second vibration member 14 among elements according to the first example embodiment of the present disclosure.

In FIG. 6, comparing two curves with each other in about 100 Hz to about 1,000 Hz, it may be seen that the peak-dip width of the first example embodiment of the present disclosure is reduced compared to that of the experimental example. Therefore, the second vibration member 14 may be connected to the vibration device 11 through the elastic member 13, and thus, an effect of reducing a peak-dip width may be obtained, so low pitched sounds are better produced. Accordingly, according to the first example embodiment of the present disclosure, a sound apparatus having enhanced sound quality may be provided, where even low pitched sounds are produced more accurately.

Second Example Embodiment

In a second example embodiment of the present disclosure, a modified example of a structure of the elastic member 13 in the sound apparatus 1 according to the first example embodiment of the present disclosure is described. A structure of each of the vibration device 11, the first vibration member 12, and the second vibration member 14 may be substantially the same as the first example embodiment of the present disclosure, and thus, repeated descriptions thereof are omitted.

Figure 7:
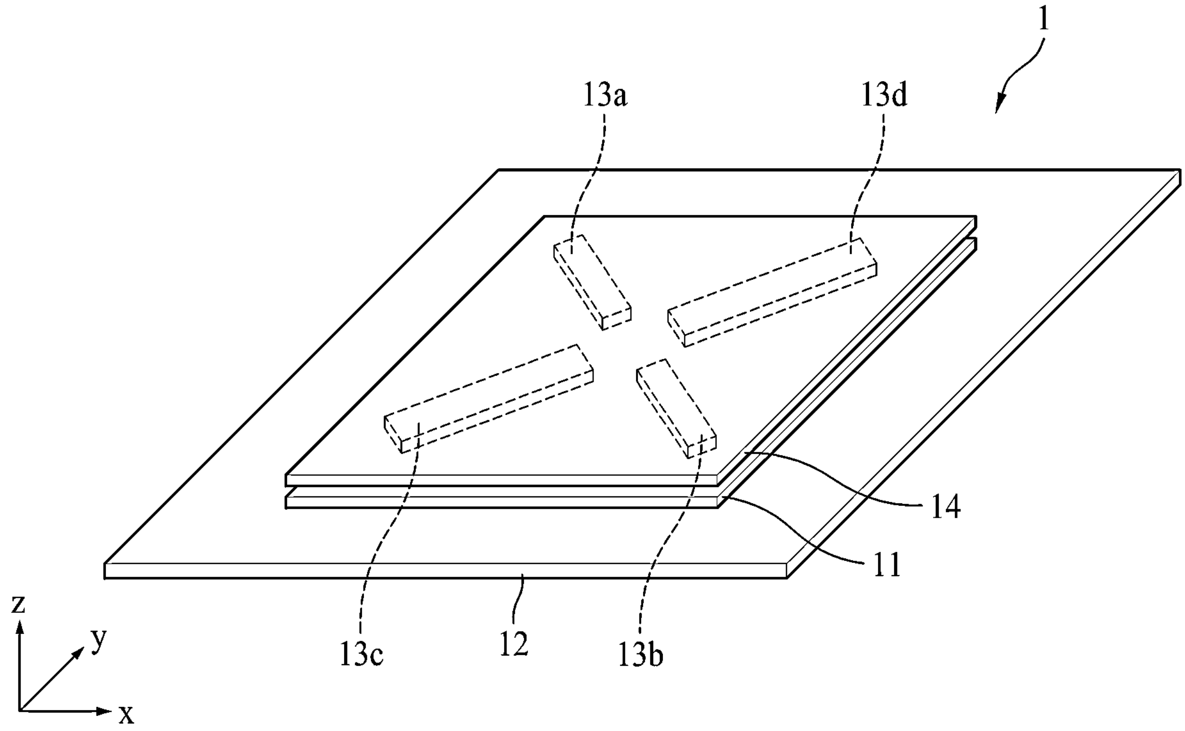
FIG. 7 is a perspective view illustrating a configuration of a sound apparatus according to a second example embodiment of the present disclosure.
Figure 8:
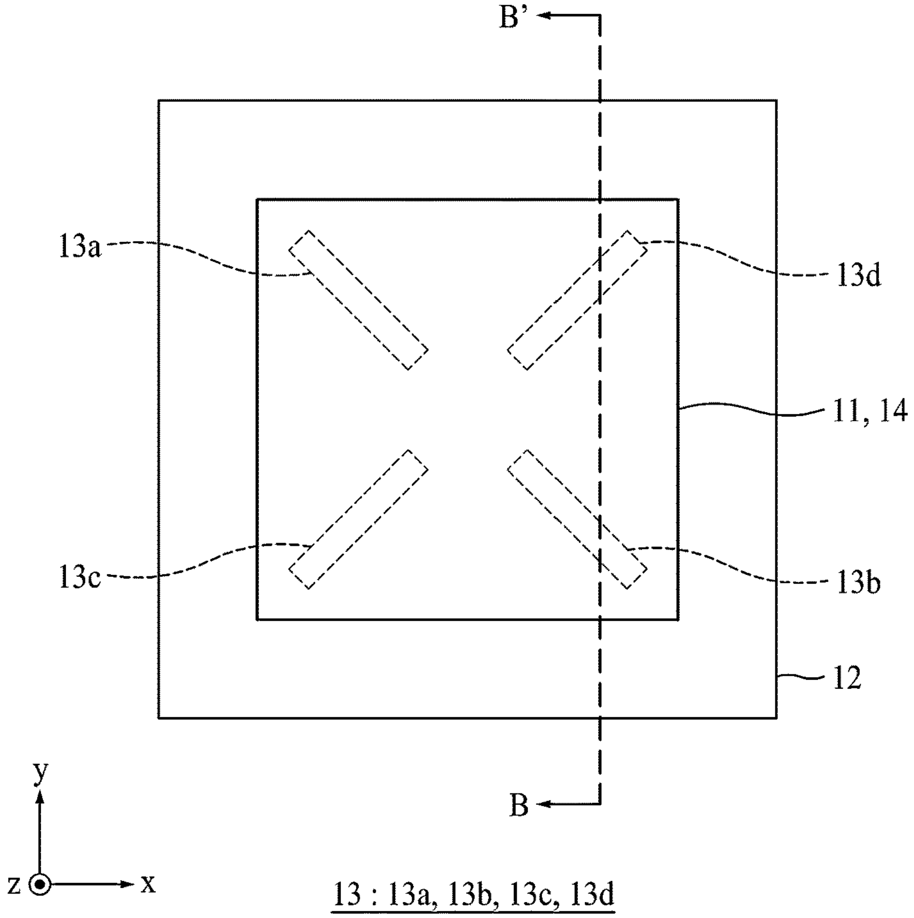
FIG. 8 is a plan view illustrating a configuration of a sound apparatus according to a second example embodiment of the present disclosure.
Figure 9:
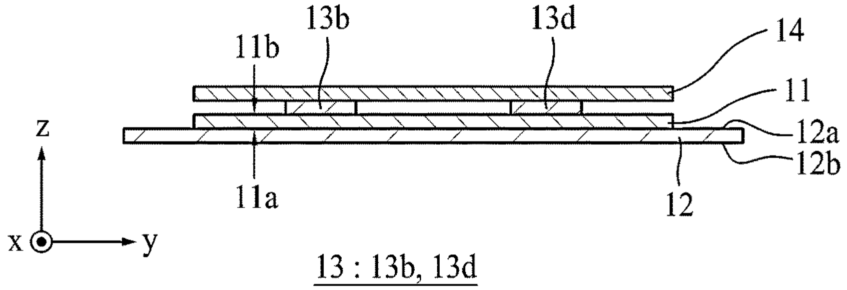
FIG. 9 is a cross-sectional view illustrating a configuration of a sound apparatus according to a second example embodiment of the present disclosure.

FIG. 7 is a perspective view illustrating a configuration of a sound apparatus according to a second example embodiment of the present disclosure. FIG. 8 is a plan view illustrating a configuration of a sound apparatus according to a second example embodiment of the present disclosure. FIG. 9 is a cross-sectional view illustrating a configuration of a sound apparatus according to a second example embodiment of the present disclosure. FIG. 9 is a cross-sectional view taken along line B-B' of FIG. 8. A detailed configuration of the sound apparatus 1 according to the second example embodiment of the present disclosure is described with reference to FIGS. 7 to 9.

As illustrated in FIG. 7, the sound apparatus 1 may include a plurality of elastic members 13. For example, the sound apparatus 1 may include a first elastic member 13*a*, a second elastic member 13*b*, a third elastic member 13*c*, and a fourth elastic member 13*d*. A second surface 11*b* of a vibration device 11 may be connected to a second vibration member 14 through the first elastic member 13*a*, the second elastic member 13*b*, the third elastic member 13*c*, and the fourth elastic member 13*d*. As described above, in the second example embodiment of the present disclosure, each of the first to fourth elastic members 13*a* to 13*d* may be connected to a portion of the second surface 11*b* of the vibration device 11. As another example embodiment of the present disclosure, each of the plurality of elastic members 13 may be connected to a portion of a first surface 11*a* of the vibration device 11.

The plurality of elastic members 13 may be disposed at a region between the vibration device 11 and the second vibration member 14. For example, the first elastic member 13*a*, the second elastic member 13*b*, the third elastic member 13*c*, and the fourth elastic member 13*d* may be disposed at a region between the vibration device 11 and the second vibration member 14. The plurality of elastic members 13 may configure or provide a space (or a gap space, GS) between the vibration device 11 and the second vibration member 14. For example, each of the plurality of elastic members 13 may be disposed to be sloped (or curved) or inclined with respect to a side (or a lateral surface) of the vibration device 11 (or the second vibration member 14), and thus, may configure or provide the space (or the gap space, GS) between the vibration device 11 and the second vibration member 14. The space (or the gap space, GS) may configure or provide a resonance space or volume for a sound wave generated by a vibration of the vibration device 11. Therefore, sound quality may be enhanced (increased amplitude and quality of reproduction). Accordingly, according to the second example embodiment of the present disclosure, a sound apparatus having enhanced sound quality may be provided.

Each of the first elastic member 13*a*, the second elastic member 13*b*, the third elastic member 13*c*, and the fourth elastic member 13*d* may be configured in a cuboid shape (or a rectangular parallelepiped shape). Other shapes are also envisaged such as circular as an example. When seen in a plane from the z-axis direction, the cuboid shape may be configured in a rectangular shape including a long side and a short side. As illustrated in FIG. 7, each of the first elastic member 13*a*, the second elastic member 13*b*, the third elastic member 13*c*, and the fourth elastic member 13*d* may be disposed to be sloped (or curved) or inclined with respect to the side (or the lateral surface) of the vibration device 11 (or the second vibration member 14). For example, when seen in a plane from the z-axis direction, a long side of each of the first elastic member 13*a*, the second elastic member 13*b*, the third elastic member 13*c*, and the fourth elastic member 13*d* may be extended in a direction from one corner of the vibration device 11 to a center of the vibration device 11. The first elastic member 13*a* and the second elastic member 13*b* may be disposed at positions which are symmetric with each other with respect to the center of the vibration device 11. The third elastic member 13*c* and the fourth elastic member 13*d* may be disposed at positions which are symmetric with each other with respect to the center of the vibration device 11. For example, the first elastic member 13*a*, the second elastic member 13*b*, the third elastic member 13*c*, and the fourth elastic member 13*d* may be disposed to be symmetric with one another four times with respect to the center of the vibration device 11. As described above, in the second example embodiment of the present disclosure, a plurality of elastic members 13 may be disposed to have high symmetry therebetween, based on the symmetry of a vibration. By choosing symmetry in the placement of the elastic members, there is a reduction in interference from different vibration sources. Further, in the second example embodiment of the present disclosure, an example is illustrated where there are four symmetries because the number of elastic members 13 is four, but the plurality of elastic members 13 may have a rotational symmetry based on the number and arrangement of elastic members 13. Thus, an undesirous partial vibration (e.g., is only member 13*b* is vibrated and not member 13*d*) may be minimized, and/or uniformity of vibration may be increased.

Figure 10:
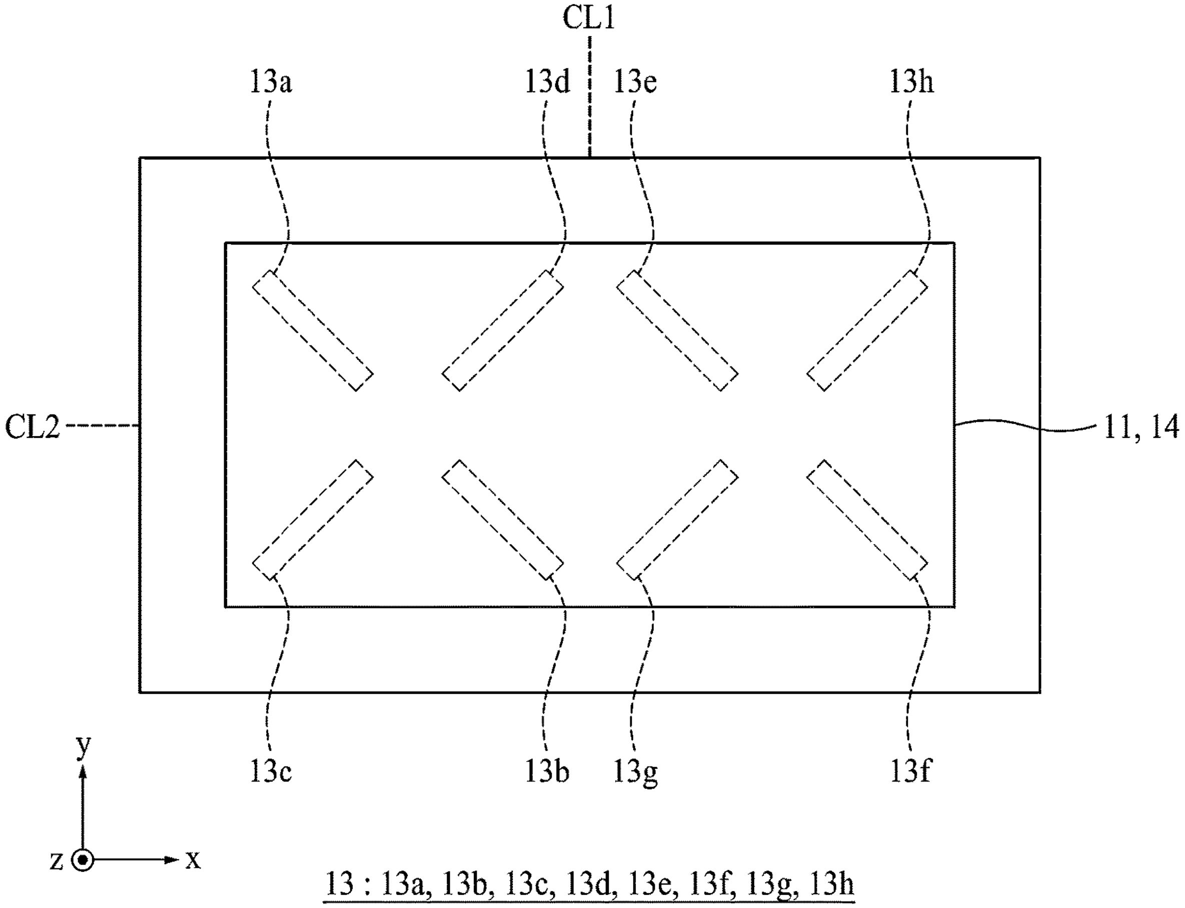
FIG. 10 is a plan view illustrating another example of a configuration of a sound apparatus according to a second example embodiment of the present disclosure.

FIG. 10 is a plan view illustrating another example of a configuration of a sound apparatus 1 according to the second example embodiment of the present disclosure. FIG. 10 is a modified example where the number of elastic members 13 is eight. As illustrated in FIG. 10, the sound apparatus 1 may include a first elastic member 13*a*, a second elastic member 13*b*, a third elastic member 13*c*, a fourth elastic member 13*d*, a fifth elastic member 13*e*, a sixth elastic member 13*f*, a seventh elastic member 13*g*, and an eighth elastic member 13*h*. The arrangement of the first elastic member 13*a*, the second elastic member 13*b*, the third elastic member 13*c*, and the fourth elastic member 13*d* may be substantially the same as FIG. 8. The fifth elastic member 13*e*, the sixth elastic member 13*f*, the seventh elastic member 13*g*, and the eighth elastic member 13*h* may have an arrangement structure where the first elastic member 13*a*, the second elastic member 13*b*, the third elastic member 13*c*, and the fourth elastic member 13*d* have moved horizontally in an x-axis direction. As described above, the number of elastic members is not limited thereto. The first elastic member 13*a*, the second elastic member 13*b*, the third elastic member 13*c*, the fourth elastic member 13*d*, the fifth elastic member 13*e*, the sixth elastic member 13*f*, the seventh elastic member 13*g*, and the eighth elastic member 13*h* may be disposed at a region between the vibration device 11 and the second vibration member 14.

The vibration device 11 (or the second vibration member 14) may include a cuboid shape (or a rectangular parallelepiped shape). When seen in a plane from the z-axis direction, the cuboid shape may be configured in a rectangular shape including a long side and a short side. For example, the plurality of elastic members 13 may be grouped into a first group and a second group. For example, the first group may include the first elastic member 13*a*, the second elastic member 13*b*, the third elastic member 13*c*, and the fourth elastic member 13*d* of the plurality of elastic members 13. The second group may include the fifth elastic member 13*e*, the sixth elastic member 13*f*, the seventh elastic member 13*g*, and the eighth elastic member 13*h* of the plurality of elastic members 13. For example, the elastic member of the first group and the elastic member of the second group may be disposed at positions which are symmetric with each other with respect to a first center line CL1 of the vibration device 11. For example, each of the first elastic member 13*a*, the second elastic member 13*b*, the third elastic member 13*c*, and the fourth elastic member 13*d* may be disposed at a position which is symmetric with a corresponding elastic member of the fifth elastic member 13*e*, the sixth elastic member 13*f*, the seventh elastic member 13*g*, and the eighth elastic member 13*h*, with respect to the first center line CL1 of the vibration device 11. For example, each of the first elastic member 13*a*, the fourth elastic member 13*d*, the fifth elastic member 13*e*, and the eighth elastic member 13*h* may be disposed at a position which is symmetric with a corresponding elastic member of the second elastic member 13*b*, the third elastic member 13*c*, the sixth elastic member 13*f*, and the seventh elastic member 13*g*, with respect to a second center line CL2 of the vibration device 11.

In the second example embodiment of the present disclosure, the second vibration member 14 may be connected to a portion of the second surface 11*b* of the vibration device 11 through the elastic member 13. Therefore, the vibration device 11 may be weakly coupled to or connected to the second vibration member 14 by the elastic member 13. Accordingly, in the sound apparatus 1, a resonance frequency may be reduced, and thus, a sound pressure level of a low-pitched sound region (or a low-pitched sound band) of a sound characteristic may increase.

Figure 11:
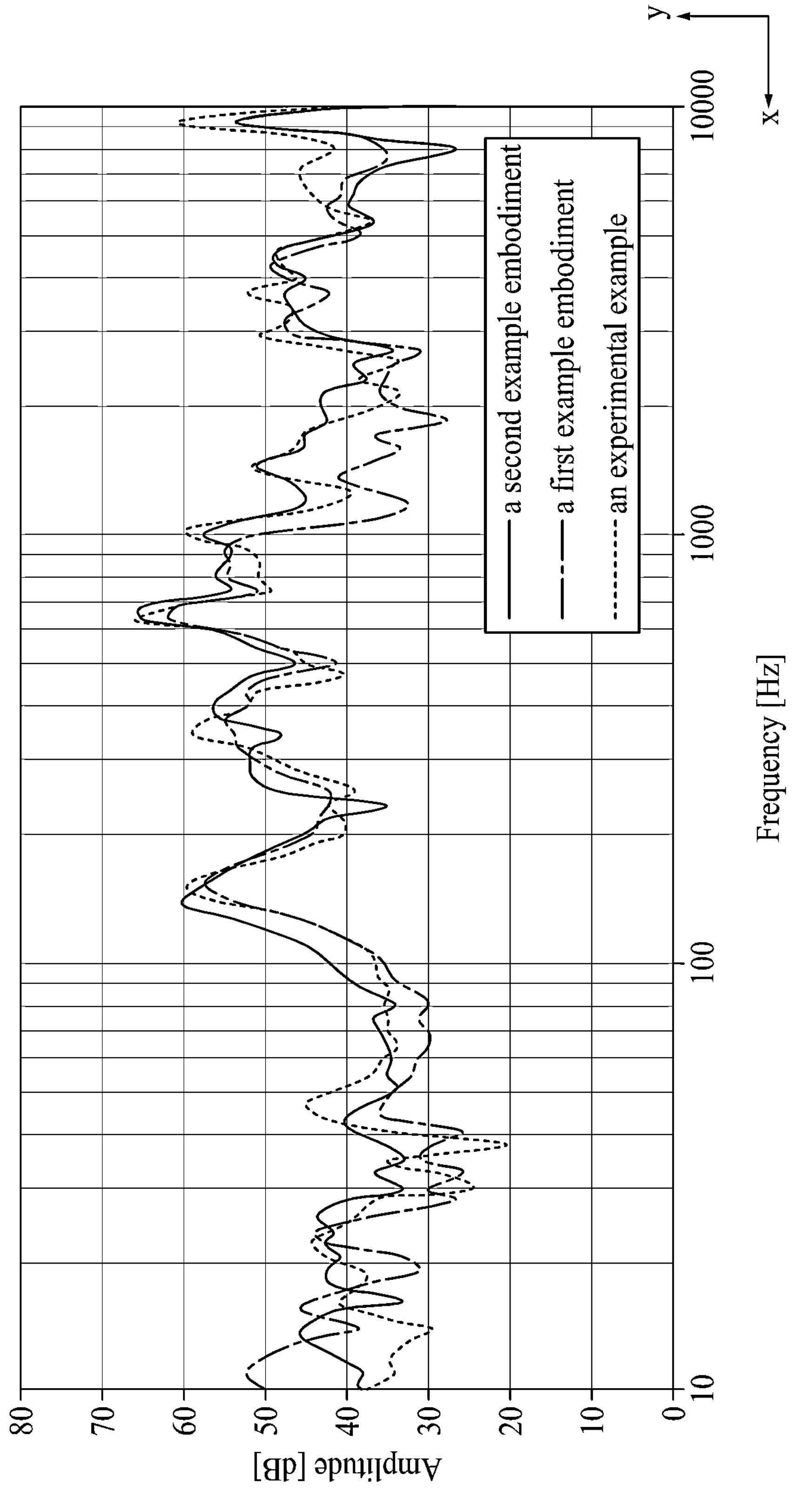
FIG. 11 is a graph showing a sound characteristic of the sound apparatus according to a first example embodiment and a second example embodiment of the present disclosure and an experimental example.

An effect of increasing a sound pressure level of a low-pitched sound region is described in more detail with reference to real measurement data. FIG. 11 is a graph showing a sound characteristic of the sound apparatus 1 according to the first example embodiment and the second example embodiment of the present disclosure and an experimental example. In FIG. 11, a curve illustrated by a solid line represents a sound characteristic of the sound apparatus 1 according to the second example embodiment of the present disclosure. In FIG. 11, a curve illustrated by a dash-single dotted line represents a sound characteristic of the sound apparatus 1 according to the second example embodiment of the present disclosure. In FIG. 11, a curve illustrated by a dotted line represents a sound characteristic of the sound apparatus 1 of an experimental example, which is similar to the first example embodiment, except that the experimental example excludes the elastic member 13 and the second vibration member 14 among elements according to the first example embodiment of the present disclosure. In the measurement data of FIG. 11, the arrangement of the elastic member of the sound apparatus 1 according to the second example embodiment of the present disclosure may be based on the illustration of FIG. 10.

In FIG. 11, comparing three curves around 100 Hz (for example, in a low-pitched sound region such as this, or similar), it may be understood that the sound pressure level of the second example embodiment of the present disclosure is higher than those of the experimental example and the first example embodiment of the present disclosure. Therefore, the second vibration member 14 may be connected to a portion of the second surface of the vibration device 11 through the elastic member 13. Therefore, an effect of increasing a sound pressure level (for example, the amplitude or the amplitude with respect to ambient level) of the low-pitched sound region may be obtained. Accordingly, according to the second example embodiment of the present disclosure, a sound apparatus may be provided where the sound quality and reproduction (clear reproduction without distortion) of the low-pitched (and/or frequency) sound region is further enhanced. Further, as seen in FIG. 11, it is possible to increase a sound pressure level around 1,000 Hz to about 2,000 Hz (for example, in a middle-pitched sound region).

Third Example Embodiment

In a third embodiment of the present embodiment, a modified example of a shape of the elastic member 13 in the sound apparatus 1 according to the second example embodiment of the present disclosure is described. A structure of each of the vibration device 11, the first vibration member 12, and the second vibration member 14 may be substantially the same as the first example embodiment of the present disclosure, and thus, repeated descriptions thereof are omitted.

Figure 12:
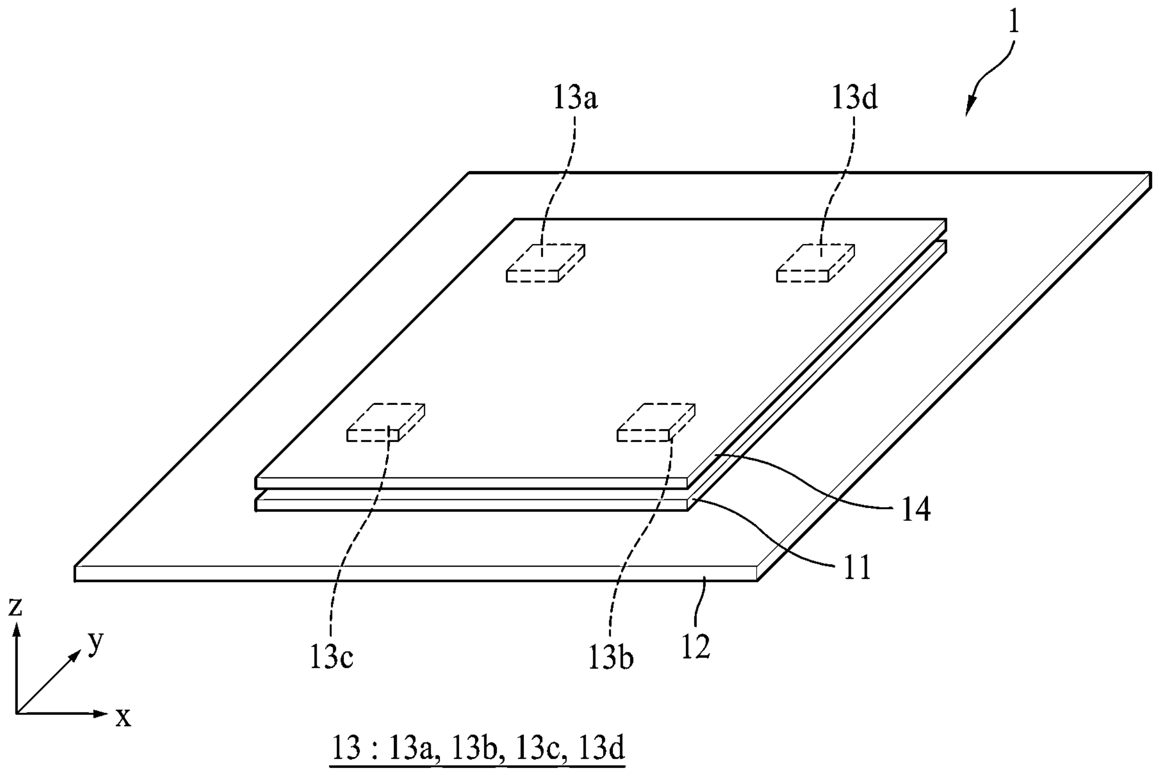
FIG. 12 is a perspective view illustrating a configuration of a sound apparatus according to a third example embodiment of the present disclosure.
Figure 13:
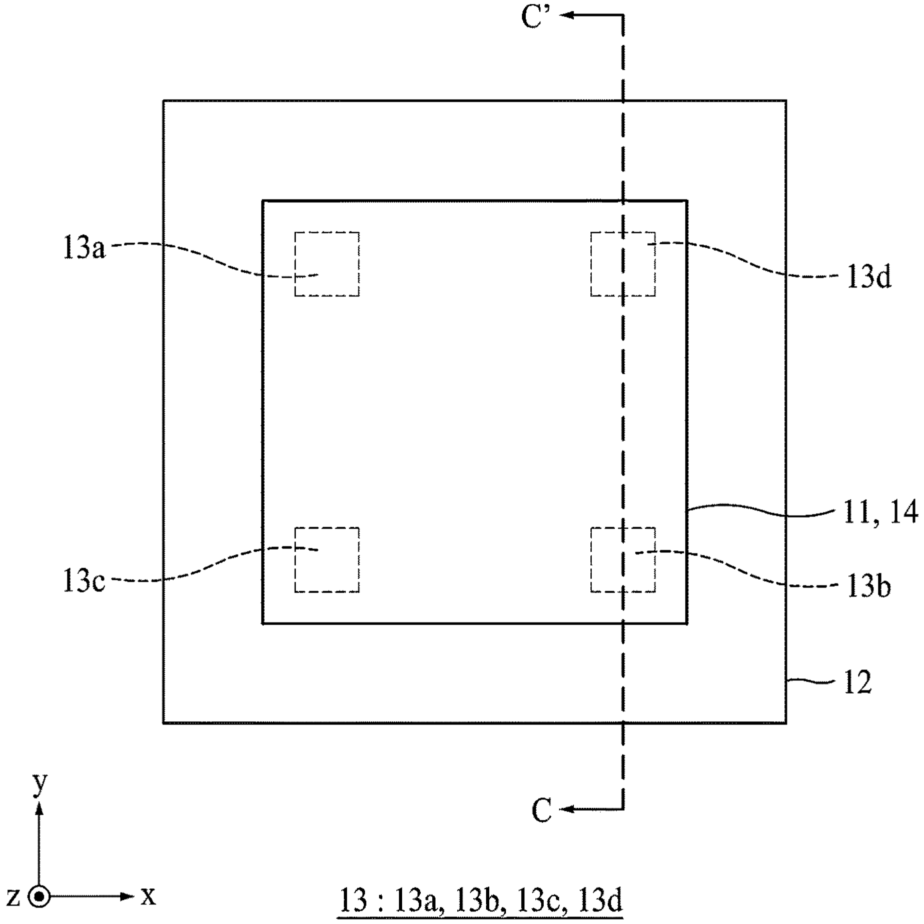
FIG. 13 is a plan view illustrating a configuration of a sound apparatus according to a third example embodiment of the present disclosure.
Figure 14:
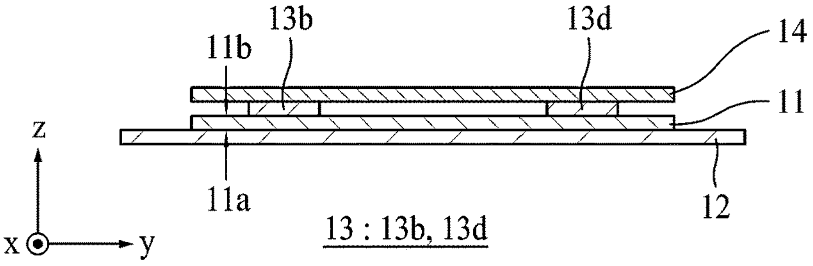
FIG. 14 is a cross-sectional view illustrating a configuration of a sound apparatus according to a third example embodiment of the present disclosure.

FIG. 12 is a perspective view illustrating a configuration of a sound apparatus according to a third example embodiment of the present disclosure. FIG. 13 is a plan view illustrating a configuration of a sound apparatus according to a third example embodiment of the present disclosure. FIG. 14 is a cross-sectional view illustrating a configuration of a sound apparatus according to a third example embodiment of the present disclosure. FIG. 14 is a cross-sectional view taken along line C-C' of FIG. 13. A detailed configuration of the sound apparatus 1 according to the third example embodiment of the present disclosure is described with reference to FIGS. 12 to 14.

As illustrated in FIG. 12, the sound apparatus 1 may include a plurality of elastic members 13. For example, the sound apparatus 1 may include a first elastic member 13*a*, a second elastic member 13*b*, a third elastic member 13*c*, and a fourth elastic member 13*d*. A second surface 11*b* of a vibration device 11 may be connected to a second vibration member 14 through the first elastic member 13*a*, the second elastic member 13*b*, the third elastic member 13*c*, and the fourth elastic member 13*d*. As described above, in the third example embodiment of the present disclosure, one elastic member may be connected to a portion of the second surface 11*b* of the vibration device 11. As an example embodiment of the present disclosure, each of the plurality of elastic members 13 may be connected to a portion of a first surface 11*a* of the vibration device 11. For example, the elastic member 13 may be disposed at a region between the vibration device 11 and the second vibration member 14. For example, the first elastic member 13*a*, the second elastic member 13*b*, the third elastic member 13*c*, and the fourth elastic member 13*d* may be disposed at a region between the vibration device 11 and the second vibration member 14.

Each of the plurality of elastic members 13 may be configured in a square shape. For example, each of the first elastic member 13*a*, the second elastic member 13*b*, the third elastic member 13*c*, and the fourth elastic member 13*d* may be configured in a cuboid shape (or a rectangular parallelepiped shape). When seen in a plane from the z-axis direction, the cuboid shape may be configured in a square shape. Each of the plurality of elastic members 13 may be disposed at a periphery portion of the vibration device 11. The first elastic member 13*a*, the second elastic member 13*b*, the third elastic member 13*c*, and the fourth elastic member 13*d* may be disposed at the periphery portion of the vibration device 11 so as to be symmetric with one another with respect to a center of a vibration device. As illustrated in FIG. 12, the first elastic member 13*a*, the second elastic member 13*b*, the third elastic member 13*c*, and the fourth elastic member 13*d* may be disposed to be symmetric with one another at four corners of the vibration device 11, respectively. For example, the first elastic member 13*a*, the second elastic member 13*b*, the third elastic member 13*c*, and the fourth elastic member 13*d* may be disposed to be symmetric with one another four times with respect to the center of the vibration device 11. As seen in FIG. 14, the plurality of elastic members are configured or provide a space (or a gap space, GS). The space (or the gap space, GS) is configured to provide a resonance space to augment the sound generated, including and particular, the lower pitch sounds, and enhance the sound quality.

As described above, in the third example embodiment of the present disclosure, the plurality of elastic members 13 may be disposed to have high symmetry therebetween, based on the symmetry of a vibration. Further, in the third example embodiment of the present disclosure, an example is illustrated where there are four symmetries because the number of elastic members 13 is four, but the plurality of elastic members 13 may have a rotational symmetry based on the number and arrangement of elastic members 13 and symmetry between them.

Figure 15:
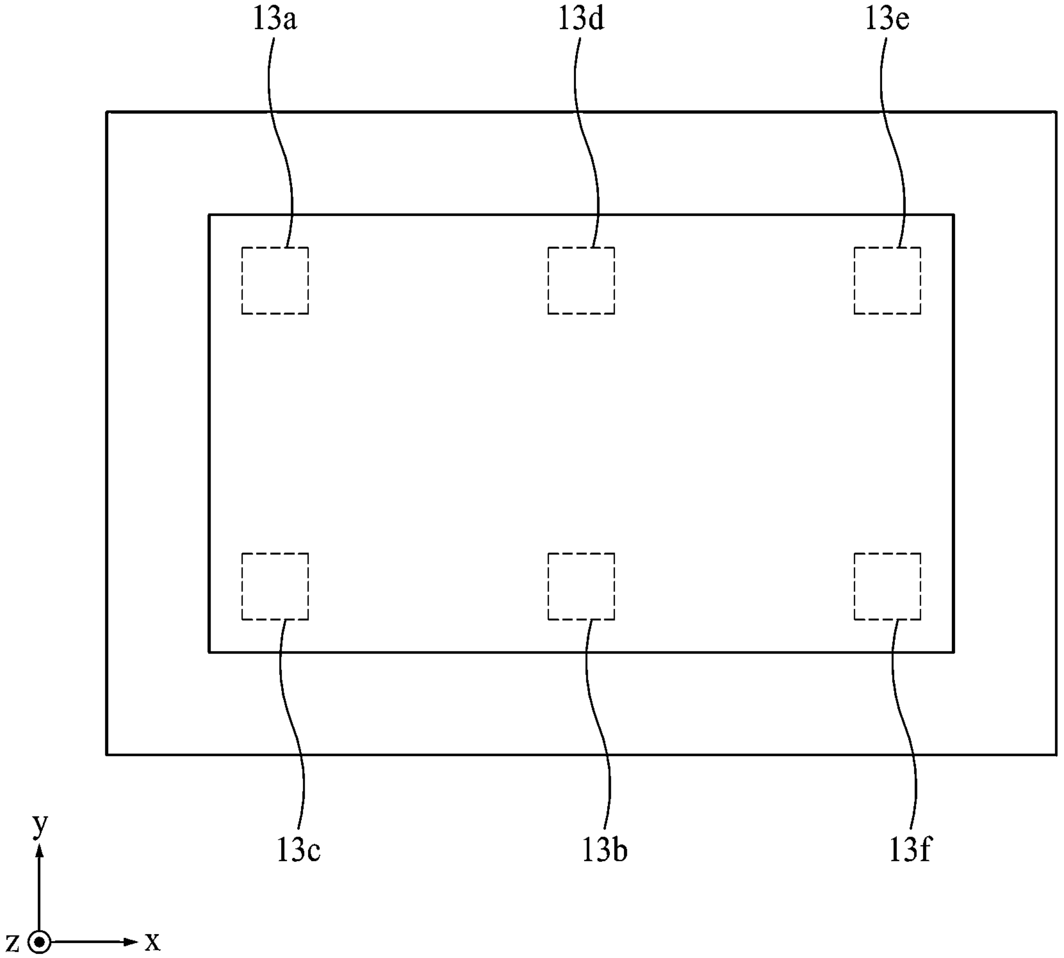
FIG. 15 is a plan view illustrating another example of a configuration of a sound apparatus according to a third example embodiment of the present disclosure.

FIG. 15 is a plan view illustrating another example of a configuration of a sound apparatus 1 according to the third example embodiment of the present disclosure. FIG. 15 is a modified example where the number of elastic members 13 is six. As illustrated in FIG. 15, the sound apparatus 1 may include a first elastic member 13*a*, a second elastic member 13*b*, a third elastic member 13*c*, a fourth elastic member 13*d*, a fifth elastic member 13*e*, and a sixth elastic member 13*f*. The arrangement of the first elastic member 13*a*, the second elastic member 13*b*, the third elastic member 13*c*, and the fourth elastic member 13*d* may be substantially the same as FIG. 13. The fifth elastic member 13*e* and the sixth elastic member 13*f* may have an arrangement structure where the fourth elastic member 13*d* and the second elastic member 13*b* have moved horizontally in an x-axis direction.

Figure 16:
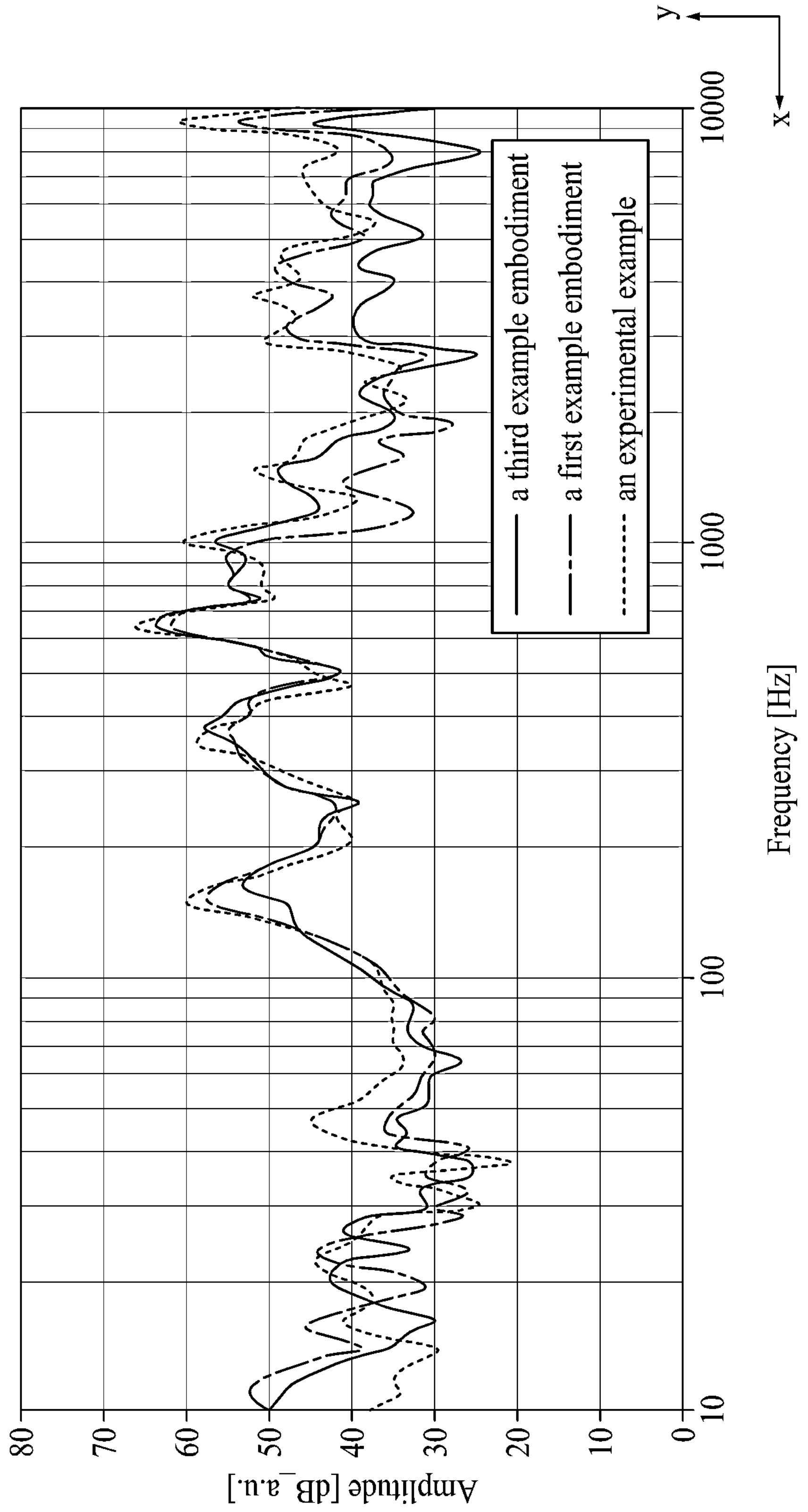
FIG. 16 is a graph showing a sound characteristic of the sound apparatus according to a first example embodiment and a third example embodiment of the present disclosure and an experimental example.

The third example embodiment of the present disclosure may obtain substantially the same effect as the second example embodiment of the present disclosure. An effect of the third example embodiment of the present disclosure is described in more detail with reference to real measurement data. FIG. 16 is a graph showing a sound characteristic of the sound apparatus 1 according to the first example embodiment and the third example embodiment of the present disclosure and an experimental example. In FIG. 16, a curve illustrated by a solid line represents a sound characteristic of the sound apparatus 1 according to the third example embodiment of the present disclosure. In FIG. 16, a curve illustrated by a dash-single dotted line represents a sound characteristic of the sound apparatus 1 according to the first example embodiment of the present disclosure. In FIG. 16, a curve illustrated by a dotted line represents a sound characteristic of the sound apparatus 1 of an experimental example, which is similar to the third example embodiment, except that the experimental example excludes the elastic member 13 and the second vibration member 14 among elements according to the third example embodiment of the present disclosure. In the measurement data of FIG. 16, the arrangement of the elastic member of the sound apparatus 1 according to the third example embodiment of the present disclosure may be based on the illustration of FIG. 15.

In FIG. 16, comparing three curves around 100 Hz (for example, in a low-pitched sound region), it may be seen that the sound pressure level of the third example embodiment of the present disclosure is higher than those of the experimental example and the first example embodiment of the present disclosure. As described above, the second vibration member 14 may be connected to a portion of the second surface 11*b* of the vibration device 11 through the elastic member 13, and thus, an effect of increasing a sound pressure level of the low-pitched sound region may be obtained. Accordingly, according to the third example embodiment of the present disclosure, a sound apparatus may be provided where the sound quality of the low-pitched sound region is further enhanced. Further, as seen in FIG. 16, an effect of reducing a peak-dip width (as previously described) in about 600 Hz to about 1,000 Hz may be obtained.

Fourth Example Embodiment

In a fourth example embodiment of the present disclosure, a modified example of a structure of the second vibration member 14 in the sound apparatus 1 according to the third example embodiment of the present disclosure is described. A structure of each of the vibration device 11, the first vibration member 12, the second vibration member 14, and the first elastic member 13*a* to the fourth elastic member 13*d* may be substantially the same as the third example embodiment of the present disclosure, and thus, repeated descriptions thereof are omitted.

Figure 17:
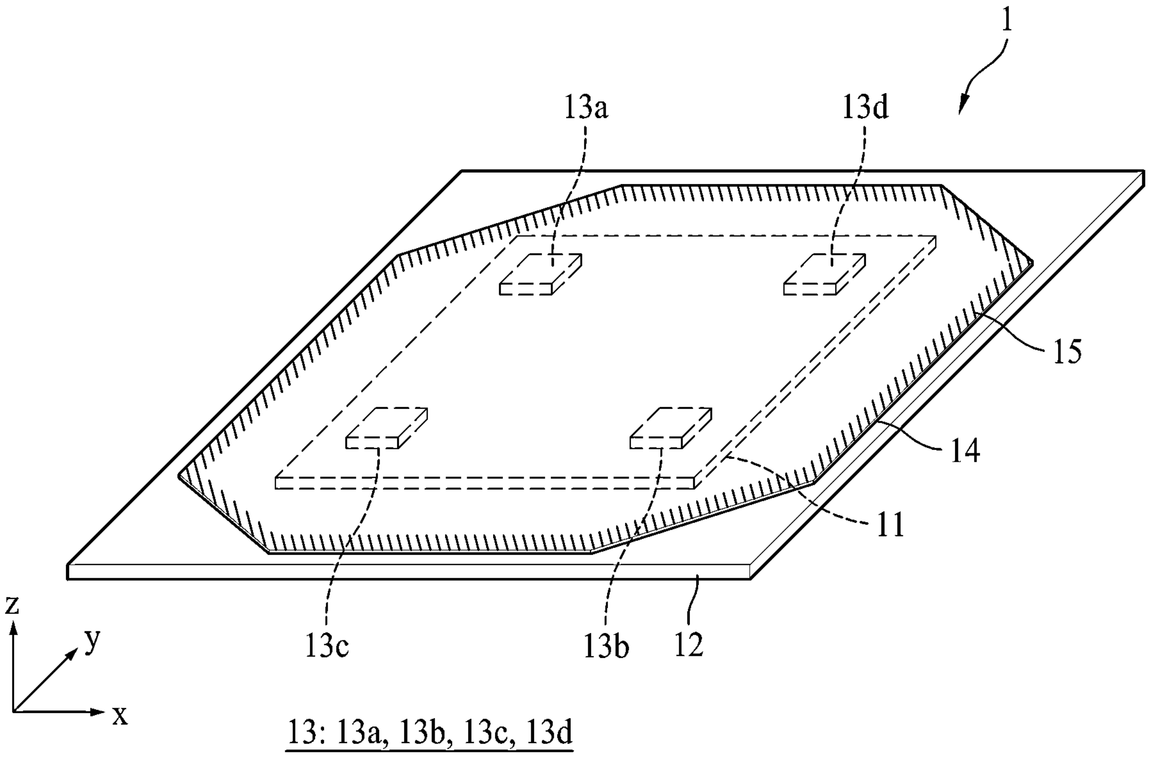
FIG. 17 is a perspective view illustrating a configuration of a sound apparatus according to a fourth example embodiment of the present disclosure.
Figure 18:
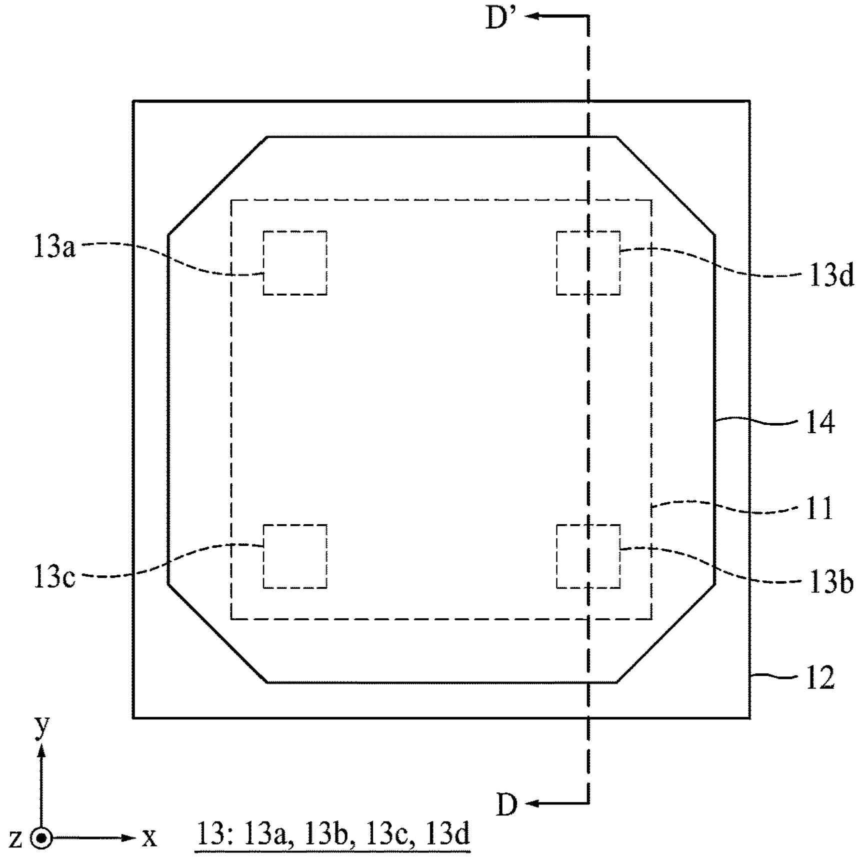
FIG. 18 is a plan view illustrating a configuration of a sound apparatus according to a fourth example embodiment of the present disclosure.
Figure 19:
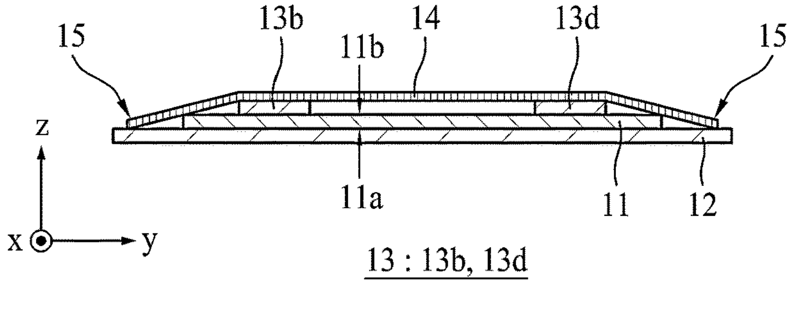
FIG. 19 is a cross-sectional view illustrating a configuration of a sound apparatus according to a fourth example embodiment of the present disclosure.

FIG. 17 is a perspective view illustrating a configuration of a sound apparatus according to a fourth example embodiment of the present disclosure. FIG. 18 is a plan view illustrating a configuration of a sound apparatus according to a fourth example embodiment of the present disclosure. FIG. 19 is a cross-sectional view illustrating a configuration of a sound apparatus according to a fourth example embodiment of the present disclosure. FIG. 19 is a cross-sectional view taken along line D-D' of FIG. 18. A detailed configuration of a sound apparatus 1 according to the fourth example embodiment of the present disclosure is described with reference to FIGS. 17 to 19.

As illustrated in FIGS. 17 and 18, in the fourth example embodiment of the present disclosure, a second vibration member 14 may have a size (or a width) which is greater than that of a vibration device 11. The second vibration member 14 may be extended to an outer portion of the vibration device 11. For example, when seen in a plane from a z-axis direction, the second vibration member 14 may be configured in an octagonal shape, and the second vibration member 14 may be extended to the outer portion of the vibration device 11. As illustrated in FIGS. 17 and 19, an end portion (or one side or one portion) of the second vibration member 14 may be connected to the first vibration member 12 at an adhesive part (or adhesive portion) 15. For example, the end portion (or one side or one portion) of the second vibration member 14 may be connected to the first vibration member 12 by the adhesive part 15. In FIG. 17, a hatching portion of the adhesive part 15 may represent a region where the second vibration member 14 is adhered to or attached to a first vibration member 12. The adhesive part 15 may include, for example, an adhesive, an adhesive resin, an adhesive tape, a double-sided foam tape, a double-sided adhesive pad, or a double-sided adhesive foam pad, but embodiments of the present disclosure are not limited thereto. The second vibration member 14 may include a thin and flexible resin such as polyurethane or PET or the like, but embodiments of the present disclosure are not limited thereto. As illustrated in FIG. 19, the second vibration member 14 may include a different shape at an end portion (or one side or one portion) of the elastic member 13. For example, when seen at a cross-sectional surface, the second vibration member 14 may include a curved shape where around the end portion thereof is curved. For example, the first vibration member 12 may be extended to an outer portion of the vibration device 11. For example, when seen at a cross-sectional surface, the first vibration member 12 may include a curved shape where around the end portion thereof is curved. For example, an end portion (or one side or one portion) of the firs vibration member 12 may be connected to the second vibration member 14 at an adhesive part (or adhesive portion) 15. Thus, the end portion (or one side or one portion) of the firs vibration member 12 and the end portion (or one side or one portion) of the second vibration member 14 may be connected to each other, and thus, a space (or a gap space, GS) may be formed (or configured) between the first vibration member 12 and the second vibration member 14 as seen in the Figures. The curving creates the resonance space, as seen in FIG. 19, both GS and the triangular shaped spaces to the outer sides of 13*b* and 13*d* as shown in FIG. 19. For example, the first elastic member 13*a* and the fourth elastic member 13*d* may be disposed at a region between the vibration device 11 and the second vibration member 14.

Based on such a configuration, a space (or a gap space) may be formed (or configured) between the first vibration member 12 and the second vibration member 14. For example, a closed space may be formed (or configured) between the first vibration member 12 and the second vibration member 14. The closed space may form or configure a resonance space of a sound wave generated based on a vibration of the vibration device 11. Therefore, sound quality may be enhanced as previously described. Accordingly, according to the fourth example embodiment of the present disclosure, a sound apparatus having enhanced sound quality may be provided.

Fifth Example Embodiment

In a fifth example embodiment of the present disclosure, a modified example of the arrangement of the adhesive part 15 in the sound apparatus 1 according to the fourth example embodiment of the present disclosure is described. A structure of each of the vibration device 11, the first vibration member 12, and the first elastic member 13*a* to the fourth elastic member 13*d* may be substantially the same as the fourth example embodiment of the present disclosure, and thus, repeated descriptions thereof are omitted.

Figure 20:
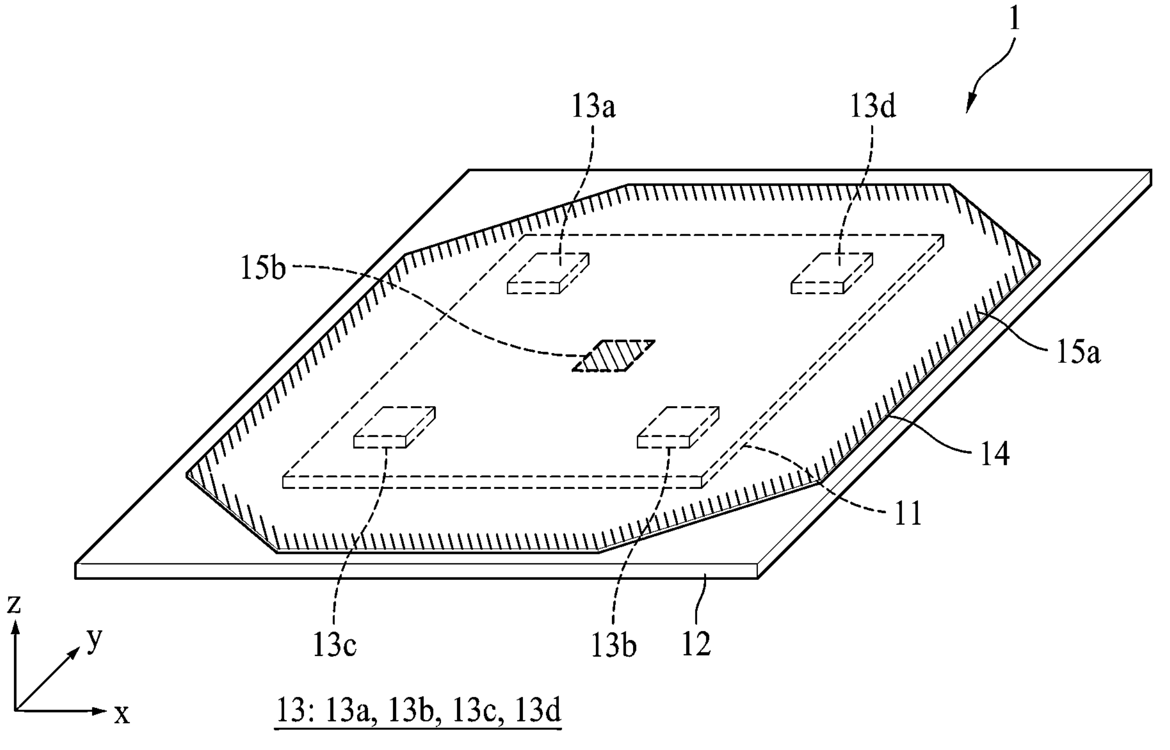
FIG. 20 is a perspective view illustrating a configuration of a sound apparatus according to a fifth example embodiment of the present disclosure.
Figure 21:
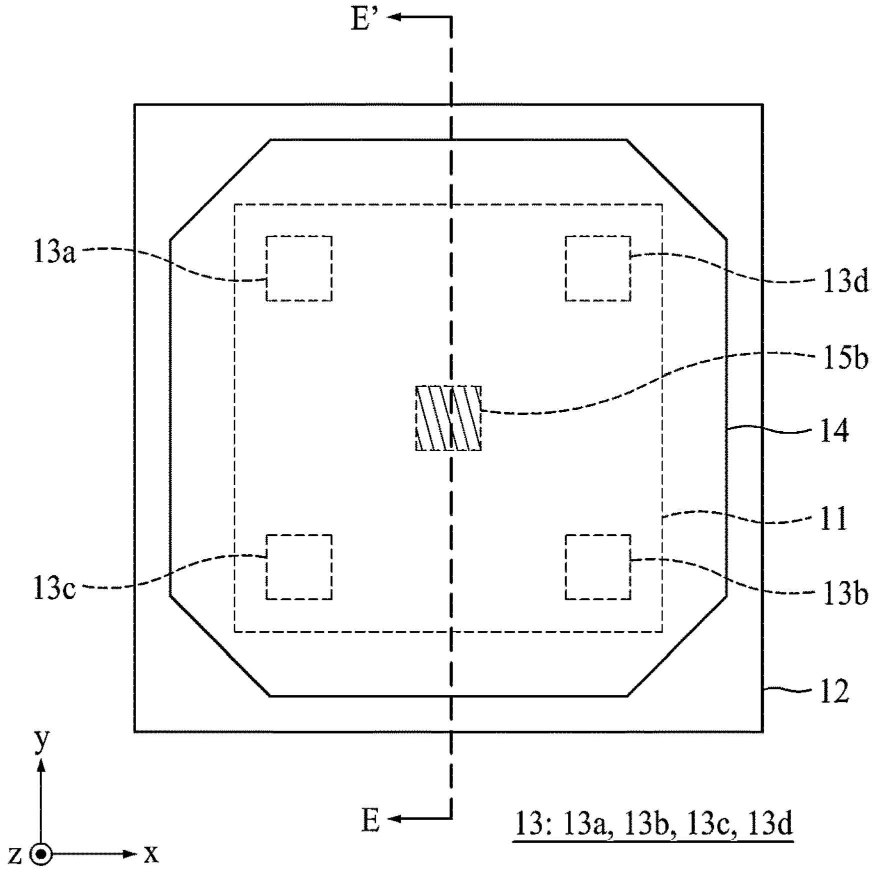
FIG. 21 is a plan view illustrating a configuration of a sound apparatus according to a fifth example embodiment of the present disclosure.
Figure 22:
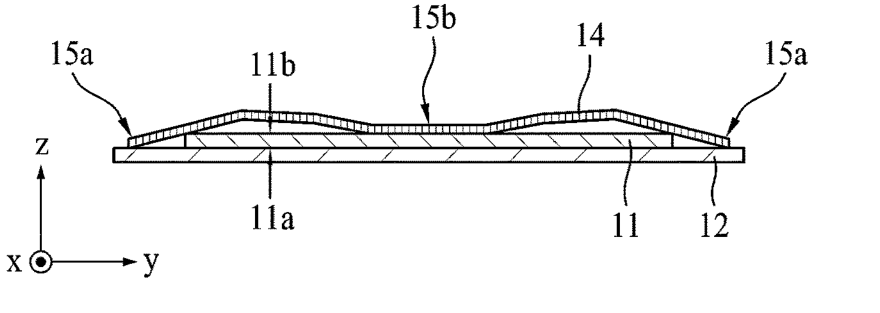
FIG. 22 is a cross-sectional view illustrating a configuration of a sound apparatus according to a fifth example embodiment of the present disclosure.

FIG. 20 is a perspective view illustrating a configuration of a sound apparatus according to a fifth example embodiment of the present disclosure. FIG. 21 is a plan view illustrating a configuration of a sound apparatus according to a fifth example embodiment of the present disclosure. FIG. 22 is a cross-sectional view illustrating a configuration of a sound apparatus according to a fifth example embodiment of the present disclosure. FIG. 22 is a cross-sectional view taken along line E-E' of FIG. 21. A detailed configuration of a sound apparatus 1 according to the fifth example embodiment of the present disclosure is described with reference to FIGS. 20 to 22.

As illustrated in FIGS. 20 and 21, in the fifth example embodiment of the present disclosure, when seen in a plane from a z-axis direction, a second vibration member 14 may be configured in an octagonal shape, and the second vibration member 14 may be extended to an outer portion of a vibration device 11. As illustrated in FIGS. 20 and 22, an end portion (or a periphery portion) of the second vibration member 14 may be connected to a first vibration member 12 at an adhesive part (or a first adhesive part) 15*a*. Further, a center portion of the second vibration member 14 may be connected to a second surface 11*b* of the vibration device 11 at an adhesive part (or a second adhesive part) 15*b*. In FIG. 20, a hatching portion of the adhesive part 15*a* may represent a region where the second vibration member 14 is adhered to or attached to the first vibration member 12. For example, the adhesive part 15*b* may be a connection portion between the second surface 11*b* of the vibration device 11 and the second vibration member 14. The adhesive part 15 may include, for example, an adhesive, an adhesive resin, an adhesive tape, a double-sided foam tape, a double-sided adhesive pad, or a double-sided adhesive foam pad, but embodiments of the present disclosure are not limited thereto. The second vibration member 14 may include a thin and flexible resin such as polyurethane or PET or the like, but embodiments of the present disclosure are not limited thereto. As illustrated in FIG. 22, when seen at a cross-sectional surface, the second vibration member 14 may include around an end portion and around a center portion having different shapes. For example, when seen at a cross-sectional surface, the second vibration member 14 may include a curved shape where around the end portion and around the center portion are curved. For example, the first vibration member 12 may be extended to an outer portion of the vibration device 11. For example, the vibration device 11 may be disposed at a region between the first vibration member 12 and the second vibration member 14.

Based on such a configuration, like the fourth example embodiment of the present disclosure, a space (or a gap space, GS) may be formed (or configured) between the first vibration member 12 and the second vibration member 14. For example, a closed space may be formed (or configured) between the first vibration member 12 and the second vibration member 14. The closed space may form or configure a resonance space of a sound wave generated based on a vibration of the vibration device 11. Therefore, sound quality may be enhanced. Accordingly, according to the fifth example embodiment of the present disclosure, a sound apparatus having enhanced sound quality may be provided.

Figure 23:
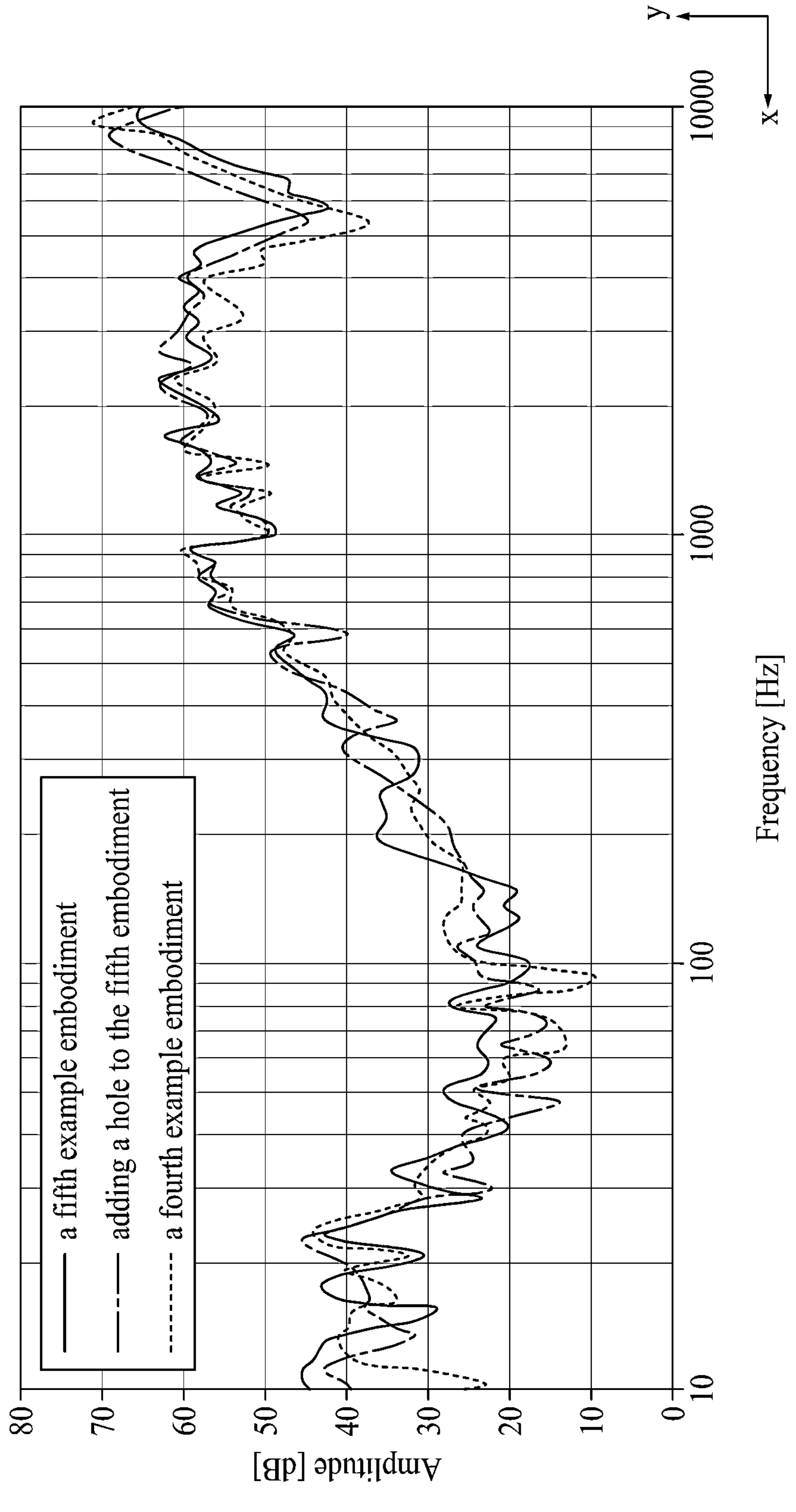
FIG. 23 is a graph showing a sound characteristic of the sound apparatus according to a fourth example embodiment, a fifth example embodiment, and a modified fifth example embodiment of the present disclosure.

An effect of the fifth example embodiment of the present disclosure is described in more detail with reference to real measurement data. FIG. 23 is a graph showing a sound characteristic of the sound apparatus 1 according to the fourth example embodiment of the present disclosure, the fifth example embodiment of the present disclosure, and a modified fifth example embodiment of the present disclosure. In FIG. 23, a curve illustrated by a solid line represents a sound characteristic of the sound apparatus 1 according to the fifth example embodiment of the present disclosure. In FIG. 23, a curve illustrated by a dotted line represents a sound characteristic of the sound apparatus 1 according to the fourth example embodiment of the present disclosure. In FIG. 23, a curve illustrated by a dash-single dotted line represents a sound characteristic of a sound apparatus 1 where a hole is additionally configured at the second vibration member 14 among elements according to the fifth example embodiment of the present disclosure. The sound apparatus 1 where a hole is additionally configured at the second vibration member 14 is described below in a tenth example embodiment of the present disclosure.

In FIG. 23, comparing two curves according to the fourth example embodiment of the present disclosure and the fifth example embodiment of the present disclosure, sound pressure level characteristics may be changed based on a desired frequency in all of a frequency domain where a sound pressure level characteristic of the fourth example embodiment of the present disclosure is high and a frequency domain where a sound pressure level characteristic of the fifth example embodiment of the present disclosure is high. Accordingly, whether to install (or configure) an adhesive part 15*b* between the second surface 11*b* of the vibration device 11 and the second vibration member 14 may be appropriately configured based on a characteristic of the sound apparatus, but embodiments of the present disclosure are not limited thereto.

Substantially likewise, comparing a curve according to the fifth example embodiment of the present disclosure with a curve of a case where a hole is additionally configured at the second vibration member 14, sound pressure level characteristics may be changed based on a desired frequency. Accordingly, whether to install (or configure) a hole at the second vibration member 14 may be appropriately configured based on a characteristic of the sound apparatus, but embodiments of the present disclosure are not limited thereto.

Sixth Example Embodiment

In a sixth example embodiment of the present disclosure, a modified example of a connection method between the vibration device 11 and the first vibration member 12 in the sound apparatus 1 according to the fourth example embodiment of the present disclosure is described. A structure of the vibration device 11, the first vibration member 12, and the first elastic member 13*a* to the fourth elastic member 13*d*, and the second vibration member 14 may be substantially the same as the fourth example embodiment of the present disclosure, and thus, repeated descriptions thereof are omitted.

Figure 24:
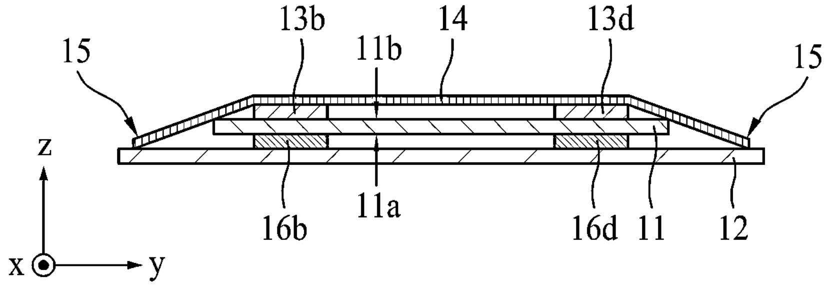
FIG. 24 is a cross-sectional view illustrating a configuration of a sound apparatus according to a sixth example embodiment of the present disclosure.

FIG. 24 illustrates a modified example of a cross-sectional view taken along line D-D' of FIG. 18. As illustrated in FIG. 24, a sound apparatus 1 may further include a plurality of connection members 16. For example, the sound apparatus 1 may further include connection members 16*b* and 16*d*. The connection members 16*b* and 16*d* may be configured to connect a portion of a first surface 11*a* of a vibration device 11 with a first vibration member 12. When seen in a plane from a z-axis direction, the connection members 16*b* and 16*d* may be disposed at positions respectively corresponding to a second elastic member 13*b* and a fourth elastic member 13*d*, and thus, the connection members 16*b* and 16*d* may support regions of the vibration device 11 corresponding to the second elastic member 13*b* and the fourth elastic member 13*d*, respectively. This extra connection provides a more uniform transfer of the vibrations, helping with accurate sound reproduction. The plurality of connection members 16 may respectively overlap a plurality of elastic members 13. For example, the connection members 16*b* and 16*d* may respectively overlap the second elastic member 13*b* and the fourth elastic member 13*d*. For example, the connection members 16*b* and 16*d* may respectively overlap the second elastic member 13*b* and the fourth elastic member 13*d* in a vertical direction (or the z-axis direction). For example, the connection members 16*b* and 16*d* may be formed (or configured) with a space (or a gap space, GS) between the first vibration member 12 and the second vibration member 14. As another example embodiment of the present disclosure, a connection member may be disposed at a position corresponding to each of a first elastic member 13*a* and a third elastic member 13*c*. The connection members 16*b* and 16*d* may be resin such as polyurethane or PET, but embodiments of the present disclosure are not limited thereto. For example, the first vibration member 12 may be extended to an outer portion of the vibration device 11. For example, the vibration device 11 may be disposed at a region between the elastic member 13 and the connection member 16. The second vibration member 14 may include a different shape at an end portion (or one side or one portion) of the elastic member 13. For example, when seen at a cross-sectional surface, around an end portion of the second vibration member 14 may include a curved shape.

Figure 25:
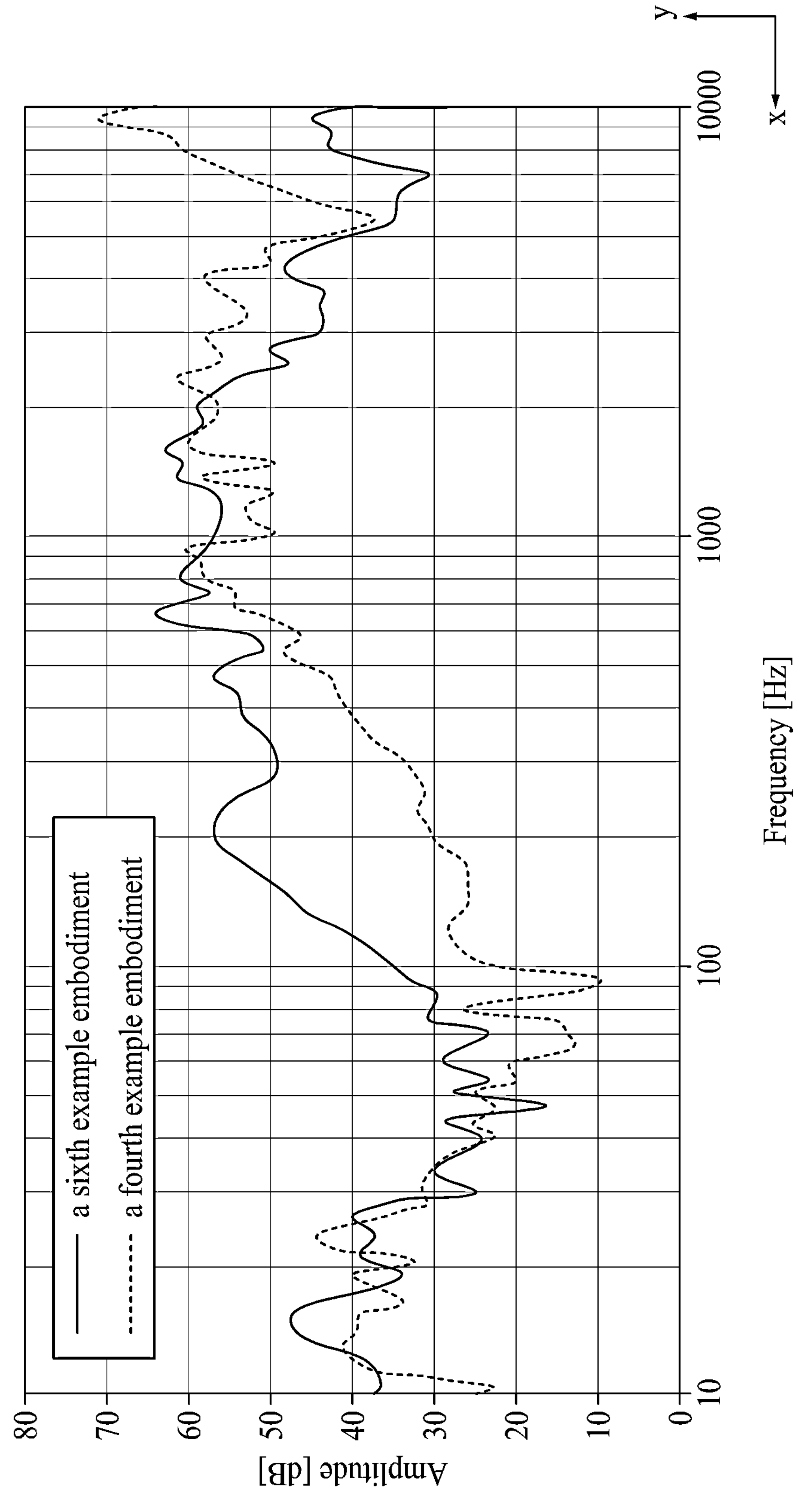
FIG. 25 is a graph showing a sound characteristic of the sound apparatus according to a fourth embodiment and a sixth example embodiment of the present disclosure.

An effect of the sixth example embodiment of the present disclosure is described in more detail with reference to real measurement data. FIG. 25 is a graph showing a sound characteristic of the sound apparatus 1 according to the fourth example embodiment of the present disclosure and the sixth example embodiment of the present disclosure. In FIG. 25, a curve illustrated by a solid line represents a sound characteristic of the sound apparatus 1 according to the sixth example embodiment of the present disclosure. In FIG. 25, a curve illustrated by a dotted line represents a sound characteristic of the sound apparatus 1 according to the fourth example embodiment of the present disclosure.

In FIG. 25, comparing two curves according to the fourth example embodiment of the present disclosure and the sixth example embodiment of the present disclosure, the sixth example embodiment of the present disclosure may have an enhanced sound pressure level at around 100 Hz to 400 Hz, and the fourth example embodiment of the present disclosure may have an enhanced sound pressure level at a range of 2,000 Hz or more, and thus, sound pressure level characteristics may be changed based on a desired frequency. Accordingly, a connection method between the first surface 11*a* of the vibration device 11 and the first vibration member 12 may be appropriately configured based on a characteristic of the sound apparatus, but embodiments of the present disclosure are not limited thereto.

Seventh Example Embodiment

In a seventh example embodiment of the present disclosure, a modified example of a structure of the second vibration member 14 and the first elastic member 13*a* to the fourth elastic member 13*d* in the sound apparatus 1 according to the fourth example embodiment of the present disclosure is described. A structure of the vibration device 11 and the first vibration member 12 may be substantially the same as the fourth example embodiment of the present disclosure, and thus, repeated descriptions thereof are omitted.

Figure 26:
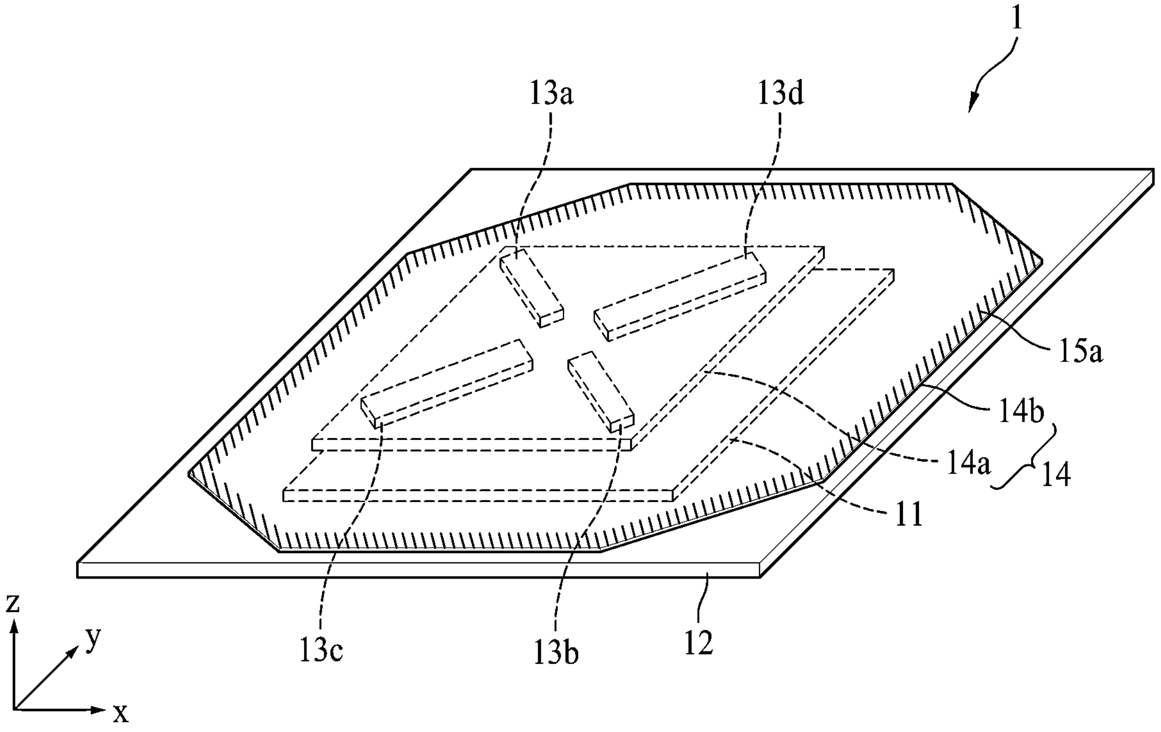
FIG. 26 is a perspective view illustrating a configuration of a sound apparatus according to a seventh example embodiment of the present disclosure.
Figure 27:
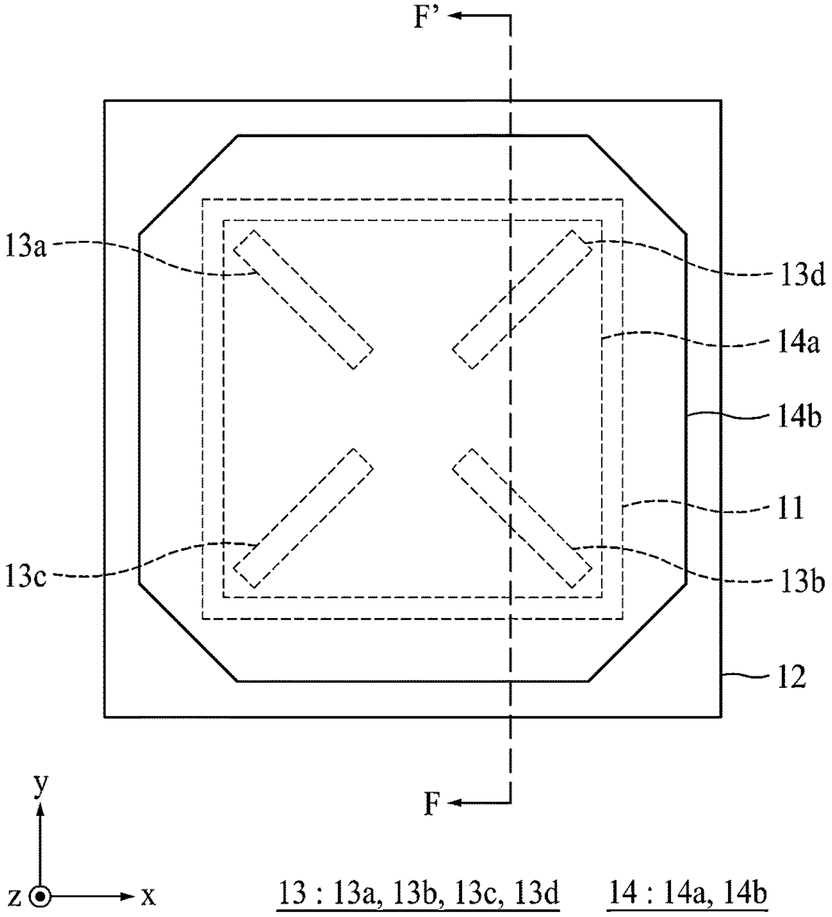
FIG. 27 is a plan view illustrating a configuration of a sound apparatus according to a seventh example embodiment of the present disclosure.
Figure 28:
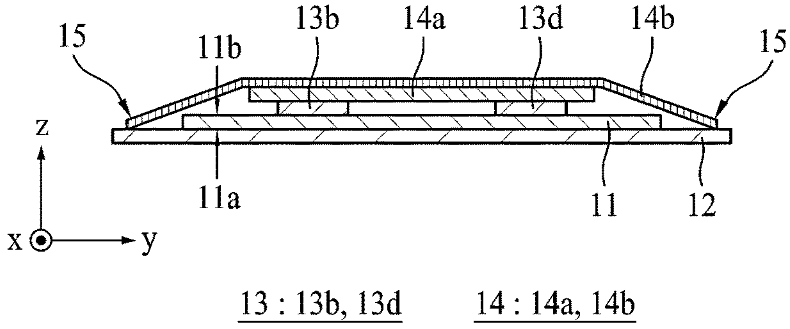
FIG. 28 is a cross-sectional view illustrating a configuration of a sound apparatus according to a seventh example embodiment of the present disclosure.

FIG. 26 is a perspective view illustrating a configuration of a sound apparatus according to a seventh example embodiment of the present disclosure. FIG. 27 is a plan view illustrating a configuration of a sound apparatus according to a seventh example embodiment of the present disclosure. FIG. 28 is a cross-sectional view illustrating a configuration of a sound apparatus according to a seventh example embodiment of the present disclosure. FIG. 28 is a cross-sectional view taken along line F-F' of FIG. 27. A detailed configuration of a sound apparatus 1 according to the seventh example embodiment of the present disclosure is described with reference to FIGS. 26 to 28.

As illustrated in FIGS. 26 to 28, in the seventh example embodiment of the present disclosure, the second vibration member 14 described above in the fourth example embodiment of the present disclosure may be configured with second vibration members 14*a* and 14*b*. For example, a second vibration member according to the seventh example embodiment of the present disclosure may be configured with a second vibration member 14*a* which is a first portion and a second vibration member 14*b* which is a second portion, and for example, may be configured with two portions. For example, the second vibration member 14 may be configured with two sub-vibration members 14*a* and 14*b*. For example, the second vibration member 14 may include (i) a first sub-vibration member 14*a* connected to a plurality of elastic members 13, and (ii) a second sub-vibration member 14*b*, which covers the first sub-vibration member 14*a* and is connected to the first vibration member 12.

Moreover, shapes of a first elastic member 13*a*, a second elastic member 13*b*, a third elastic member 13*c*, and a fourth elastic member 13*d* may be substantially the same as the second example embodiment of the present disclosure. A second surface 11*b* of the vibration device 11 may be connected to the second vibration member 14*a* (or the first sub-vibration member) through the first elastic member 13*a*, the second elastic member 13*b*, the third elastic member 13*c*, and the fourth elastic member 13*d*. The second vibration member 14*a* may be connected to the second vibration member 14*b* (or the second sub-vibration member) at a surface (or a different surface) opposite to a side connected to the first elastic member 13*a*, the second elastic member 13*b*, the third elastic member 13*c*, and the fourth elastic member 13*d*. An end portion (or a periphery portion) of the second vibration member 14*b* may be connected to the first vibration member 12 at an adhesive part 15. A structure of the second vibration member 14*b* may be substantially equal to the second vibration member 14 according to the fourth example embodiment of the present disclosure. Furthermore, when seen in a plane from a z-axis direction, the second vibration member 14*a* may be smaller than the vibration device 11. For example, the first vibration member 12 may be extended to an outer portion of the vibration device 11 to have a larger size than the second vibration member 14*a* and the vibration device 11 or to attach the second vibration member 14*b* to the first vibration member 12. For example, the vibration device 11 may be disposed at a region between the elastic member 13 and the first vibration member 12. For example, the elastic member 13 may be disposed at a region between the vibration device 11 and the second vibration member 14. An end portion (or one side or one portion) of the second vibration member 14 may include a different shape than a center part in order to connect (or attach) to the first vibration member 12. For example, when seen at a cross-sectional surface, the second vibration member 14 may include a curved shape where around an end portion (or one side or one portion) thereof is curved.

An elastic modulus (or a second elastic modulus) of the second vibration member 14*b* may be less than an elastic modulus (or a first elastic modulus) of the second vibration member 14*a*. The second vibration member 14*b* may include, for example, resin such as polyurethane or PET (relatively low elastic modulus) or the like, but embodiments of the present disclosure are not limited thereto. The second vibration member 14*b* may include, for example, metal such as stainless steel (relatively high elastic modulus). As described above, the second vibration member may be configured with a plurality of materials having different elastic modulus, and thus, the degree of freedom in material selection may be enhanced. There is thus greater flexibility on choice of materials.

As also shown in FIG. 28, the plurality of elastic members are configured or provide a space (or a gap space, GS). The space (or the gap space, GS) is configured to provide a resonance space to augment the sound generated and enhance the sound quality.

Eighth Example Embodiment

In an eighth example embodiment of the present disclosure, a modified example of a connection structure of the second vibration member 14*b* and the first vibration member 12 in the sound apparatus 1 according to the seventh example embodiment of the present disclosure is described. A structure of the vibration device 11, the first vibration member 12, the first elastic member 13*a* to the fourth elastic member 13*d*, and the second vibration member 14*a* may be substantially the same as the seventh example embodiment of the present disclosure, and thus, repeated descriptions thereof are omitted.

Figure 29:
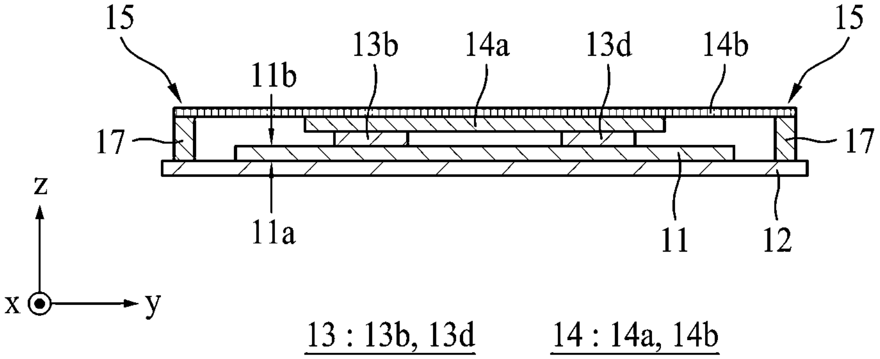
FIG. 29 is a cross-sectional view illustrating a configuration of a sound apparatus according to an eighth example embodiment of the present disclosure.

FIG. 29 illustrates a modified example of a cross-sectional view taken along line F-F' of FIG. 27. As illustrated in FIG. 29, a sound apparatus 1 may further include a connection member 17. The connection member 17 may be configured to connect a second vibration member 14*b* to a first vibration member 12. When seen in a plane from a z-axis direction, the connection member 17 may be disposed at a position corresponding to the adhesive part 15 of FIG. 26. For example, when seen in a plane, the connection member 17 may include a shape which surrounds the vibration device 11. For example, the connection member 17 may be at a region between the first vibration member 12 and the second vibration member 14 and may be configured to surround the vibration device 11. For example, the connection member 17 may be configured at a region between the first vibration member 12 and the second vibration member 14 to form a space which surrounds the vibration device 11 between the first vibration member 12 and the second vibration member 14, with the advantages as previously described. For example, when seen in a plane, the connection member 17 may be configured in an octagonal shape surrounding the vibration device 11. A material of the connection member 17 may include, for example, resin such as polyurethane or PET or metal such as stainless steel, but embodiments of the present disclosure are not limited thereto. The first vibration member 12 may be spaced apart from the adhesive part 15 by the connection member 17, and thus, the second vibration member 14*b* and the first vibration member 12 may be parallel to each other. For example, the second vibration member 14*b* may be flat. Accordingly, the second vibration member 14*b* may be configured or disposed to be flat, and thus, the sound apparatus 1 may be easily manufactured. For example, the first vibration member 12 may be extended to an outer portion of the vibration device 11. For example, the vibration device 11 may be disposed at a region between the elastic member 13 and the first vibration member 12. For example, the elastic member 13 may be disposed at a region between the vibration device 11 and the second vibration member 14.

Ninth Example Embodiment

In a ninth example embodiment of the present disclosure, a modified example of a structure of the second vibration member 14 in the sound apparatus 1 according to the eighth example embodiment of the present disclosure is described. A structure of the vibration device 11, the first elastic member 13*a* to the fourth elastic member 13*d*, and the connection member 17 may be substantially the same as the eighth example embodiment of the present disclosure, and thus, repeated descriptions thereof are omitted. The inclusion of connection 17 between adhesive member 15 and first vibration member 12, additionally creates a space advantageous for sound reproduction.

Figure 30:
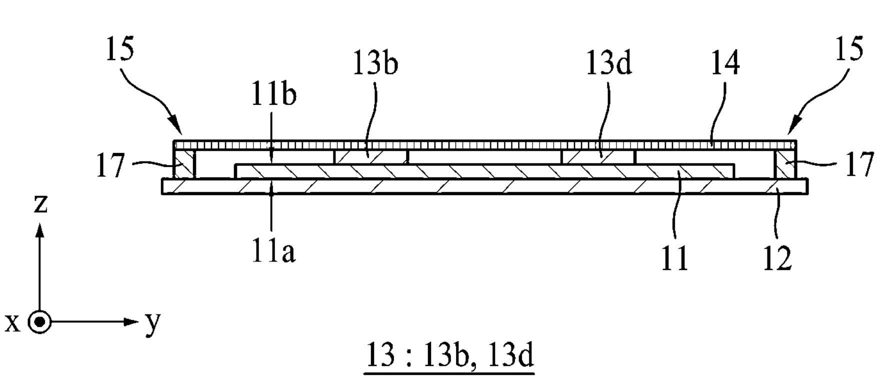
FIG. 30 is a cross-sectional view illustrating a configuration of a sound apparatus according to a ninth example embodiment of the present disclosure.

FIG. 30 illustrates a modified example of a cross-sectional view taken along line F-F' of FIG. 27. As illustrated in FIG. 30, two second vibration members 14*a* and 14*b* according to the eighth example embodiment of the present disclosure may be modified as one second vibration member 14, which allows for easier manufacture, reduced costs, and adds space. For example, the ninth example embodiment of the present disclosure may be configured so that the second vibration member 14*a* in the eighth example embodiment of the present disclosure is omitted. The connection member 17 may be configured to connect the second vibration member 14 to the first vibration member 12. When seen in a plane from a z-axis direction, the connection member 17 may be disposed at a position corresponding to the adhesive part 15 of FIG. 26. The ninth example embodiment of the present disclosure may be implemented so that the number of vibration members is smaller than the eighth example embodiment of the present disclosure. For example, the first vibration member 12 may be extended to an outer portion of the vibration device 11. For example, the vibration device 11 may be disposed at a region between the elastic member 13 and the first vibration member 12. For example, the elastic member 13 may be disposed at a region between the vibration device 11 and the second vibration member 14. Also, the plurality of elastic members are configured or provide a space (or a gap space, GS). The space (or the gap space, GS) is configured to provide a resonance space to augment the sound generated and enhance the sound quality.

Tenth Example Embodiment

In a tenth example embodiment of the present disclosure, a modified example of a structure of the second vibration member 14*b* in the sound apparatus 1 according to the eighth example embodiment of the present disclosure is described. A structure of the vibration device 11, the first vibration member 12, the first elastic member 13*a* to the fourth elastic member 13*d*, and the second vibration member 14*a* may be substantially the same as the seventh example embodiment of the present disclosure, and thus, repeated descriptions thereof are omitted.

Figure 31:
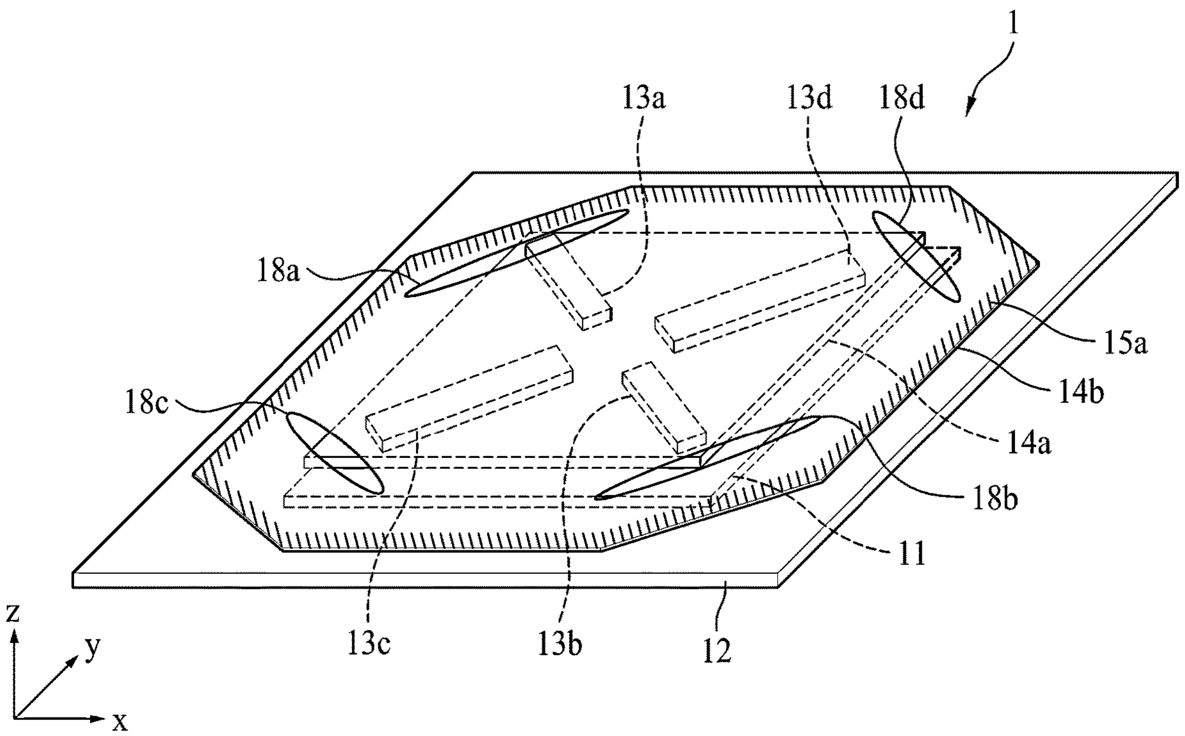
FIG. 31 is a perspective view illustrating a configuration of a sound apparatus according to a tenth example embodiment of the present disclosure.
Figure 32:
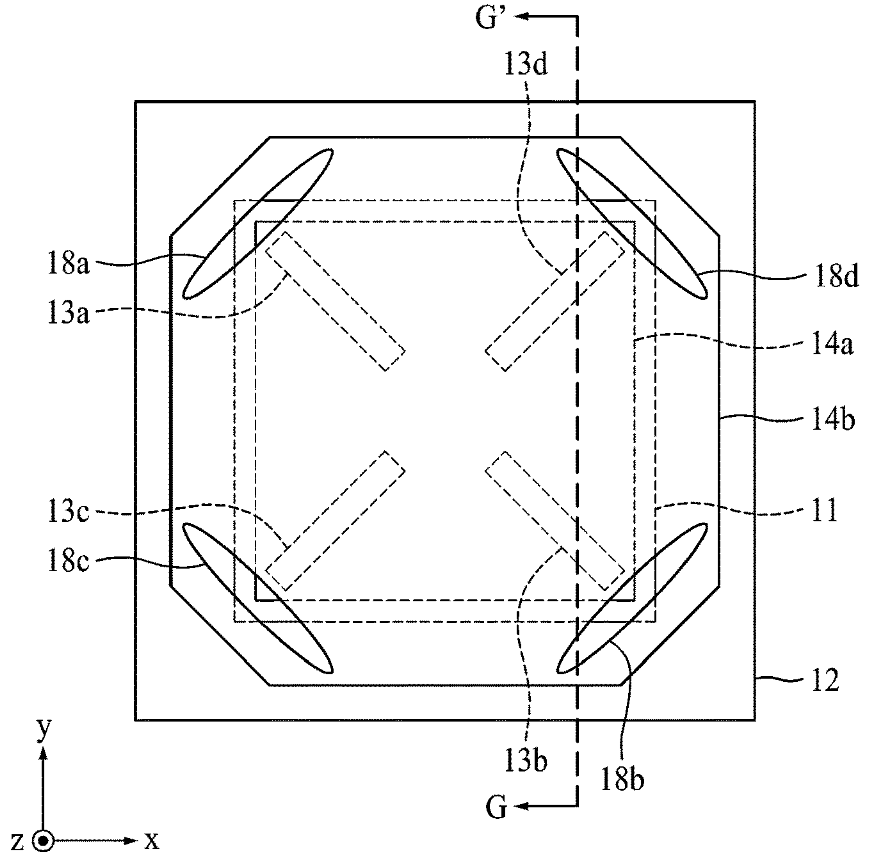
FIG. 32 is a plan view illustrating a configuration of a sound apparatus according to a tenth example embodiment of the present disclosure.
Figure 33:
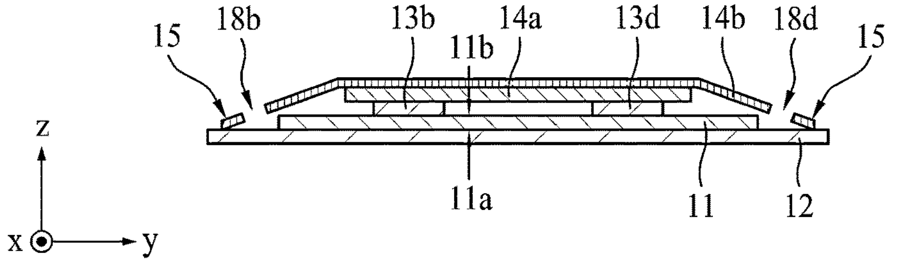
FIG. 33 is a cross-sectional view illustrating a configuration of a sound apparatus according to a tenth example embodiment of the present disclosure.

FIG. 31 is a perspective view illustrating a configuration of a sound apparatus according to a tenth example embodiment of the present disclosure. FIG. 32 is a plan view illustrating a configuration of a sound apparatus according to a tenth example embodiment of the present disclosure. FIG. 33 is a cross-sectional view illustrating a configuration of a sound apparatus according to a tenth example embodiment of the present disclosure. FIG. 33 is a cross-sectional view taken along line G-G' of FIG. 32. A detailed configuration of a sound apparatus 1 according to the tenth example embodiment of the present disclosure is described with reference to FIGS. 31 to 33.

As illustrated in FIGS. 31 to 33, in the tenth example embodiment of the present disclosure, the sound apparatus 1 may further include one or more holes 18 which are in a second vibration member 14*b*. The one or more holes 18 may be formed to connect (or communicate), with each other, an inner portion and an outer portion of a space formed to surround a vibration device 11 between a first vibration member 12 and a second vibration member 14 by a connection member 17. The one or more holes 18 may be formed at the second vibration member 14*b* to overlap a corner portion of the vibration device 11. For example, holes 18*a*, 18*b*, 18*c*, and 18*d* may be formed at the second vibration member 14*b*. When seen in a plane, the holes 18*a*, 18*b*, 18*c*, and 18*d* may be disposed at around four sides which are not adjacent to one another in an octagonal shape. The hole 18*a* may be disposed to face or toward a side at around the first elastic member 13*a*. The hole 18*b* may be disposed to face or toward a side at around the second elastic member 13*b*. The hole 18*c* may be disposed to face or toward a side at around the third elastic member 13*c*. The hole 18*d* may be disposed to face or toward a side at around the fourth elastic member 13*d*. For example, the holes 18*a*, 18*b*, 18*c*, and 18*d* may include an oval shape including a long side and a short side. A long-axis direction of the holes 18*a*, 18*b*, 18*c*, and 18*d* may intersect with a long-side direction of the elastic members 13*a*, 13*b*, 13*c*, and 13*d*.

The holes 18*a*, 18*b*, 18*c*, and 18*d* may be formed to pass through the second vibration member 14*b* and may connect (or communicate) an inner portion of a resonance space and an outer portion of the resonance space to each other. A resonance state—helping with low frequency reproduction (see FIG. 33 with its connection of two spaces) of the resonance space may be appropriately changed by appropriately/flexibly adjusting positions or sizes of the holes 18*a*, 18*b*, 18*c*, and 18*d*. Since the piezo-electric materials generates high frequency sounds relatively well, the holes act like ducts to help with the low frequency reproduction/flow. Accordingly, according to the tenth example embodiment of the present disclosure, the flexibility and degree of freedom in design of the sound apparatus 1 may be enhanced. For example, the first vibration member 12 may be extended to an outer portion of the vibration device 11. For example, the vibration device 11 may be disposed at a region between the elastic member 13 and the first vibration member 12. For example, the elastic member 13 may be disposed at a region between the vibration device 11 and the second vibration member 14. The second vibration member 14 may include a different shape at an end portion (or one side or one portion) thereof. For example, when seen at a cross-sectional surface, the second vibration member 14 may include a curved shape (help with connection as previously described) where around the end portion (or one side or one portion) is curved. The adhesive part 15 may be disposed at the first vibration member 12.

As also seen in FIG. 33, the plurality of elastic members are configured or provide a space (or a gap space, GS). The space (or the gap space, GS) is configured to provide a resonance space to augment the sound generated and enhance the sound quality.

Eleventh Example Embodiment

In an eleventh example embodiment of the present disclosure, a modified example where the hole of the tenth example embodiment of the present disclosure is additionally configured at the sound apparatus 1 according to the eighth example embodiment of the present disclosure is described. Except for that a hole is additionally configured, a structure may be substantially the same as the eighth example embodiment of the present disclosure, and thus, a description thereof is omitted.

Figure 34:
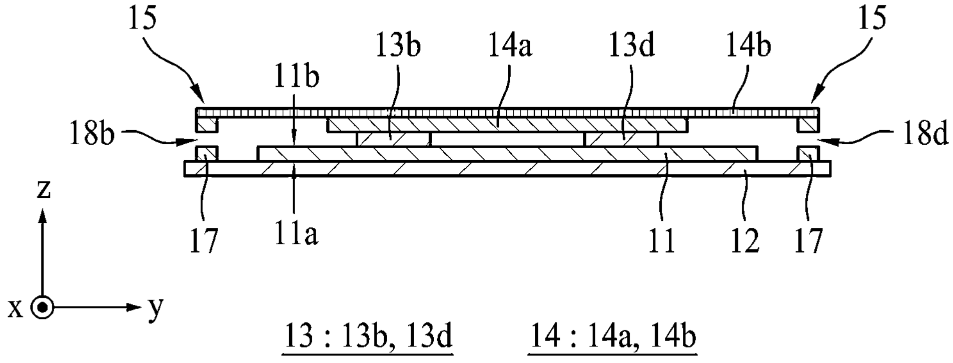
FIG. 34 is a cross-sectional view illustrating a configuration of a sound apparatus according to an eleventh example embodiment of the present disclosure.

FIG. 34 illustrates a modified example of a cross-sectional view taken along line F-F' of FIG. 27. As illustrated in FIG. 34, a sound apparatus 1 may include a connection member 17. Holes 18*b* and 18*d* passing through the connection member 17 in a y-axis direction may be formed at a lateral portion of the connection member 17. Like the tenth example embodiment of the present disclosure, the eleventh example embodiment of the present disclosure may obtain an effect where the degree of freedom in the sound apparatus 1 is enhanced. Also, the plurality of elastic members are configured or provide a space (or a gap space, GS). The space (or the gap space, GS) is configured to provide a resonance space to augment the sound generated and enhance the sound quality.

Furthermore, in the eleventh example embodiment of the present disclosure, the holes 18*b* and 18*d* may be formed at a second vibration member 14*b* instead of the connection member 17, like the tenth example embodiment of the present disclosure, and in this case, the eleventh example embodiment of the present disclosure may obtain substantially the same effect. For example, the first vibration member 12 may be extended to an outer portion of the vibration device 11. For example, the vibration device 11 may be disposed at a region between the elastic member 13 and the first vibration member 12. For example, the elastic member 13 may be disposed at a region between the vibration device 11 and the second vibration member 14. The adhesive part 15 may be disposed at the second vibration member 14. Again, this is particularly helpful for the low frequency sounds.

Twelfth Example Embodiment

In a twelfth example embodiment of the present disclosure, a modified example where the hole of the tenth example embodiment of the present disclosure is additionally configured at the sound apparatus 1 according to the ninth example embodiment of the present disclosure is described. Except for that a hole is additionally configured, a structure may be substantially the same as the ninth example embodiment of the present disclosure, and thus, a description thereof is omitted.

Figure 35:
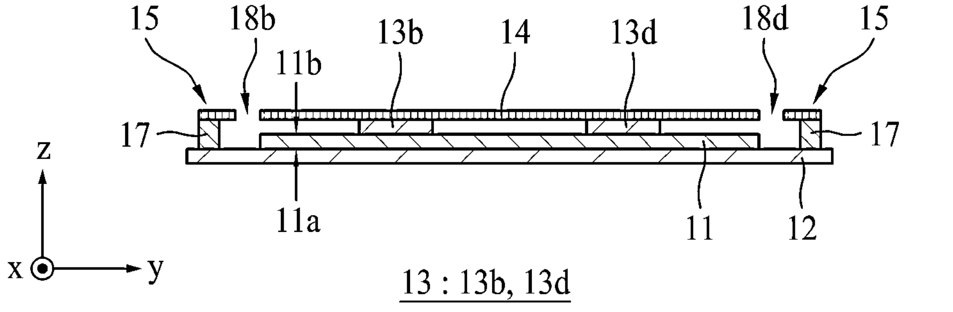
FIG. 35 is a cross-sectional view illustrating a configuration of a sound apparatus according to a twelfth example embodiment of the present disclosure.

FIG. 35 illustrates a cross-sectional view taken along line F-F' of FIG. 27. As illustrated in FIG. 35, holes 18*b* and 18*d* may be formed at an end portion (or one side) of a second vibration member 14 to pass through the second vibration member 14. Like the tenth example embodiment of the present disclosure, the twelfth example embodiment of the present disclosure may obtain an effect where the degree of freedom in the sound apparatus 1 is enhanced. One reason for this is because there is a planar/flat top, so this means manufacture can happen in different ways. Also, the plurality of elastic members are configured or provide a space (or a gap space, GS). The space (or the gap space, GS) is configured to provide a resonance space to augment the sound generated and enhance the sound quality.

In the twelfth example embodiment of the present disclosure, the holes 18*b* and 18*d* may be formed at a connection member 17 instead of the second vibration member 14*b*, like the eleventh example embodiment of the present disclosure, and in this case, the twelfth example embodiment of the present disclosure may obtain substantially the same effect.

In a configuration of the eleventh example embodiment of the present disclosure or the twelfth example embodiment of the present disclosure, the holes 18*b* and 18*d* may be formed at both sides of the connection member 17 and a second vibration member 14*b*. The number of holes illustrated in the tenth to twelfth embodiments of the present disclosure may be examples. The number of holes may be at least one, but embodiments of the present disclosure are not limited thereto. For example, the first vibration member 12 may be extended to an outer portion of the vibration device 11. For example, the vibration device 11 may be disposed at a region between the elastic member 13 and the first vibration member 12. For example, the elastic member 13 may be disposed at a region between the vibration device 11 and the second vibration member 14. The adhesive part 15 may be disposed at the connection member 17.

Thirteenth Example Embodiment

In a thirteenth embodiment of present disclosure, a modified example of a structure of the vibration device 11 in the sound apparatus 1 according to the thirteenth example embodiment of the present disclosure is described.

Figure 36:
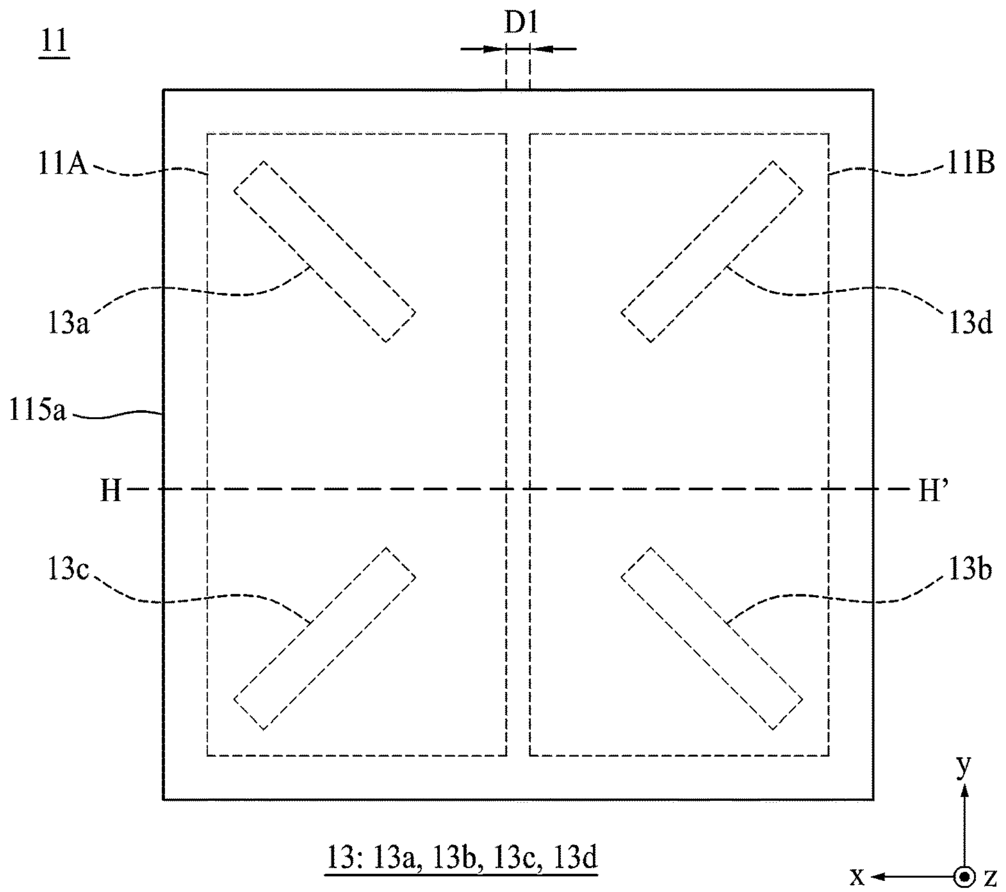
FIG. 36 is a plan view illustrating a configuration of a sound apparatus according to a thirteenth example embodiment of the present disclosure.
Figure 37:
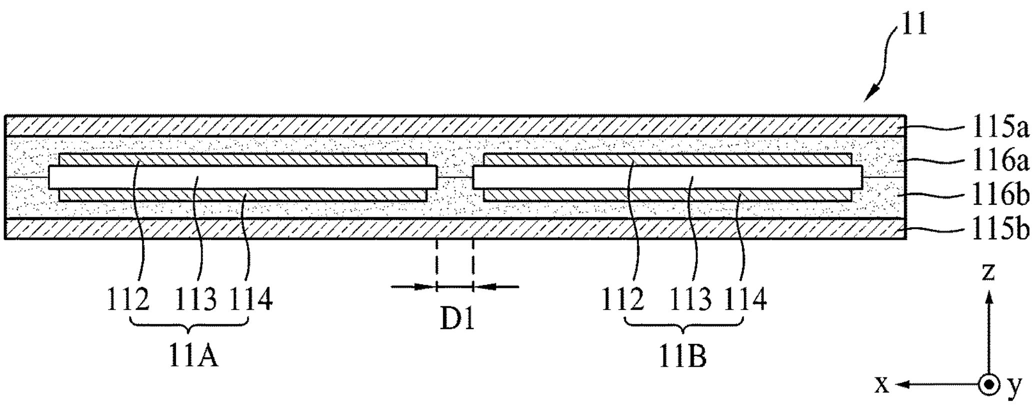
FIG. 37 is a cross-sectional view illustrating a configuration of a sound apparatus according to a thirteenth example embodiment of the present disclosure.

FIG. 36 is a plan view illustrating a configuration of a sound apparatus according to a thirteenth example embodiment of the present disclosure. FIG. 37 is a cross-sectional view taken along line H-H' of FIG. 36. As illustrated in FIGS. 36 and 37, the vibration device 11 according to an example embodiment of the present disclosure may include at least two or more vibration generating parts 11A and 11B. For example, the vibration device 11 may include a first vibration generating part 11A and a second vibration generating part 11B.

Each of the first and second vibration generating parts 11A and 11B may be electrically separated and disposed while being spaced apart from each other along the x-axis direction. The first and second vibration generating parts 11A and 11B may alternately and repeatedly contract and/or expand based on a piezoelectric effect to vibrate. For example, the first and second vibration generating parts 11A and 11B may be disposed or tiled at a certain interval (or distance) D1 along the x-axis direction from each other. Each of the first and second vibration generating parts 11A and 11B may be disposed or tiled on the same plane, and thus, the vibration device 11 may have an enlarged area based on tiling of the first and second vibration generating parts 11A and 11B having a relatively small size. Thus, the vibration device 11 in which the first and second vibration generating parts 11A and 11B are tiled may be a vibration array, a vibration array part, a vibration module array part, a vibration array structure, a tiling vibration array, a tiling vibration array module, or a tiling vibration film, but embodiments of the present disclosure are not limited thereto.

Each of the first and second vibration generating parts 11A and 11B may be disposed or tiled at a certain interval (or distance) D1, and thus, may be implemented as one vibration apparatus (or a single vibration apparatus) which is driven as one complete single-body without being independently driven. With respect to the x-axis direction, a first separation distance (or first distance or first interval) D1 between the first and second vibration generating parts 11A and 11B may be 0.1 mm or more and less than 3 cm, but embodiments of the present disclosure are not limited thereto. By having two small vibration parts, rather than one large, there can be a significant cost saving and the sounds can be better produced.

The first and second vibration generating parts 11A and 11B may be disposed in the first interval D1 of 0.1 mm or more and less than 5 mm, in order to increase a reproduction band of a sound generated by interconnecting a single-body vibration of the first and second vibration generating parts 11A and 11B and to increase a sound of a low-pitched sound band (for example, a sound pressure level characteristic in 500 Hz or less). For example, when the first and second vibration generating parts 11A and 11B are disposed in the interval D1 of less than 0.1 mm (other dimensions are possible such as less than 0.2 mm, or less than 0.05 mm say) or without the interval D1, the reliability of the first and second vibration generating parts 11A and 11B or the vibration device 11 may be reduced due to damage or a crack caused by a physical contact therebetween which occurs when each of the first and second vibration generating parts 11A and 11B vibrates (i.e., they vibrate to an extent that they touch each other).

Each of the first and second vibration generating parts 11A and 11B may include a vibration layer 113, a first electrode 112 at a first surface of the vibration layer 113, and a second electrode 114 at a second surface different from (or opposite to) the first surface of the vibration layer 113. The vibration layer 113 is substantially the same as the vibration layer 113 described above with reference to FIG. 5, and thus, repeated descriptions thereof are omitted. The electrode 112 and the electrode 114 may be disposed with the vibration layer 113 therebetween in a thickness direction and may be configured to apply a voltage to the vibration layer 113. For example, a polarization direction of the vibration layer 113 may be a positive direction or a negative direction along the z-axis. Lines configured to apply a voltage to each electrode may be connected to the electrodes 112 and 114.

The vibration device 11 according to an example embodiment of the present disclosure may further include a first protection layer (or a first protection member) 115*a* and a second protection layer (or a second protection member) 115*b*. The first protection layer 115*a* may be connected to a first surface (or a front surface or an upper surface) of each of the first and second vibration generating parts 11A and 11B in common. The first protection layer 115*a* may protect the first surface of each of the first and second vibration generating parts 11A and 11B. The second protection layer 115*b* may be connected to a second surface (or a rear surface or a lower surface) of each of the first and second vibration generating parts 11A and 11B in common. The second protection layer 115*b* may protect the second surface of each of the first and second vibration generating parts 11A and 11B. Any one of the first protective layer 115*a* and the second protective layer 115*b* may be connected or coupled to the first vibration member 12 through an adhesive layer. For example, any one of the first protective layer 115*a* and the second protective layer 115*b* may be omitted.

The first protection layer 115*a* may be connected or coupled to the first electrode 112 by a first adhesive layer 116*a*. The second protection layer 115*b* may be connected or coupled to the second electrode 114 by a second adhesive layer 116*b*. The first adhesive layer 116*a* and second adhesive layer 116*b* may be configured at a region between the first protection layer 115*a* and the second protection layer 115*b* to surround the first and second vibration generating parts 11A and 11B. For example, the first adhesive layer 116*a* and second adhesive layer 116*b* may be configured at a region between the first protection layer 115*a* and the second protection layer 115*b* to completely surround the first and second vibration generating parts 11A and 11B. The first adhesive layer 116*a* and second adhesive layer 116*b* may be connected to each other at a region between the first vibration generating part 11A and the second vibration generating part 11B. For example, the first and second vibration generating parts 11A and 11B may be embedded or built-in at a region between the first adhesive layer 116*a* and the second adhesive layer 116*b*.

Some of the elastic members of the plurality of elastic members 13 may be disposed at the first vibration generating part 11A, and the remaining elastic members of the plurality of elastic members 13 may be disposed at the second vibration generating part 11B (preferably, placing is symmetrical). For example, a first elastic member 13*a* and a third elastic member 13*c* may be disposed on the first vibration generating part 11A. A second elastic member 13*b* and a fourth elastic member 13*d* may be disposed at the second vibration generating part 11B.

Fourteenth Example Embodiment

In a fourteenth embodiment of present disclosure, a modified example of a structure of the vibration layer 113 in the vibration device 11 of the sound apparatus 1 according to the thirteenth example embodiment of the present disclosure is described.

Figure 38:
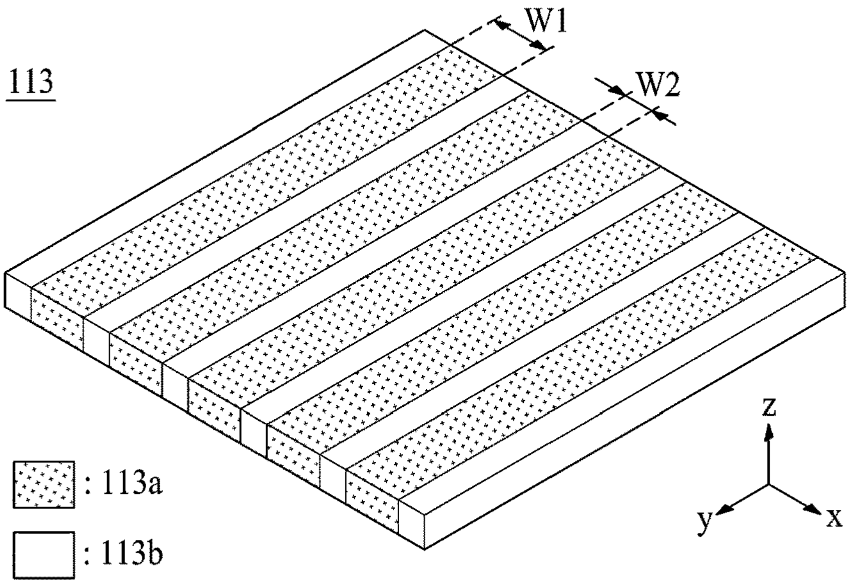
FIG. 38 is a perspective view illustrating a vibration layer of a vibration device according to a fourteenth example embodiment of the present disclosure.

FIG. 38 is a perspective view illustrating a vibration layer of a vibration device according to a fourteenth example embodiment of the present disclosure. A vibration layer 113 of each of the first and second vibration generating parts 11A and 11B of the vibration device 11 according to an example embodiment of the present disclosure may include a plurality of first portions 113*a* and one or more second portions 113*b*. For example, the vibration layer 113 may include a plurality of first portions 113*a* and a plurality of second portions 113*b*. For example, the plurality of first portions 113*a* and the plurality of second portions 113*b* may be alternately and repeatedly disposed along the x-axis direction, but embodiments of the present disclosure are not limited thereto.

Each of the plurality of first portions 113*a* may include an inorganic material having a piezoelectric characteristic. For example, each of the plurality of first portions 113*a* may be an inorganic material portion or a piezoelectric material portion. Each of the plurality of first portions 113*a* may have a first width W1 parallel to the x-axis direction and may be extended along the y-axis direction. Each of the plurality of first portions 113*a* may be substantially the same as the vibration layer 113 described above with reference to FIG. 5, and thus, repeated descriptions thereof are omitted.

Each of the plurality of second portions 113*b* may be disposed at a region between the plurality of first portions 113*a*. For example, each of the plurality of first portions 113*a* may be disposed at a region between two adjacent second portions 113*b* of the plurality of second portions 113*b*. The plurality of first portions 113*a* and the plurality of second portions 113*b* may include a line shape or a stripe shape which has the same size or different sizes.

Each of the plurality of second portions 113*b* may be configured to fill a gap between two adjacent first portions of the plurality of first portions 113*a*. Each of the plurality of first portions 113*a* and the plurality of second portions 113*b* may be disposed (or arranged) at the same plane (or the same layer) in parallel with each other. Each of the plurality of second portions 113*b* may absorb an impact applied to the first portions 113*a*, and thus, may enhance the durability of the first portions 113*a* and provide flexibility to the vibration device 11. Each of the plurality of second portions 113*b* may include an organic material having a ductile characteristic. For example, each of the plurality of second portions 113*b* may include one or more of an epoxy-based polymer, an acrylic-based polymer, and a silicone-based polymer, but embodiments of the present disclosure are not limited thereto. For example, each of the plurality of second portions 113*b* may be an organic portion, an organic material, an adhesive portion, a stretch portion, a bending portion, a damping portion, an elastic portion, an elasticity portion, or a ductile portion, or the like, but embodiments of the present disclosure are not limited thereto.

A first surface of each of the plurality of first portions 113*a* and the plurality of second portions 113*b* may be connected to the first electrode 112 in common. A second surface of each of the plurality of first portions 113*a* and the plurality of second portions 113*b* may be connected to the second electrode 114 in common.

In the vibration device 11 of the sound apparatus 1 according to the fourteenth example embodiment of the present disclosure, the plurality of first portions 113*a* and the plurality of second portion 113*b* may be disposed on (or connected to) the same plane, and thus, the vibration layer 113 may have a single thin film-type. Accordingly, the vibration device 11 may be vibrated in a vertical direction (or a up and down direction) by the first portions 113*a* having a vibration characteristic (ability to vibrate) and may be bent in a curved shape by the second portions 113*b* which have the ability to flex or bend, i.e., they have flexibility. For example, the vibration device 11 including the vibration layer 113 may have a 2-2 composite structure, and thus, may have a resonance frequency of 20 kHz or less, but embodiments of the present disclosure are not limited thereto.

Fifteenth Example Embodiment

In a fifteenth embodiment of present disclosure, a modified example of a structure of the vibration layer 113 in the vibration device 11 of the sound apparatus 1 according to the thirteenth example embodiment of the present disclosure is described.

Figure 39:
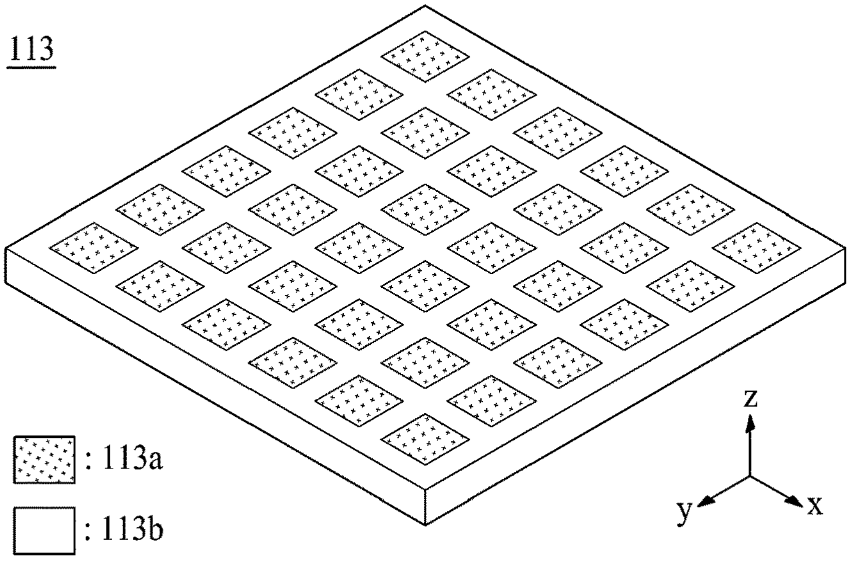
FIG. 39 is a perspective view illustrating a vibration layer of a vibration device according to a fifteenth example embodiment of the present disclosure.

FIG. 39 is a perspective view illustrating a vibration layer of a vibration device according to a fifteenth example embodiment of the present disclosure. A vibration layer 113 of each of the first and second vibration generating parts 11A and 11B of the vibration device 11 according to an example embodiment of the present disclosure may include a plurality of first portions 113*a* and a second portion 113*b*. For example, the vibration layer 113 may include a plurality of first portions 113*a* and a second portion 113*b* which is disposed between the plurality of first portions 113*a*.

Each of the plurality of first portions 113*a* may be disposed to be spaced apart from one another along each of the x-axis direction and the y-axis direction. For example, each of the plurality of first portions 113*a* may have a cube shape having the same size and may be disposed in a lattice shape. Other shapes are possible such as rectangular, rhombus, circular, and so on. Each of the plurality of first portions 113*a* may be substantially the same as the first portion 113*a* described above with reference to FIG. 38, and thus, repeated descriptions thereof are omitted.

The second portion 113*b* may be disposed between the plurality of first portions 113*a* along each of the x-axis direction and the y-axis direction. The second portion 113*b* may be configured to fill a gap or a space between two adjacent first portions 113*a* or to surround each of the plurality of first portions 113*a*, and thus, the second portion 113*b* may be connected to or attached to a lateral surface of an adjacent first portion 113*a*. The second portion 113*b* may be substantially the same as the second portions 113*b* described above with reference to FIG. 38, and thus, repeated descriptions thereof are omitted.

A first surface of each of the plurality of first portions 113*a* and the second portion 113*b* may be connected to the first electrode in common. A second surface of each of the plurality of first portions 113*a* and the second portion 113*b* may be connected to the second electrode in common.

The plurality of first portions 113*a* and the second portion 113*b* may be disposed on (or connected to) the same plane, and thus, the vibration layer 113 according to the fifteenth example embodiment of the present disclosure may have a single thin film-type. Accordingly, the vibration device 11 may be vibrated in a vertical direction by the first portions 113*a* having a vibration characteristic and may be bent in a curved shape by the second portions 113*b* having flexibility. For example, the vibration device 11 including the vibration layer 113 may have a 1-3 composite structure, and thus, may have a resonance frequency of 20 kHz or less, but embodiments of the present disclosure are not limited thereto.

Sixteenth Example Embodiment

In a sixteenth example embodiment of the present disclosure, a detailed configuration example is described where the sound apparatus 1 according to the first to twelfth embodiments of the present disclosure is a display apparatus and the first vibration member 12 performs a function of a display panel of the display apparatus. Descriptions of common elements which are the same as the first to twelfth example embodiments of the present disclosure are omitted or may be briefly given below.

Figure 40:
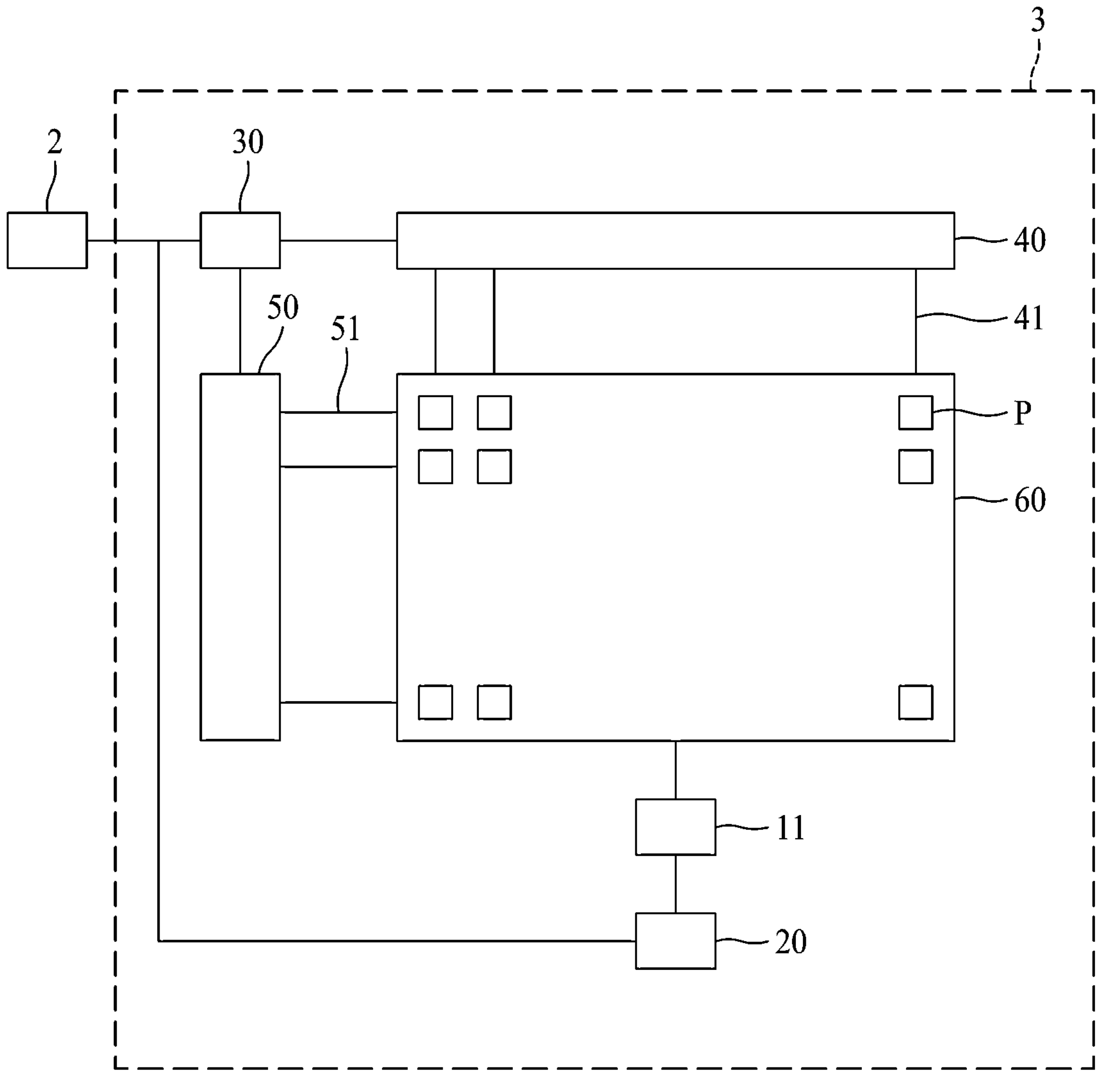
FIG. 40 illustrates a display apparatus according to a sixteenth example embodiment of the present disclosure.

FIG. 40 is a configuration diagram of a display apparatus 3 according to a sixteenth example embodiment of the present disclosure. The display apparatus 3 according to an example embodiment of the present disclosure may be, for example, electronic posters, digital bulletin boards, electronic advertisement signboards, computer screens, or television receivers, or the like, but embodiments of the present disclosure are not limited thereto. A host system 2 and a structure of a vibration device 11 may be the same as one of the first to fifteenth embodiments of the present disclosure, and thus, descriptions thereof are omitted. Further, the elastic member 13 and the second vibration member 14 or the like according to the first to twelfth embodiments of the present disclosure may be connected to the vibration device 11.

As illustrated in FIG. 40, the display apparatus 3 may include a vibration device 11, a controller 20, a panel controller 30, a data driving circuit 40, a gate driving circuit 50, and a display panel 60. The display apparatus 3 may be an apparatus which displays an image by a display panel 60 based on RGB data (or RGBW data) or the like input thereto and generates a sound based on a sound signal or the like input thereto.

The panel controller 30 may control the data driving circuit 40 and the gate driving circuit 50 based on image data and a timing signal input from the host system 2. The data driving circuit 40 may supply data voltages or the like to a plurality of pixels P through a driving line 41 disposed at each column of the plurality of pixels P. The gate driving circuit 50 may supply a control signal to the plurality of pixels P through a driving line 51 disposed at each row of the plurality of pixels P. Further, each of the driving line 41 and the driving line 51 may be provided in a plurality lines.

The display panel 60 may include the plurality of pixels P disposed to configure a plurality of rows and a plurality of columns, but embodiments of the present disclosure are not limited thereto. The display apparatus 3 may be, for example, an organic light emitting diode (OLED) display using the display panel 60 where an OLED is provided as a light emitting device of the pixel P. Alternatively, the display apparatus 3 may be a liquid crystal display (LCD) where a liquid crystal panel including a liquid crystal material and a polarizer, or the like is used as the display panel 60. Based on such a structure, the display panel 60 may be thinned, and thus, the structure may be suitable for thinning the display apparatus 3. When the display apparatus 3 is capable of displaying a color image, the pixel P may be a subpixel which displays one of a plurality of colors (for example, RGB or RGBW) implementing a color image.

Each of the controller 20, the panel controller 30, the data driving circuit 40, and the gate driving circuit 50 may be configured with one semiconductor integrated circuit (IC) or a plurality of semiconductor ICs. Further, some or all of the controller 20, the panel controller 30, the data driving circuit 40, and the gate driving circuit 50 may be integrally configured as one semiconductor IC (or one body or a single body).

The display apparatus 3 according to an example embodiment of the present disclosure may be supplied with an image signal (for example, RGB data or RGBW data), a sound signal and a timing signal (a vertical synchronization signal, a horizontal synchronization signal, and a data enable signal, or the like) from the host system 2, and thus, may display an image and simultaneously may generate a sound. The display panel 60 may include an image display surface configured to display an image and a rear surface (or a backside surface) which is opposite to or different from the image display surface. The vibration devices 11 may be connected to the rear surface of the display panel 60. Therefore, the display panel 60 may include a function of displaying an image and a function of the vibration member 12 in the first to twelfth embodiments of the present disclosure. Accordingly, in an example embodiment of the present disclosure, the display apparatus 3 having an acoustic effect where a sound is output from an image displayed by the display panel 60 may be provided.

OTHER EXAMPLE EMBODIMENTS

The above-described embodiments of the present disclosure are merely illustrative of some embodiments to which the present disclosure may be applied, and the technical scope of the present disclosures should not be construed as being limited according to the above-described embodiments. In addition, the present disclosure may be implemented in various embodiments through appropriate modifications and/or variations without departing from the technical idea or scope of the disclosures. For example, an embodiment should be understood where an embodiment where some elements of an arbitrary embodiment is added to another embodiment or an embodiment where some elements of an arbitrary embodiment are replaced with some elements of another embodiment may be applied to the present disclosure.

Figure 41:
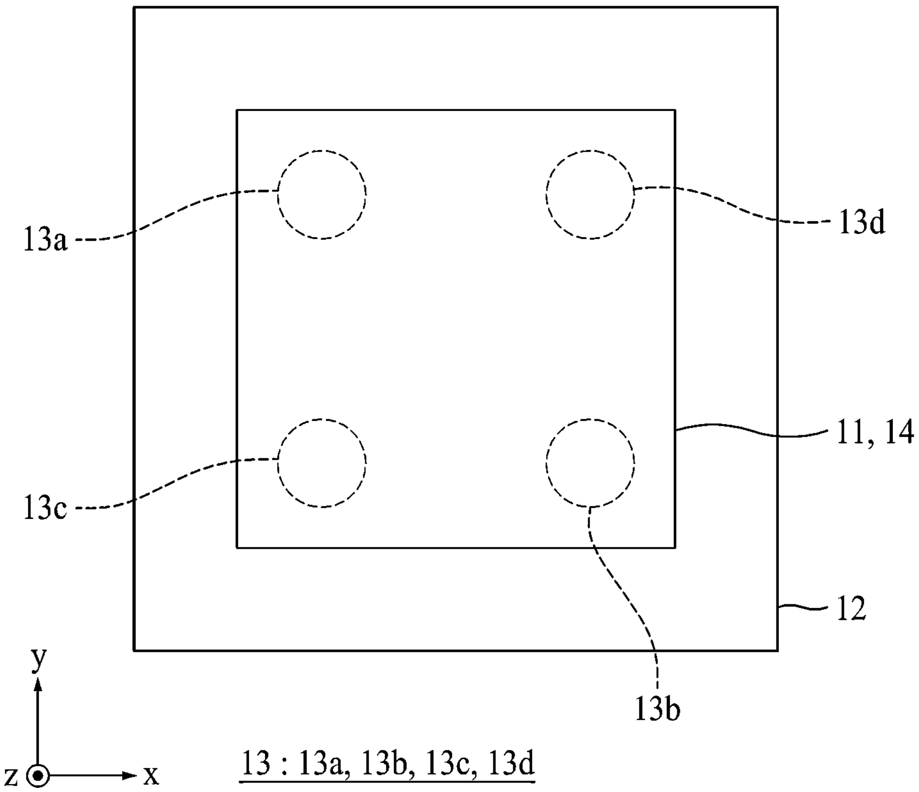
FIG. 41 is a plan view illustrating a configuration of a sound apparatus according to a modified example embodiment of the present disclosure.

In the embodiments described above, an example where a shape of an elastic member is a cuboid shape is illustrated, but a shape of an elastic member may be a shape in addition to a cuboid shape. FIG. 41 is a plan view illustrating a configuration of a sound apparatus according to a modified example embodiment. As illustrated in FIG. 41, when seen in a plane from the z-axis direction, first to fourth elastic members 13*a* to 13*d* may have a cylindrical shape (for example, a circular shape).

Figure 42:
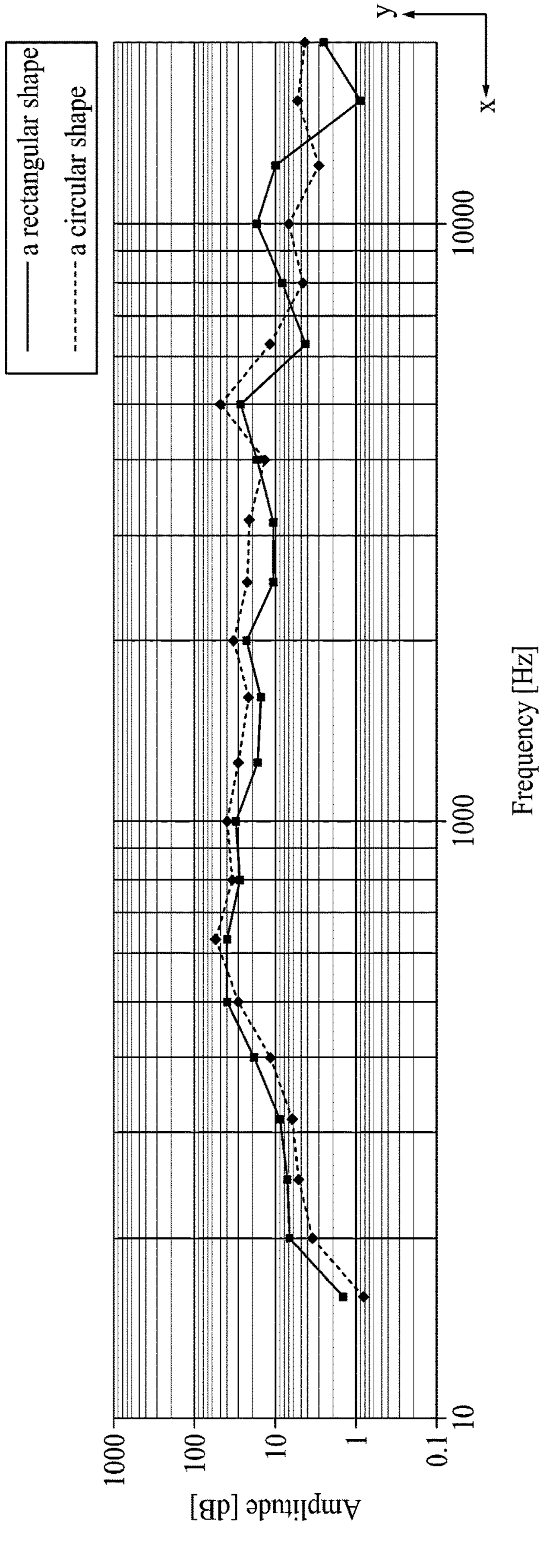
FIG. 42 is a graph showing a sound characteristic of a sound apparatus according to a modified example embodiment of the present disclosure.

FIG. 42 is a graph showing a sound characteristic of a sound apparatus according to a modified example embodiment of the present disclosure. FIG. 42 is real measurement data showing a variation of a characteristic when a shape of an elastic member is changed to two types of shapes such as a rectangular shape and a circular shape. The abscissa-axis of FIG. 42 is a frequency with respect to a log scale, the ordinate-axis of FIG. 42 is a signal strength spectrum with respect to a log scale of a sound signal received by a measurement apparatus and corresponds to a sound pressure level. In FIG. 42, a curve illustrated by a solid line represents a sound characteristic when a shape of an elastic member is a cuboid shape, and when seen in a plane in a z-axis direction, is a rectangular shape. In FIG. 42, a curve illustrated by a dotted line represents a sound characteristic when a shape of an elastic member is a cylindrical shape, and when seen in a plane in a z-axis direction, is a circular shape. In two examples, cross-sectional areas of an x-y plane of an elastic member may be substantially equal to each other.

In FIG. 42, comparing two curves, a case of a rectangular shape may be relatively favorable at a range of 500 Hz or less, and a case of a circular shape may be relatively favorable at a range of 500 Hz to 6,000 Hz. As described above, an external shape of an elastic member may be appropriately adjusted based on a characteristic of a sound apparatus 1.

Figure 43:
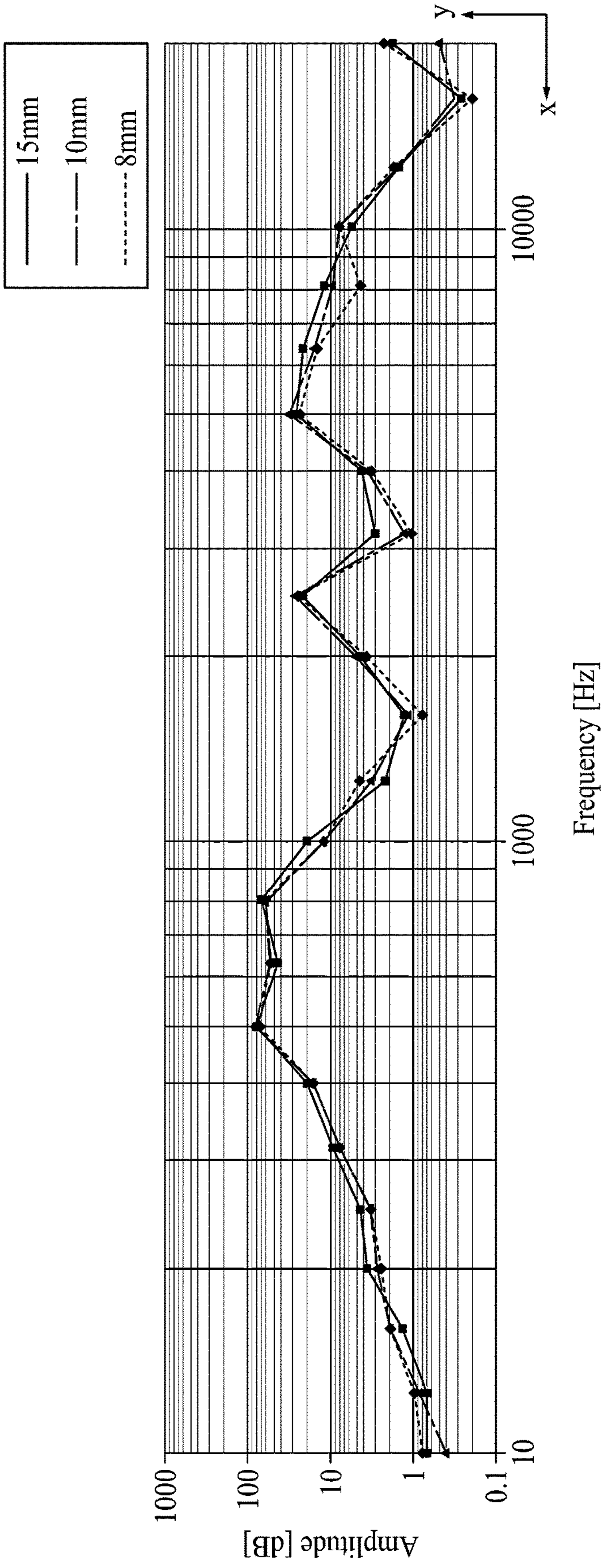
FIG. 43 is a graph showing a sound characteristic of a sound apparatus according to a modified example embodiment of the present disclosure.
Figure 44:
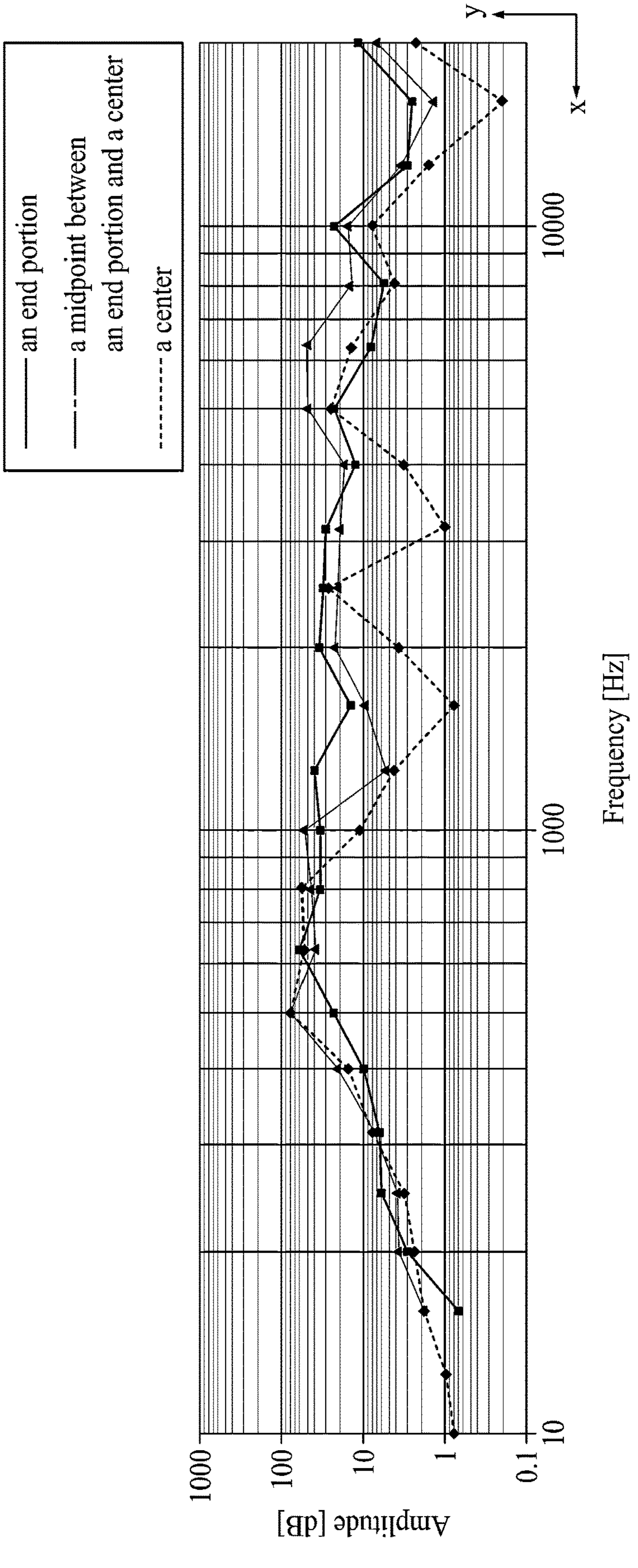
FIG. 44 is a graph showing a sound characteristic of a sound apparatus according to a modified example embodiment of the present disclosure.

Moreover, a size of an elastic member or a position relationship between a plurality of elastic members is not limited to the embodiments described above. FIGS. 43 and 44 are graphs showing a sound characteristic of a sound apparatus according to a modified example embodiment of the present disclosure.

FIG. 43 is real measurement data representing a variation of a characteristic when a size of an elastic member is changed. FIG. 43 shows a result obtained by measuring a variation of a characteristic when a diameter is changed to 15 mm, 10 mm, and 8 mm in an elastic member having a circular shape. In FIG. 43, a curve illustrated by a solid line represents a sound characteristic when a diameter of an elastic member is 15 mm. In FIG. 43, a curve illustrated by a dash-single dotted line represents a sound characteristic when a diameter of an elastic member is 10 mm. In FIG. 43, a curve illustrated by a dotted line represents a sound characteristic when a diameter of an elastic member is 8 mm. In FIG. 43, comparing three curves, it may be difficult to distinguish sound pressure level characteristics, but it may be seen that a variation of a characteristic may be seen in a frequency domain such as 100 Hz to 200 Hz, 1,000 Hz to 3,000 Hz, and 6,000 Hz to 10,000 Hz. A dimension or a size of an elastic member may be appropriately adjusted based on a characteristic of the sound apparatus 1.

FIG. 44 shows real measurement data showing a variation of a characteristic of a sound apparatus when a connection position of an elastic member is changed. FIG. 44 shows a result obtained by measuring a variation of a characteristic of a sound apparatus when a connection position is changed to an end portion and a center of the vibration device 11 and a middle point between the end portion and the center under a condition where a diameter is set to 8 mm in an elastic member having a circular shape. In FIG. 44, a curve illustrated by a solid line represents a sound characteristic when the elastic member is connected to the end portion of the vibration device 11. In FIG. 44, a curve illustrated by a dash-single dotted line represents a sound characteristic when the elastic member is connected to the middle point between the end portion and the center of the vibration device 11. In FIG. 44, a curve illustrated by a dotted line represents a sound characteristic when the elastic member is connected to the center of the vibration device 11.

In FIG. 44, comparing three curves, a case may be seen where a sound characteristic is closer to being flat as a connection position is closer to an end portion (or one side). However, in some frequency bands such as 400 Hz to 500 Hz and 5,000 Hz to 7,000 Hz, a high sound pressure level may be obtained at a position at which the connection position is spaced apart from the end portion (or one side or one portion). Accordingly, the connection position of the elastic member may be appropriately adjusted based on a characteristic of the sound apparatus 1.

Figure 45:
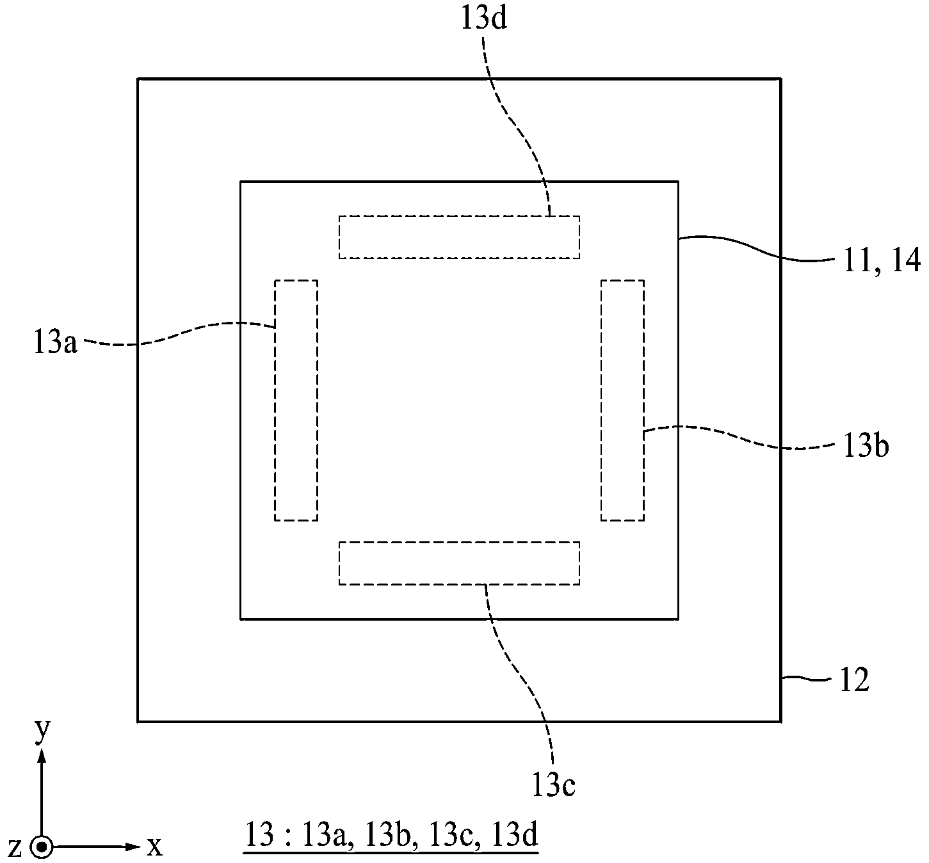
FIG. 45 is a plan view illustrating a configuration of a sound apparatus according to a modified example embodiment of the present disclosure.

FIG. 45 is a plan view showing a configuration of a sound apparatus according to a modified example embodiment of the present disclosure. FIG. 45 shows an example where a position relationship of the first elastic member 13*a* to the fourth elastic member 13*d* illustrated in FIG. 8 is modified. As illustrated in FIG. 45, the first to fourth elastic members 13*a* to 13*d* may be disposed along four sides of the vibration device 11. As described above, positions of a plurality of elastic members are not limited to the embodiments described above.

A sound apparatus according to an example embodiment of the present disclosure may be applied to a sound apparatus disposed at an apparatus. The apparatus according to an example embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic book, portable multimedia players (PMPs), personal digital assistants (PDAs), motion pictures expert group audio layer 3 (MP3) players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game apparatuses, notebook computers, monitors, cameras, camcorders, home appliances, and the like. In addition, the sound apparatus according to an example embodiment of the present disclosure may be applied to organic light-emitting lighting apparatuses or inorganic light-emitting lighting apparatuses. When the sound apparatus of an example embodiment of the present disclosure is applied to lighting apparatuses, the lighting apparatus may act as a lighting device and a speaker. Furthermore, when the sound apparatus of an example embodiment of the present disclosure is applied to a mobile device, or the like, the sound apparatus may act as one or more of a speaker, a receiver, and a haptic apparatus, but embodiments of the present disclosure are not limited thereto.

A sound apparatus according to one or more example embodiments of the present disclosure are described below.

A sound apparatus according to one or more example embodiments of the present disclosure may comprise a vibration device including a first surface and a second surface opposite to the first surface and configured to vibrate by an input sound signal, a first vibration member connected to the first surface, a second vibration member, and a first elastic member connecting the second surface to the second vibration member.

A sound apparatus according to another aspect of the present disclosure may comprise a vibration device including a first surface and a second surface opposite to or facing each other, the vibration device being configured to vibrate according to or by a (input) voltage and/or sound signal; a first vibration member connected or coupled to the first surface; a second vibration member; and a first elastic member connecting the second surface to the second vibration member.

The sound apparatus according to any one of these aspects may include one or more of the following features:

The vibration device may be configured to vibrate by a voltage applied thereto, the voltage corresponding to the sound signal.

According to one or more example embodiments of the present disclosure, the first elastic member may be connected to a portion of the second surface, e.g., only to a portion of the second surface. For instance, the first elastic member may expose a portion (e.g., 25-50%, or 75% say, up to all) of the second surface.

According to one or more example embodiments of the present disclosure, the first elastic member may be connected to the whole second surface. For instance, the first elastic member may cover the whole second surface.

According to one or more example embodiments of the present disclosure, the sound apparatus may further comprise a second elastic member connecting the second surface to the second vibration member.

According to one or more example embodiments of the present disclosure, the first elastic member and the second elastic member may have symmetry when seen in a plane from a direction perpendicular to the second surface. For example, the first elastic member and the second elastic member may be symmetrically disposed to each other on the second surface.

According to one or more example embodiments of the present disclosure, the sound apparatus may further comprise a third elastic member and a fourth elastic member connecting the second surface to the second vibration member. In this case, the first elastic member, the second elastic member, the third elastic member, and the fourth elastic member may have a rotational symmetry when seen in a plane. The first elastic member, the second elastic member, the third elastic member, and the fourth elastic member may be disposed on the second surface to have a rotation symmetry, e.g., with respect to a perpendicular center line of the second surface and/or of the first vibration member. A perpendicular center line denotes a line perpendicular to the second surface and/or to the first vibration member and passing through a center of second surface and/or of the first vibration member.

According to one or more example embodiments of the present disclosure, the sound apparatus may further comprise a connection portion connecting the second surface to the second vibration member, e.g., the connection portion being disposed between and/or adjacent to the first elastic member, the second elastic member, the third elastic member, and the fourth elastic member. The connection portion may be disposed between and/or adjacent to and/or spaced apart from the first elastic member, the second elastic member, the third elastic member, and the fourth elastic member. The connection portion may be an adhesive part.

According to one or more example embodiments of the present disclosure, the first elastic member, the second elastic member, the third elastic member, and the fourth elastic member may have a rotational symmetry with respect to the connection portion when seen in a plane. For example. the first elastic member, the second elastic member, the third elastic member, and the fourth elastic member may be disposed on the second surface to have a rotational symmetry with respect to the connection portion.

According to one or more example embodiments of the present disclosure, the second vibration member may be connected to the first vibration member.

According to one or more example embodiments of the present disclosure, the second vibration member may have a curved or bent or kinked shape when seen in a cross-sectional surface vertical to the second surface. For example, the second vibration member may have a curved or bent or kinked shape in a cross-section.

According to one or more example embodiments of the present disclosure, the second vibration member is disposed so that a resonance space may be configured between the first vibration member and the second vibration member.

According to one or more example embodiments of the present disclosure, the second vibration member may comprise at least one hole connecting the resonance space to an outside of the resonance space.

According to one or more example embodiments of the present disclosure, the sound apparatus may further comprise at least one connection member connecting the first vibration member to the second vibration member and/or to the first surface.

According to one or more example embodiments of the present disclosure, the first vibration member and the second vibration member may be disposed in parallel when seen in a cross-sectional surface vertical to the second surface. That is, the first vibration member and the second vibration member may be parallel to each other, i.e., may extend in parallel planes.

According to one or more example embodiments of the present disclosure, the second vibration member and the at least one connection member may be disposed so that a resonance space is provided between the second vibration member, the at least one connection member, and the first vibration member.

According to one or more example embodiments of the present disclosure, the second vibration member may comprise at least one hole connecting the resonance space to an outside of the resonance space.

According to one or more example embodiments of the present disclosure, the connection member may comprise at least one hole connecting the resonance space to an outside of the resonance space.

According to one or more example embodiments of the present disclosure, the second vibration member may comprise a first portion having a first elastic modulus, and a second portion having a second elastic modulus being smaller than the first elastic modulus.

According to one or more example embodiments of the present disclosure, the first portion may be connected to the first elastic member.

According to one or more example embodiments of the present disclosure, the second portion may be connected to the first vibration member.

According to one or more example embodiments of the present disclosure, the first vibration member may be connected to the whole first surface.

According to one or more example embodiments of the present disclosure, the first vibration member may be connected to a portion of the first surface.

According to one or more example embodiments of the present disclosure, the first elastic member may have a rectangular shape in a planar view, i.e., when seen in a plane from a direction perpendicular to the second surface. For example, the first elastic member may be disposed on the second surface to have a rectangular shape.

According to one or more example embodiments of the present disclosure, the first elastic member may have a square shape in a planar view, i.e., when seen in a plane from a direction perpendicular to the second surface. For example, the first elastic member may be disposed on the second surface to have a square shape.

According to one or more example embodiments of the present disclosure, the first elastic member may have a circular shape in a planar view, i.e., when seen in a plane from a direction perpendicular to the second surface. For example, the first elastic member may be disposed on the second surface to have a circular shape.

According to one or more example embodiments of the present disclosure, the first vibration member may be a display panel of a display apparatus, the display panel may comprise an image display surface configured to display an image and a rear surface opposite to the image display surface, and a vibration of the vibration device may be for being transferred to the rear surface of the display panel.

According to one or more example embodiments of the present disclosure, the first vibration member may be a display panel of the display apparatus and the first surface of the vibration device may be coupled to a rear surface of the display panel, the rear surface being opposite to an image display surface of the display panel, to transfer vibration of the vibration device to the rear surface of the display panel.

The sound apparatus according to one or more example embodiments of the present disclosure may include a first vibration member, a vibration device connected to the first vibration member, a second vibration member connected to the vibration device, and a plurality of elastic members which configure or provide a space (or a gap space, GS) between the vibration device and the second vibration member.

According to one or more example embodiments of the present disclosure, a plurality of elastic members may be disposed at positions which are symmetry with one another with respect to a center of a vibration device.

According to one or more example embodiments of the present disclosure, the plurality of elastic members may be disposed at periphery portions of the vibration device so as to be symmetric with one another with respect to the center of the vibration device.

According to one or more example embodiments of the present disclosure, the plurality of elastic members may be disposed to be inclined with respect to a side of the vibration device.

According to one or more example embodiments of the present disclosure, each of the plurality of elastic members may include a long side and a short side, and the long side of each of the plurality of elastic members may be extended in a direction toward a center of the vibration device from one corner of the vibration device.

According to one or more example embodiments of the present disclosure, the second vibration member may have a size which is greater than that of the vibration device.

According to one or more example embodiments of the present disclosure, the second vibration member may be extended to an outer portion of the vibration device.

According to one or more example embodiments of the present disclosure, the second vibration member may have an octagonal shape.

According to one or more example embodiments of the present disclosure, the sound apparatus may further include an adhesive part between the first vibration member and the second vibration member.

According to one or more example embodiments of the present disclosure, the sound apparatus may further include a first adhesive part between a periphery portion of the second vibration member and the first vibration member, and a second adhesive part between a center portion of the second vibration member and the vibration device.

According to one or more example embodiments of the present disclosure, the sound apparatus may further include a plurality of connection members which configure or provide a space between the first vibration member and the vibration device.

According to one or more example embodiments of the present disclosure, each of the plurality of connection members may overlap a respective one of the plurality of elastic members.

According to one or more example embodiments of the present disclosure, the second vibration member may include a first sub-vibration member connected to the plurality of elastic members, and a second sub-vibration member, which covers the first sub-vibration member and is connected to the first vibration member.

According to one or more example embodiments of the present disclosure, the sound apparatus may further include a connection member which is between the first vibration member and the second vibration member and surrounds the vibration device.

According to one or more example embodiments of the present disclosure, the connection member may configure or provide a space which surrounds the vibration device between the first vibration member and the second vibration member. The second vibration member may include one or more holes which connect (or communicate) with each other an inner portion and an outer portion of the space surrounding the vibration device.

According to one or more example embodiments of the present disclosure, the connection member may include one or more holes which connect (or communicate), with each other, the inner portion and the outer portion of the space surrounding the vibration device.

According to one or more example embodiments of the present disclosure, the one or more holes may be configured or provided at the second vibration member to overlap one or more respective corner portions of the vibration device.

According to one or more example embodiments of the present disclosure, the second vibration member may include a first sub-vibration member connected to the plurality of elastic members and a second sub-vibration member which covers the first sub-vibration member and is connected to the first vibration member. The one or more holes may be formed at the second sub-vibration member to overlap one or more respective corner portions of the vibration device.

According to one or more example embodiments of the present disclosure, the vibration device may include at least two or more vibration generating parts. Each of the at least two or more vibration generating parts may include a vibration layer, a first electrode at a first surface of the vibration layer, and a second electrode at a second surface of the vibration layer. The second surface of the vibration layer may be different from the first surface of the vibration layer.

According to one or more example embodiments of the present disclosure, the vibration device may further include a first protection member connected to a first surface of each of the first and second vibration generating parts in common, and a second protection member connected to a second surface of each of the first and second vibration generating parts in common.

According to one or more example embodiments of the present disclosure, the vibration device may further include a first adhesive layer between the at least two or more vibration generating parts and the first protection member, and a second adhesive layer between the at least two or more vibration generating parts and the second protection member.

According to one or more example embodiments of the present disclosure, the first adhesive layer and the second adhesive layer may be connected to each other between the at least two or more vibration generating parts.

According to one or more example embodiments of the present disclosure, some of the plurality of elastic members may be disposed at some of two or more vibration generating parts, and the other elastic members of the plurality of elastic members may be disposed at the other vibration generating parts of two or more vibration generating parts.

According to one or more example embodiments of the present disclosure, the vibration layer may include (i) a plurality of first portions and (ii) one or more second portions between the plurality of first portions.

According to one or more example embodiments of the present disclosure, the plurality of first portions may include an inorganic material having a piezoelectric characteristic, and the one or more second portion may include an organic material having a ductile characteristic.

According to one or more example embodiments of the present disclosure, the first vibration member may be configured with, or may include, material of metal, resin, glass, hard paper, wood, rubber, plastic, fiber, cloth, paper, leather, or carbon.

According to one or more example embodiments of the present disclosure, the first vibration member may include a display panel including a pixel configured to display an image, a screen panel on which an image is to be projected from a display apparatus, a lighting panel, a light emitting diode lighting panel, an organic light emitting lighting panel, an inorganic light emitting lighting panel, a signage panel, a vehicular interior material, a vehicular glass window, a vehicular exterior material, a vehicular seat interior material, a vehicular ceiling material, a building ceiling material, a building interior material, a building glass window, an aircraft interior material, an aircraft glass window, or a mirror.

According to a further aspect of the present disclosure, a display apparatus may be provided including a sound apparatus according to any one of the herein disclosed aspects or embodiments.

It will be apparent to those skilled in the art that various modifications and variations can be made in the present disclosure without departing from the technical idea or scope of the disclosure. Thus, it is intended that the present disclosure covers the modifications and variations of this disclosure that come within the scope of the claims and their equivalents.

What is claimed is:

1. A sound apparatus, comprising:

a vibration device including a first surface and a second surface opposite to the first surface and configured to vibrate by an input sound signal;

a first vibration member connected to the first surface;

a second vibration member;

a first elastic member connecting the second surface to the second vibration member;

a second elastic member connecting the second surface to the second vibration member; and a third elastic member and a fourth elastic member connecting the second surface to the second vibration member, wherein the first elastic member, the second elastic member, the third elastic member, and the fourth elastic member are disposed on the second surface to have a rotational symmetry.

2. The sound apparatus of claim 1, wherein the first elastic member is connected to a portion of the second surface.

3. The sound apparatus of claim 1, wherein the first elastic member is connected to the whole second surface.

4. The sound apparatus of claim 1, further comprising a connection portion connecting the second surface to the second vibration member, the connection portion being disposed between and/or adjacent to the first elastic member, the second elastic member, the third elastic member, and the fourth elastic member.

5. The sound apparatus of claim 4, wherein the first elastic member, the second elastic member, the third elastic member, and the fourth elastic member are disposed on the second surface to have a rotational symmetry with respect to the connection portion.

6. The sound apparatus of claim 1, wherein the second vibration member is connected to the first vibration member.

7. The sound apparatus of claim 6, wherein the second vibration member has a curved or bent or kinked shape in a cross-section.

8. The sound apparatus of claim 6, wherein the second vibration member is disposed so that a resonance space is configured between the first vibration member and the second vibration member.

9. The sound apparatus of claim 8, wherein the second vibration member comprises at least one hole connecting the resonance space to an outside of the resonance space.

10. The sound apparatus of claim 1, further comprising at least one connection member connecting the first vibration member to the second vibration member.

11. The sound apparatus of claim 10, wherein the first vibration member and the second vibration member extend in planes parallel to each other.

12. The sound apparatus of claim 10, wherein the second vibration member and the at least one connection member are disposed so that a resonance space is provided between the second vibration member, the at least one connection member, and the first vibration member.

13. The sound apparatus of claim 12, wherein the second vibration member comprises at least one hole connecting the resonance space to an outside of the resonance space.

14. The sound apparatus of claim 12, wherein the at least one connection member comprises at least one hole connecting the resonance space to an outside of the resonance space.

15. The sound apparatus of claim 1, wherein the second vibration member comprises:

a first portion having a first elastic modulus; and a second portion having a second elastic modulus being smaller than the first elastic modulus.

16. The sound apparatus of claim 15, wherein the first portion is connected to the first elastic member.

17. The sound apparatus of claim 15, wherein the second portion is connected to the first vibration member.

18. The sound apparatus of claim 1, wherein the first vibration member is connected to the whole first surface.

19. The sound apparatus of claim 1, wherein the first vibration member is connected to a portion of the first surface.

20. The sound apparatus of claim 1, wherein the first elastic member is disposed on the second surface to have a rectangular shape.

21. The sound apparatus of claim 1, wherein the first elastic member is disposed on the second surface to have a square shape.

22. The sound apparatus of claim 1, wherein the first elastic member is disposed on the second surface to have a circular shape.

23. A sound apparatus, comprising:

a vibration device including a first surface and a second surface opposite to the first surface and configured to vibrate by an input sound signal;

a first vibration member connected to the first surface;

a second vibration member; and a first elastic member connecting the second surface to the second vibration member, wherein the first vibration member is a display panel of a display apparatus, wherein the display panel comprises an image display surface configured to display an image and a rear surface opposite to the image display surface, and wherein a vibration of the vibration device is for being transferred to the rear surface of the display panel.

24. A sound apparatus, comprising:

a vibration device including a first surface and a second surface opposite to the first surface and configured to vibrate by an input sound signal;

a first vibration member connected to the first surface;

a second vibration member; and a first elastic member connecting the second surface to the second vibration member, wherein the first vibration member is a display panel of a display apparatus, and the first surface of the vibration device is coupled to a rear surface of the display panel, the rear surface being opposite to an image display surface of the display panel, to transfer vibration of the vibration device to the rear surface of the display panel.

* * * * *